US012355614B2

(12) United States Patent
Cirik et al.

(10) Patent No.: US 12,355,614 B2
(45) Date of Patent: Jul. 8, 2025

(54) FAILURE RECOVERY AND BEAM SELECTION IN WIRELESS COMMUNICATIONS

(71) Applicant: Comcast Cable Communications, LLC, Philadelphia, PA (US)

(72) Inventors: Ali Cirik, Herndon, VA (US); Esmael Dinan, McLean, VA (US); Hua Zhou, Herndon, VA (US); Hyoungsuk Jeon, Centreville, VA (US); Alireza Babaei, Fairfax, VA (US); Kyungmin Park, Herndon, VA (US); Kai Xu, Herndon, VA (US); Yunjung Yi, Vienna, VA (US); Youngwoo Kwak, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/785,272

(22) Filed: Feb. 7, 2020

(65) Prior Publication Data
US 2020/0260300 A1    Aug. 13, 2020

Related U.S. Application Data

(60) Provisional application No. 62/824,717, filed on Mar. 27, 2019, provisional application No. 62/802,896, filed on Feb. 8, 2019.

(51) Int. Cl.
*H04L 41/0668*    (2022.01)
*H04L 5/00*    (2006.01)
(Continued)

(52) U.S. Cl.
CPC ........ *H04L 41/0668* (2013.01); *H04L 5/0048* (2013.01); *H04W 24/04* (2013.01);
(Continued)

(58) Field of Classification Search
CPC ............. H04L 41/0668; H04L 5/0048; H04W 36/305; H04W 24/04; H04W 24/08;
(Continued)

(56) References Cited

U.S. PATENT DOCUMENTS

2015/0078286 A1*  3/2015  Kim .......................... H04L 1/18
                                                                      370/329
2015/0245307 A1*  8/2015  Chen ....................... H04L 5/001
                                                                      370/336

(Continued)

OTHER PUBLICATIONS

U.S. Appl. No. 62/657,399, filed Apr. 19, 2018 (Year: 2018).*

(Continued)

*Primary Examiner* — Sun Jong Kim
(74) *Attorney, Agent, or Firm* — Banner & Witcoff, Ltd.

(57) ABSTRACT

Wireless communications are described. Failure recovery associated with resource(s) may be used. A wireless device may select, based on a determined failure, a suitable candidate resource for cell(s), such as secondary cell(s). The wireless device may use the suitable candidate resource, such as a candidate beam, for an uplink channel transmission via a secondary cell, for example, until a new uplink channel configuration/activation is received.

28 Claims, 38 Drawing Sheets

(51) Int. Cl.
| | |
|---|---|
| *H04W 24/04* | (2009.01) |
| *H04W 24/08* | (2009.01) |
| *H04W 36/00* | (2009.01) |
| *H04W 72/044* | (2023.01) |
| *H04W 72/21* | (2023.01) |

(52) U.S. Cl.
CPC ......... *H04W 24/08* (2013.01); *H04W 72/046* (2013.01); *H04W 72/21* (2023.01); *H04W 36/0069* (2018.08)

(58) Field of Classification Search
CPC ........... H04W 72/0413; H04W 72/046; H04W 36/0069; H04W 36/06; H04W 76/19; H04B 7/0695; H04B 7/088
See application file for complete search history.

(56) References Cited

U.S. PATENT DOCUMENTS

| | | | | |
|---|---|---|---|---|
| 2016/0270112 | A1* | 9/2016 | Dinan | H04W 72/0413 |
| 2017/0374687 | A1* | 12/2017 | Lee | H04W 74/0833 |
| 2018/0138962 | A1* | 5/2018 | Islam | H04L 5/0032 |
| 2019/0053314 | A1 | 2/2019 | Zhou et al. | |
| 2019/0058517 | A1 | 2/2019 | Kang et al. | |
| 2019/0081753 | A1 | 3/2019 | Jung et al. | |
| 2019/0190582 | A1* | 6/2019 | Guo | H04B 7/0695 |
| 2019/0261244 | A1 | 8/2019 | Jung et al. | |
| 2019/0320333 | A1 | 10/2019 | Koskela et al. | |
| 2019/0320469 | A1* | 10/2019 | Huang | H04L 5/0053 |
| 2019/0356376 | A1 | 11/2019 | You et al. | |
| 2020/0177263 | A1 | 6/2020 | Zhang | |
| 2020/0177266 | A1* | 6/2020 | Kang | H04L 5/0092 |
| 2020/0236657 | A1* | 7/2020 | Zhang | H04W 74/006 |
| 2020/0305007 | A1* | 9/2020 | Chen | H04W 16/28 |
| 2020/0374960 | A1* | 11/2020 | Deenoo | H04W 72/14 |
| 2020/0389847 | A1 | 12/2020 | Deng et al. | |
| 2021/0021320 | A1 | 1/2021 | Koskela et al. | |
| 2021/0058129 | A1 | 2/2021 | Takeda et al. | |
| 2021/0084507 | A1 | 3/2021 | Takeda et al. | |
| 2021/0344405 | A1* | 11/2021 | Yuan | H04W 76/19 |
| 2022/0070053 | A1* | 3/2022 | Matsumura | H04B 7/088 |
| 2022/0109547 | A1 | 4/2022 | Svedman et al. | |

OTHER PUBLICATIONS

U.S. Appl. No. 62/720,938, filed Aug. 22, 2018 (Year: 2018).*
R1-1902408 3GPP TSG RAN WG1 Meeting #96, Athens, Greece, Feb. 25-Mar. 1, 2019, Source: Asia Pacific Telecom, Title: Enhancements on UL multi-beam operation.
R1-1902503 3GPP TSG RAN WG1 Meeting #96, Athens, Greece, Feb. 25-Mar. 1, 2019, Source: Intel Corporation, Title: On beam management enhancement.
R1-1902523 3GPP TSG RAN WG1 Meeting #96, Athens, Greece, Feb. 25-Mar. 1, 2019, Source: Panasonic, Title: On enhancements for multi-beam operations for NR MIMO in Rel. 16.
R1-1902529 3GPP TSG RAN WG1 Meeting #96, Athens, Greece, Feb. 25-Mar. 1, 2019, Source: Ericsson, Title: Enhancements to multi-beam operation.
R1-1902564 3GPP TSG RAN WG1 Meeting #96, Athens, Greece, Feb. 25-Mar. 1, 2019, Source: Nokia, Nokia Shanghai Bell, Title: Enhancements on multi-beam operation.
R1-1902615 3GPP TSG RAN WG1 Meeting #96, Athens, Greece, Feb. 25-Mar. 1, 2019, Source: InterDigital, Inc., Title: Enhancement for multi-beam uplink operation.
R1-1902630 3GPP TSG RAN WG1 Meeting #96, Athens, Greece, Feb. 25-Mar. 1, 2019, Source: China Telecom, Title: Enhancements on multi-beam operation for multi-panel transmission.
R1-1902687 3GPP TSG RAN WG1 Meeting #96, Athens, Greece, Feb. 25-Mar. 1, 2019, Source: NEC, Title: Discussion on multi-beam operation.
R1-1902704 3GPP TSG RAN WG1 Meeting #96, Athens, Greece, Feb. 25-Mar. 1, 2019, Source: OPPO, Title: Discussion on multi-beam operation enhancements.
R1-1902714 3GPP TSG RAN WG1 Meeting #96, Athens, Greece, Feb. 25-Mar. 1, 2019, Source: Spreadtrum Communications, Title: Discussion on multi-beam operation.
R1-1902768 3GPP TSG RAN WG1 Meeting #96, Athens, Greece, Feb. 25-Mar. 1, 2019, Source: Apple Inc., Title: Consideration on beam measurement and reporting enhancement.
R1-1902769 3GPP TSG RAN WG1 Meeting #96, Athens, Greece, Feb. 25-Mar. 1, 2019, Source: Apple Inc., Title: Considerations on separate DL and UL beam reporting.
R1-1902813 3GPP TSG RAN WG1 Meeting #96, Athens, Greece, Feb. 25-Mar. 1, 2019, Source: NTT Docomo, Inc., Title: Discussion on multi-beam enhancement.
R1-1902833 3GPP TSG RAN WG1 Meeting #96, Athens, Greece, Feb. 25-Mar. 1, 2019, Source: Mitsubishi Electric, Title: Views on multi-beam operation.
R1-1902849 3GPP TSG RAN WG1 Meeting #96, Athens, Greece, Feb. 25-Mar. 1, 2019, Source: Motorola Mobility, Lenovo, Title: Power control for multi-panel uplink transmission.
R1-1902866 3GPP TSG RAN WG1 Meeting #96, Athens, Greece, Feb. 25-Mar. 1, 2019, Source: Xiaomi, Title: Enhancements on beam management.
R1-1902954 3GPP TSG RAN WG1 Meeting #96, Athens, Greece, Feb. 25-Mar. 1, 2019, Source: KDDI, Title: Discussion on multi-beam operation.
R1-1902956 3GPP TSG RAN WG1 Meeting #96, Athens, Greece, Feb. 25-Mar. 1, 2019, Source: Ericsson, Title: Improvements to SRS-based UL beam selection.
R1-1902957 3GPP TSG RAN WG1 Meeting #96, Athens, Greece, Feb. 25-Mar. 1, 2019, Source: Ericsson, Title: Latency analysis of SCell BFR solutions.
R1-1902958 3GPP TSG RAN WG1 Meeting #96, Athens, Greece, Feb. 25-Mar. 1, 2019, Source: Ericsson, Title: On event-driven reporting for beam management.
R1-1902959 3GPP TSG RAN WG1 Meeting #96, Athens, Greece, Feb. 25-Mar. 1, 2019, Source: Ericsson, Title: Performance of beam selection based on L1-SINR.
R1-1902960 3GPP TSG RAN WG1 Meeting #96, Athens, Greece, Feb. 25-Mar. 1, 2019, Source: Ericsson, Title: Further simulation results for UL multi-panel transmission.
R1-1903044 3GPP TSG RAN WG1 Meeting #96, Athens, Greece, Feb. 25-Mar. 1, 2019, Source: Qualcomm Incorporated, Title: Enhancements on multi-beam operation.
R1-1903047 3GPP TSG RAN WG1 Meeting #96, Athens, Greece, Feb. 25-Mar. 1, 2019, Source: ASUS TeK, Title: Enhancements on multi-beam operation.
R1-1903090 3GPP TSG RAN WG1 Meeting #96, Athens, Greece, Feb. 25-Mar. 1, 2019, Source: Huawei, HiSilicon, Title: UL/DL BM for latency/overhead reduction.
R1-1903091 3GPP TSG RAN WG1 Meeting #96, Athens, Greece, Feb. 25-Mar. 1, 2019, Source: Huawei, HiSilicon, Title: Panel-based UL beam selection.
R1-1903092 3GPP TSG RAN WG1 Meeting #96, Athens, Greece, Feb. 25-Mar. 1, 2019, Source: Huawei, HiSilicon, Title: Beam measurement and reporting using L1-SINR.
R1-1903093 3GPP TSG RAN WG1 Meeting #96, Athens, Greece, Feb. 25-Mar. 1, 2019, Source: Huawei, HiSilicon, Title: Beam failure recovery for SCell.
R1-1903094 3GPP TSG RAN WG1 Meeting #96, Athens, Greece, Feb. 25-Mar. 1, 2019, Source: Huawei, HiSilicon, Title: Evaluation results of multi-beam operation.
R1-1903104 3GPP TSG RAN WG1 Meeting #96, Athens, Greece, Feb. 25-Mar. 1, 2019, Source: Huawei, HiSilicon, Title: Discussion on RAN2 impacts for NR-MIMO enhancements in Rel-16.
R1-1903106 3GPP TSG RAN WG1 Meeting #96, Athens, Greece, Feb. 25-Mar. 1, 2019, Source: Huawei, HiSilicon, Title: Evaluation methodology for multi-beam enhancements.
R1-1903159 3GPP TSG RAN WG1 Meeting #96, Athens, Greece, Feb. 25-Mar. 1, 2019, Source: Convida Wireless, Title: On beam failure recovery for SCell.

(56) References Cited

OTHER PUBLICATIONS

R1-1903461 3GPP TSG RAN WG1 Meeting #96, Athens, Greece, Feb. 25-Mar. 1, 2019, Source: Intel Corporation, Title: Summary on SCell BFR and L1-SINR.
Jun. 26, 2020—European Extended Search Report—EP 20156222.0.
R1-1900906 3GPP TSG RAN WG1 Ad-Hoc Meeting 1901, Taipei, Taiwan, Jan. 21-25, 2019, Source: Qualcomm Incorporated, Title: Enhancements on Multi-beam Operation.
R1-1901443 3GPP TSG RAN WG1 Ad-Hoc Meeting 1901, Taipei, Taiwan, Jan. 21-25, 2019, Source: Intel Corporation, Title: Summary on SCell BFR and L1-SINR based beam selection.
3GPP TS 38.211 V15.4.0 (Dec. 2018), Technical Specification, 3rd Generation Partnership Project; Technical Specification Group Radio Access Network; NR; Physical channels and modulation (Release 15).
3GPP TS 38.212 V15.4.0 (Dec. 2018), Technical Specification, 3rd Generation Partnership Project; Technical Specification Group Radio Access Network; NR; Multiplexing and channel coding (Release 15).
3GPP TS 38.213 V15.4.0 (Dec. 2018), Technical Specification, 3rd Generation Partnership Project; Technical Specification Group Radio Access Network; NR; Physical layer procedures for control (Release 15).
3GPP TS 38.214 V15.4.0 (Dec. 2018), Technical Specification, 3rd Generation Partnership Project; Technical Specification Group Radio Access Network; NR; Physical layer procedures for data (Release 15).
3GPP TS 38.300 V15.4.0 (Dec. 2018), Technical Specification, 3rd Generation Partnership Project; Technical Specification Group Radio Access Network; NR; NR and NG-RAN Overall Description; Stage 2 (Release 15).
3GPP TS 38.321 V15.4.0 (Dec. 2018), Technical Specification, 3rd Generation Partnership Project; Technical Specification Group Radio Access Network; NR; Medium Access Control (MAC) protocol specification (Release 15).
3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15).
38.213 V15.3.0 (Nov. 2018) 3GPP TSG-RAN WG1 Meeting #95, Spokane, USA, Nov. 12-16, 2018, Source: Nokia, Nokia Shanghai Bell, Title: CR on selection of RS to be included in set of q0.
R1-1808196 3GPP TSG RAN WG1 Meeting #94, Gothenburg, Sweden, Aug. 20-24, 2018, Source: ZTE, Title: Maintenance for beam management.
R1-1808264 3GPP TSG RAN WG1 Meeting #94, Gothenburg, Sweden, Aug. 20-24, 2018, Source: MediaTek Inc., Title: Remaining Issues for Beam Management and Beam Failure Recovery.
R1-1810214 3GPP TSG-RAN WG1 Meeting #94bis, Chengdu, PR China, Oct. 8-12, 2018, Source: ZTE, Title: Maintenance for beam management.
R1-1810366 3GPP TSG-RAN WG1 Meeting #94bis, Chengdu, PR China, Oct. 8-12, 2018, Source: vivo, Title: Maintenance for beam management.
R1-1810427 3GPP TSG-RAN WG1 Meeting #94bis, Chengdu, PR China, Oct. 8-12, 2018, Source: MediaTek Inc., Title: Maintenance for beam management.
R1-1810480 3GPP TSG-RAN WG1 Meeting #94bis, Chengdu, PR China, Oct. 8-12, 2018, Source: Fujitsu, Title: Remaining PUCCH spatial filtering issues on beam failure recovery.
R1-1810518 3GPP TSG-RAN WG1 Meeting #94bis, Chengdu, PR China, Oct. 8-12, 2018, Source: CATT, Title: Remaining issues on beam management.
R1-1810751 3GPP TSG-RAN WG1 Meeting #94bis, Chengdu, PR China, Oct. 8-12, 2018, Source: Intel Corporation, Title: Remaining issues on beam management.
R1-1810839 3GPP TSG-RAN WG1 Meeting #94bis, Chengdu, PR China, Oct. 8-12, 2018, Source: Samsung, Title: Remaining issues on beam management.
R1-1811352 3GPP TSG-RAN WG1 Meeting #94bis, Chengdu, PR China, Oct. 8-12, 2018, Source: NTT Docomo, Title: Remaining issues on beam management.
R1-1811633 3GPP TSG-RAN WG1 Meeting #94bis, Chengdu, PR China, Oct. 8-12, 2018, Source: Qualcomm Incorporated, Title: Beam management for NR.
R1-1812266 3GPP TSG RAN WG1 Meeting #95, Spokane, USA, Nov. 12-16, 2018, Source: ZTE, Title: Discussion on draft CRs on beam management.
R1-1812285 3GPP TSG RAN WG1 Meeting #95, Spokane, USA, Nov. 12-16, 2018, Source: vivo, Title: Draft CR on beam management.
R1-1812443 3GPP TSG RAN WG1 Meeting #95, Spokane, USA, Nov. 12-16, 2018, Source: Fujitsu, Title: Discussion on PUCCH spatial filtering on beam failure recovery.
R1-1812957 3GPP TSG RAN WG1 Meeting #95, Spokane, USA, Nov. 12-16, 2018, Source: Samsung, Title: Remaining issues on beam management.
R1-1813299 3GPP TSG RAN WG1 Meeting #95, Spokane, USA, Nov. 12-16, 2018, Source: NTT Docomo, Title: Remaining issues on beam management.
R1-1813396 3GPP TSG RAN WG1 Meeting #95, Spokane, USA, Nov. 12-16, 2018, Source: Qualcomm Incorporated, Title: Beam management for NR.
R1-1813486 3GPP TSG RAN WG1 Meeting #95, Spokane, USA, Nov. 12-16, 2018, Source: Nokia, Nokia Shanghai Bell, Title: Maintenance for Beam Management.
R1-1900450 3GPP TSG RAN WG1 Ad-Hoc Meeting 1901, Taipei, Taiwan, Jan. 21-25, 2019, Source: AT&T, Title: Enhancements on Multi-Beam Operation for NR.
R1-1901077 3GPP TSG RAN WG1 Ad-Hoc Meeting 1901, Taipei, Taiwan, Jan. 21-25, 2019, Source: Samsung, Title: Enhancements on multi-beam operations.
R1-1901154 3GPP TSG RAN WG1 Ad-Hoc Meeting 1901, Taipei, Taiwan, Jan. 21-25, 2019, Source: ASUS Tek, Title: Enhancements on multi-beam operation.
R1-1901164 3GPP TSG RAN WG1 Ad-Hoc Meeting 1901, Taipei, Taiwan, Jan. 21-25, 2019, Source: Ericsson, Title: Enhancements to multi-beam operation.
R1-1901568 3GPP TSG RAN WG1 Meeting #96, Athens, Greece, Feb. 25-Mar. 1, 2019, Source: Huawei, HiSilicon, Title: Enhancements on multi-beam operation.
R1-1901635 3GPP TSG RAN WG1 Meeting #96, Athens, Greece, Feb. 25-Mar. 1, 2019, Source: ZTE, Title: Enhancements on multi-beam operation.
R1-1901639 3GPP TSG RAN WG1 Meeting #96, Athens, Greece, Feb. 25-Mar. 1, 2019, Source: ZTE, Title: Additional considerations on beam management for multi-TRP.
R1-1901640 3GPP TSG RAN WG1 Meeting #96, Athens, Greece, Feb. 25-Mar. 1, 2019, Source: ZTE, Title: Additional details of latency and overhead reduction for beam management.
R1-1901641 3GPP TSG RAN WG1 Meeting #96, Athens, Greece, Feb. 25-Mar. 1, 2019, Source: ZTE, Title: Details and evaluation on UL simultaneous transmission for multi-panel operation.
R1-1901642 3GPP TSG RAN WG1 Meeting #96, Athens, Greece, Feb. 25-Mar. 1, 2019, Source: ZTE, Title: Details and evaluation on L1-SINR measurement and reporting.
R1-1901643 3GPP TSG RAN WG1 Meeting #96, Athens, Greece, Feb. 25-Mar. 1, 2019, Source: ZTE, Title: Discussion on UL power control for multi-panel operation.
R1-1901703 3GPP TSG RAN WG1 Meeting #96, Athens, Greece, Feb. 25-Mar. 1, 2019, Source: vivo, Title: Further discussion on multi-beam operation.
R1-1901790 3GPP TSG RAN WG1 Meeting #96, Athens, Greece, Feb. 25-Mar. 1, 2019, Source: MediaTek Inc., Title: Enhancements on multi-beam operations.
R1-1901904 3GPP TSG RAN WG1 Meeting #96, Athens, Greece, Feb. 25-Mar. 1, 2019, Source: AT&T, Title: Enhancements on multi-beam operation.
R1-1902020 3GPP TSG RAN WG1 Meeting #96, Athens, Greece, Feb. 25-Mar. 1, 2019, Source: CATT, Title: Enhancements on multi-beam operation.

(56) References Cited

OTHER PUBLICATIONS

R1-1902074 3GPP TSG RAN WG1 Meeting #96, Athens, Greece, Feb. 25-Mar. 1, 2019, Source: Fujitsu, Title: Enhancements on multi-beam operation.

R1-1902092 3GPP TSG RAN WG1 Meeting #96, Athens, Greece, Feb. 25-Mar. 1, 2019, Source: LG Electronics, Title: Discussion on multi-beam operations and enhancements.

R1-1902095 3GPP TSG RAN WG1 Meeting #96, Athens, Greece, Feb. 25-Mar. 1, 2019, Source: LG Electronics, Title: Evaluation and analysis on simultaneous multi-panel Tx.

R1-1902122 3GPP TSG RAN WG1 Meeting #96, Athens, Greece, Feb. 25-Mar. 1, 2019, Source: Fraunhofer IIS, Fraunhofer HHI, Title: Enhancements on UE multi-beam operation.

R1-1902162 3GPP TSG RAN WG1 Meeting #96, Athens, Greece, Feb. 25-Mar. 1, 2019, Source: Lenovo, Motorola Mobility, Title: Discussion of multi-beam operation.

R1-1902184 3GPP TSG RAN WG1 Meeting #96, Athens, Greece, Feb. 25-Mar. 1, 2019, Source: Sony, Title: Enhancements on multi-beam operation.

R1-1902306 3GPP TSG RAN WG1 Meeting #96, Athens, Greece, Feb. 25-Mar. 1, 2019, Source: Samsung, Title: Enhancements on multi-beam operation.

R1-1902315 3GPP TSG RAN WG1 Meeting #96, Athens, Greece, Feb. 25-Mar. 1, 2019, Source: Samsung, Title: Evaluation on SINR metrics for beam selection.

R1-1902339 3GPP TSG RAN WG1 Meeting #96, Athens, Greece, Feb. 25-Mar. 1, 2019, Source: CMCC, Title: Enhancements on multi-beam operation.

Jung et al (U.S. Appl. No. 62/631,627, filed Feb. 16, 2018) (Year:2018).

U.S. Appl. No. 62/790,952, filed Jan. 10, 2019 (Year: 2019).

R1-19000979 3GPP TSG RAN WG1 Ad-Hoc Meeting 1901, Taipei, Taiwan, Jan. 21-25, 2019, Source: NTT DOCOMO, Inc., Title: Discussion on multi-beam enhancement.

Mar. 1, 2025—European Office Action—EP App. No. 20156222.0.

* cited by examiner

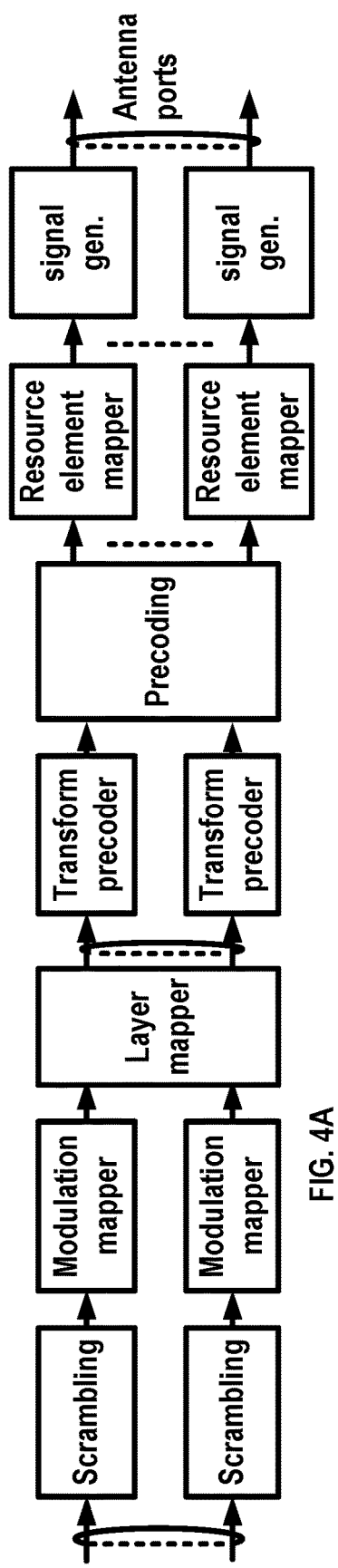
FIG. 4A
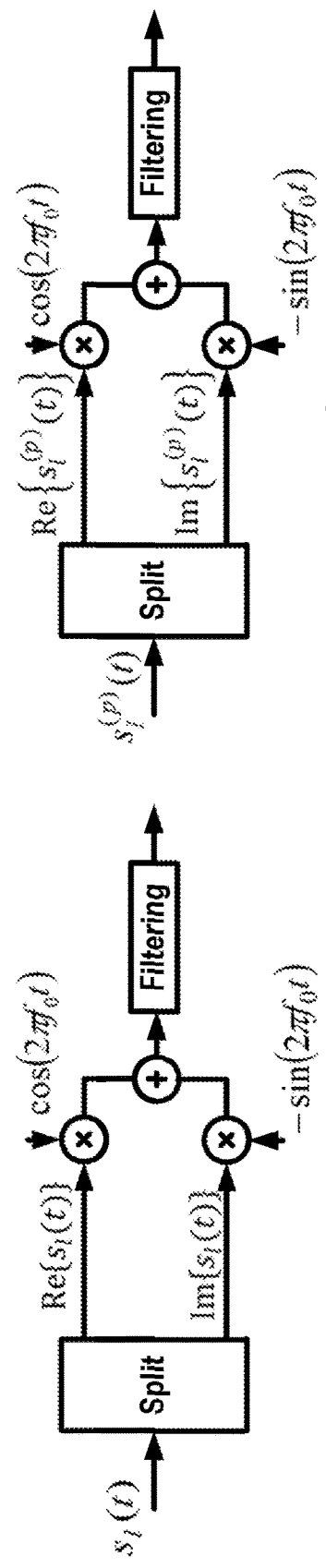
FIG. 4B
FIG. 4D
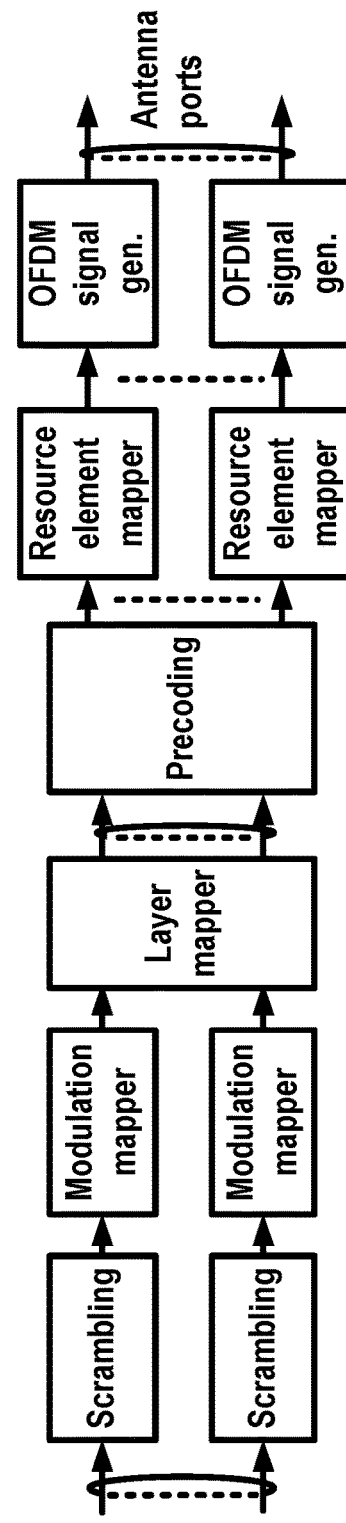
FIG. 4C
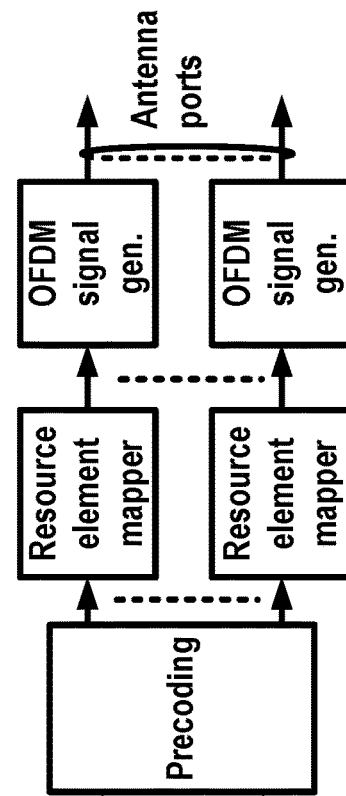

FAILURE RECOVERY AND BEAM SELECTION IN WIRELESS COMMUNICATIONS

CROSS-REFERENCE TO RELATED APPLICATIONS

This application claims the benefit of U.S. Provisional Application No. 62/802,896, titled "Beam Failure Recovery Procedure in Secondary Cells" and filed on Feb. 8, 2019, and U.S. Provisional Application No. 62/824,717, titled "Beam Failure Recovery Procedure in New Radio" and filed on Mar. 27, 2019. Each of the above-referenced applications is hereby incorporated by reference in its entirety.

BACKGROUND

Wireless communications may use one or more beams and/or other wireless resources. A base station and/or a wireless device may experience a failure of one or more beams or resources. A beam failure recovery procedure may be performed in response to a failure of one or more beams. Communications between the base station and the wireless device may experience problems resulting from inefficient controls associated with one or more beams.

SUMMARY

The following summary presents a simplified summary of certain features. The summary is not an extensive overview and is not intended to identify key or critical elements.

Wireless communications are described. A wireless device may perform a failure recovery procedure associated with one or more resources. The wireless device may use a beam failure recovery (BFR) procedure to address one or more beam failures associated with one or more cells (e.g., one or more secondary cells). The wireless device may determine/select a suitable candidate beam (and/or a candidate beam reference signal) for secondary cell(s). The wireless device may send/transmit an uplink signal associated with failure recovery (e.g., BFR) for the one or more cells (e.g., secondary cell(s)). The beam/resource(s) used for the uplink signal transmission (e.g., via another cell) may not be suitable for an uplink channel transmission via a secondary cell, for example, due to different channel environments. The wireless device may select/determine a beam /resource(s) for the uplink channel transmission via the secondary cell, for example, based on the suitable candidate beam (and/or the candidate beam reference signal), until a new uplink channel configuration/activation is received. A wireless device may select a default set of candidate beams for a BFR procedure, for example, if the wireless device does not receive indications of candidate beams to be used for the BFR procedure. The wireless device may select a beam, from the default set of candidate beams, for communicating with the base station. Efficient determination/selection of the suitable beam may avoid/reduce potential communication problems in wireless communications.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

DETAILED DESCRIPTION

Figure 1:
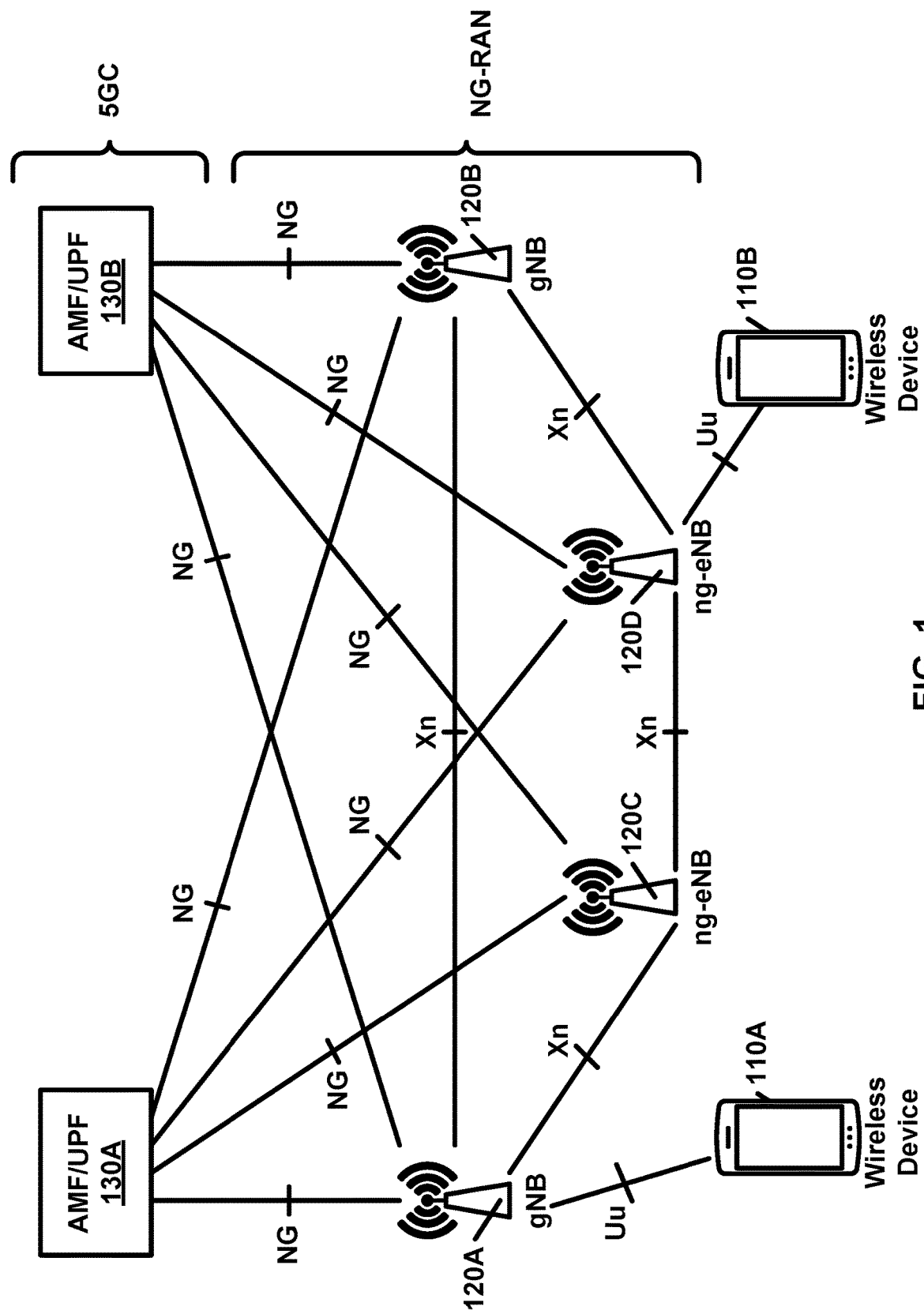
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to BFR procedures in multicarrier communication systems.

The following acronyms are used throughout the drawings and/or descriptions, and are provided below for convenience although other acronyms may be introduced in the detailed description:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BFR Beam Failure Recovery
BLER Block Error Rate
BPSK Binary Phase Shift Keying
BSR Buffer Status Report
BWP Bandwidth Part
CA Carrier Aggregation
CC Component Carrier
CCCH Common Control CHannel
CDMA Code Division Multiple Access
CN Core Network
CORESET Control Resource Set
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCH Logical Channel
LCID Logical Channel Identifier
LTE Long Term Evolution
MAC Medium Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QCLed Quasi-Co-Located
QCL Quasi-Co-Location QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG. Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SINR Signal-to-Interference-plus-Noise Ratio
SMF Session Management Function
SN Secondary Node
SpCell Special Cell
SR Scheduling Request
SRB Signaling Radio Bearer
SRS Sounding Reference Signal
SS Synchronization Signal
SSB Synchronization Signal Block
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TCI Transmission Configuration Indication
TDD Time Division Duplex
TDMA Time Division Multiple Access
TRP Transmission and Receiving Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multihomed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intrasystem and inter-system mobility, access authentication, access authorization including check of roaming rights, mobility management control (e.g., subscription and/or policies), support of network slicing, and/or Session Management Function (SMF) selection.

Figure 2A:
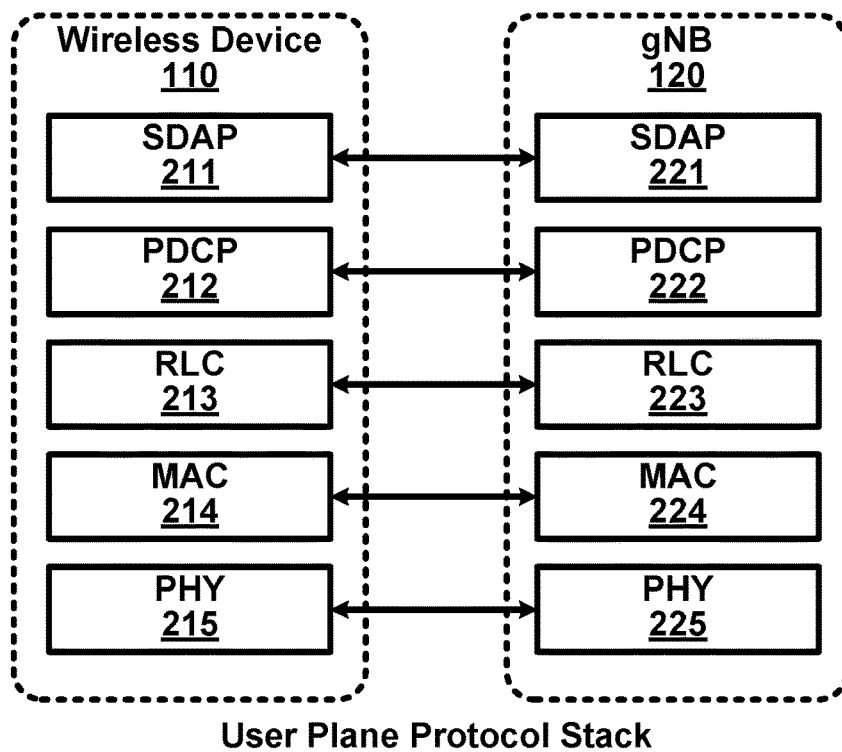
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Medium Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
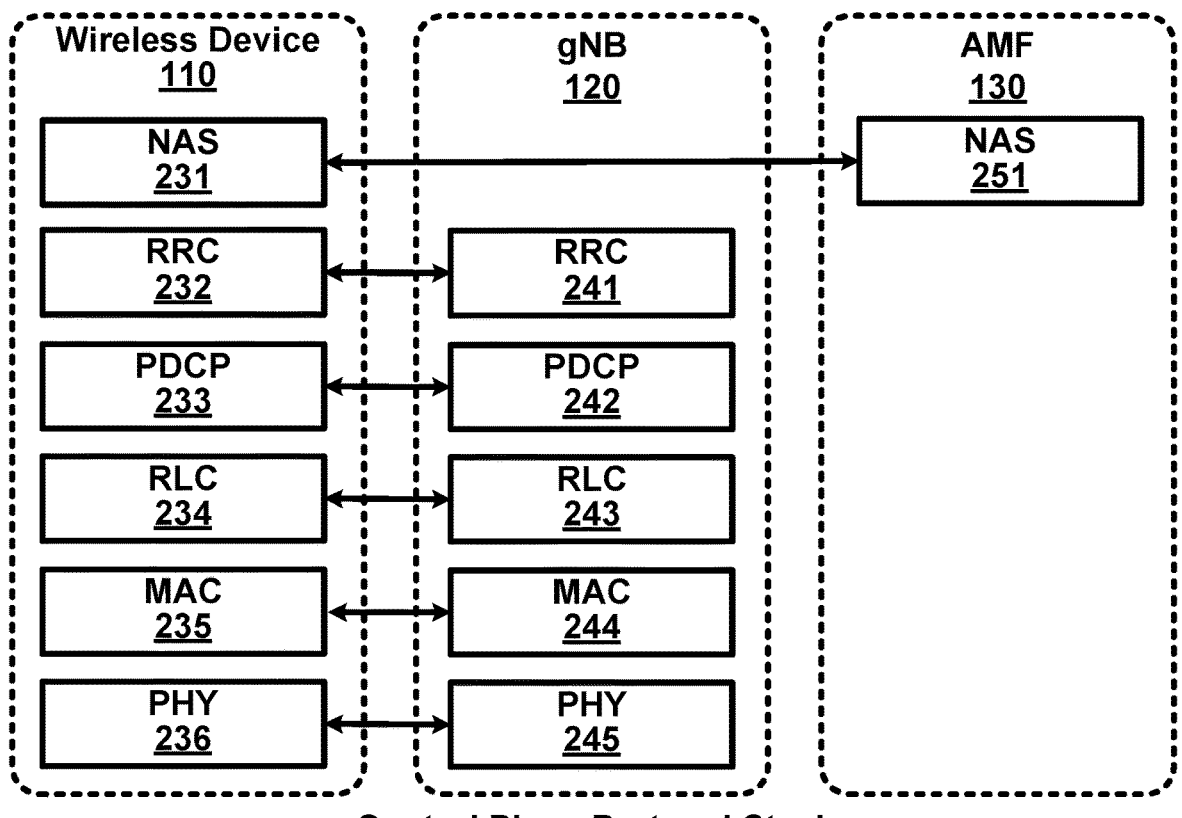
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC subheader in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

For example, a MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

A MAC subheader may comprise an eight-bit L field. The LCID field may have six bits in length, and the L field may have eight bits in length. A MAC subheader may comprise a sixteen-bit L field. The LCID field may be six bits in length, and the L field may be sixteen bits in length.

A MAC subheader may comprise: an R field with two bits in length; and an LCID field with multiple bits in length, when the MAC subheader corresponds to a fixed sized MAC CE, or padding. The LCID field may have six bits in length, and the R field may have two bits in length.

DL MAC PDU, multiple MAC CEs may be placed together. A MAC subPDU comprising MAC CE may be placed before any MAC subPDU comprising a MAC SDU, or a MAC subPDU comprising padding.

UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs that indicate one or more timing advance values for one or more Timing Advance Groups (TAGs).

Figure 3:
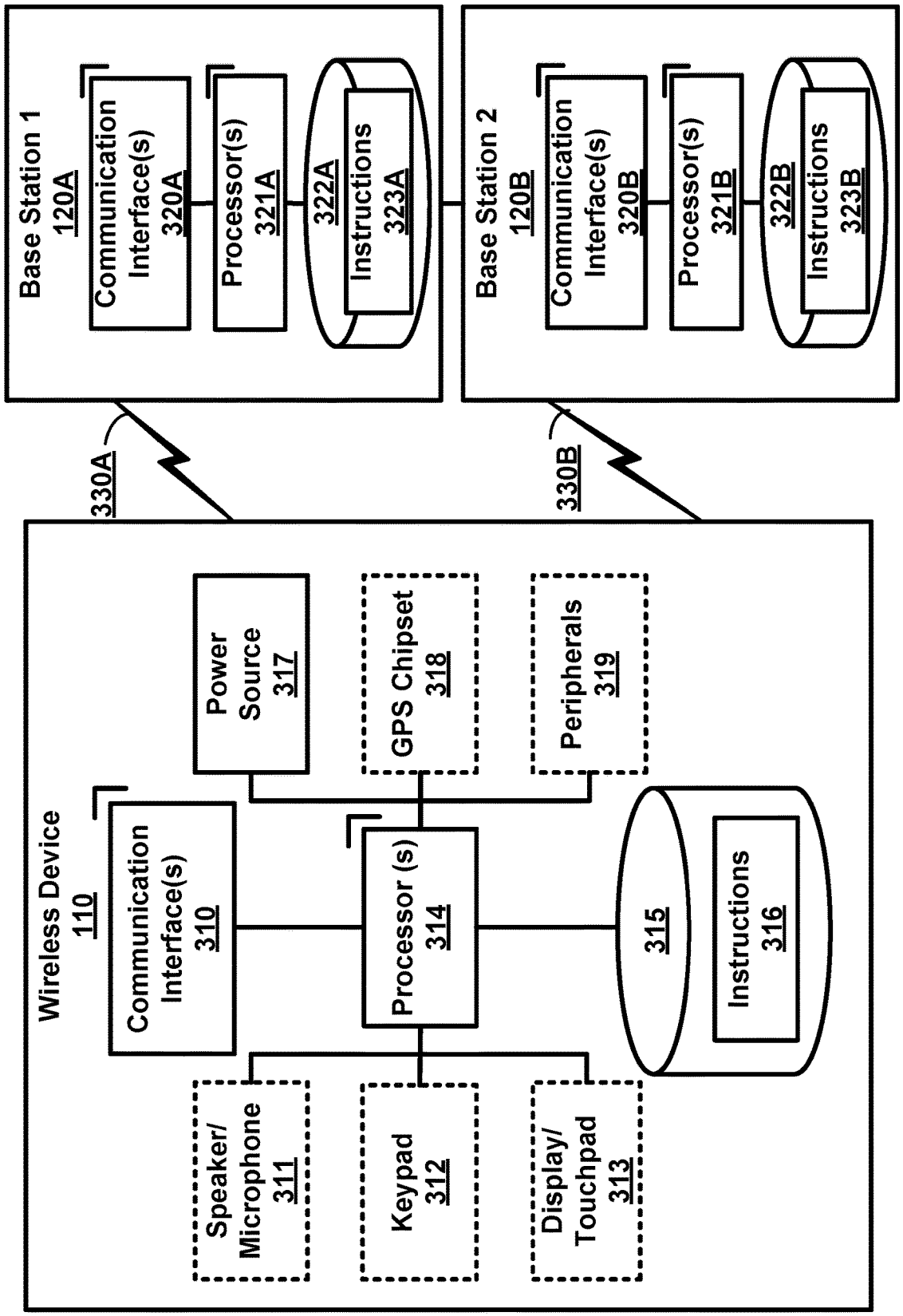
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signaling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection. One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation. A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g., AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
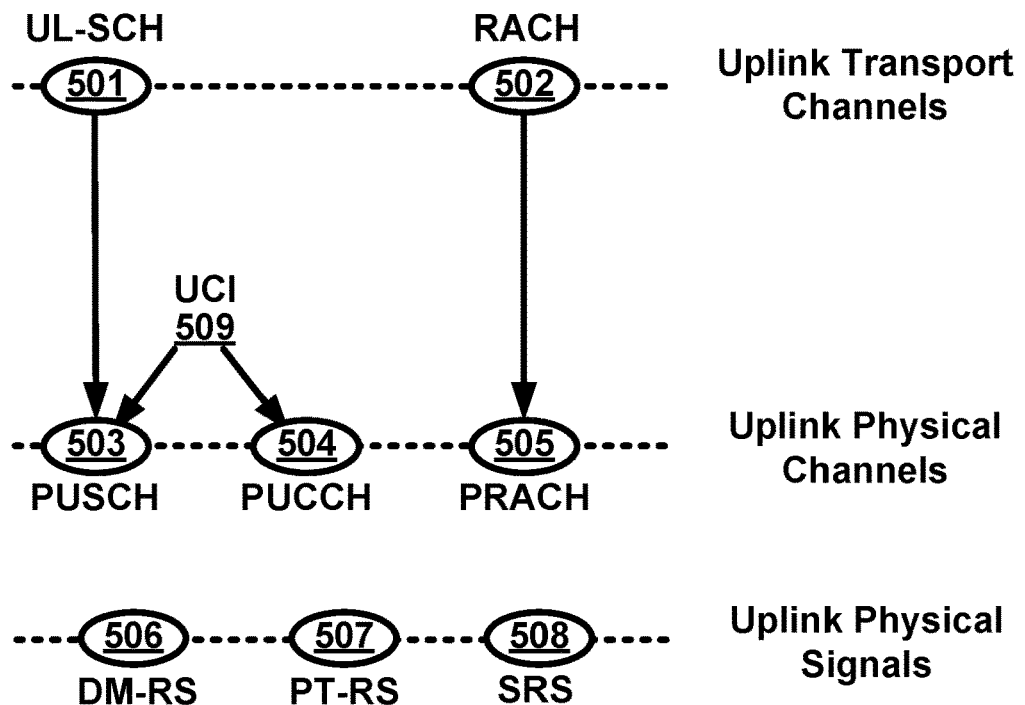
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DM-RS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
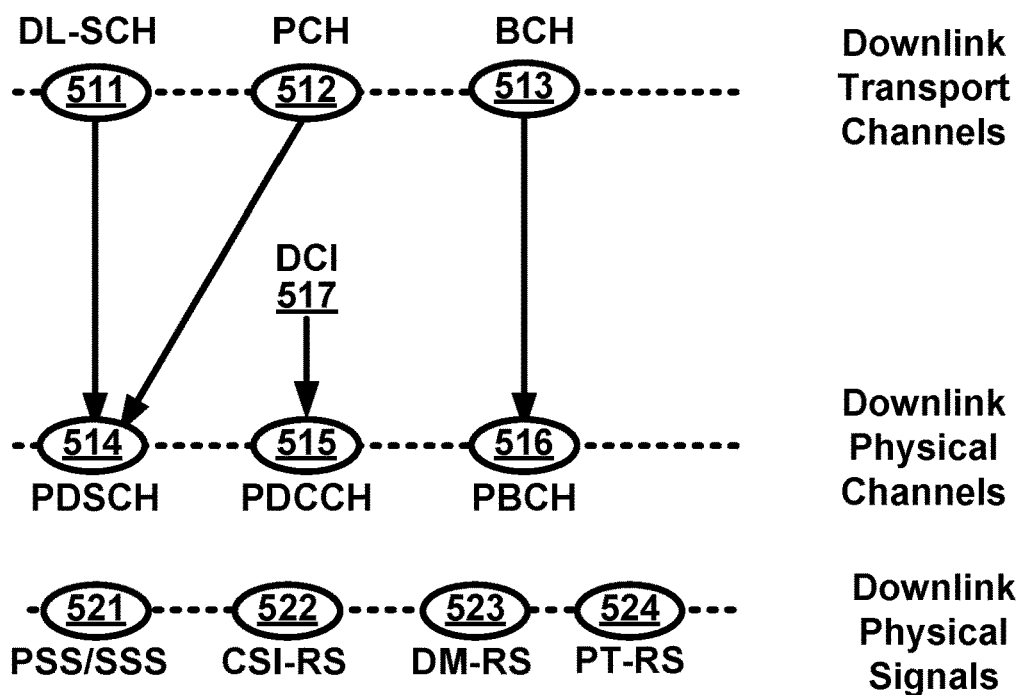
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. A UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. A DM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DM-RS port and a PT-RS port. A number of PT-RS ports may be less than a number of DM-RS ports in a scheduled resource. The downlink PT-RS 524 may be confined in the scheduled time/frequency duration for a wireless device.

Figure 6:
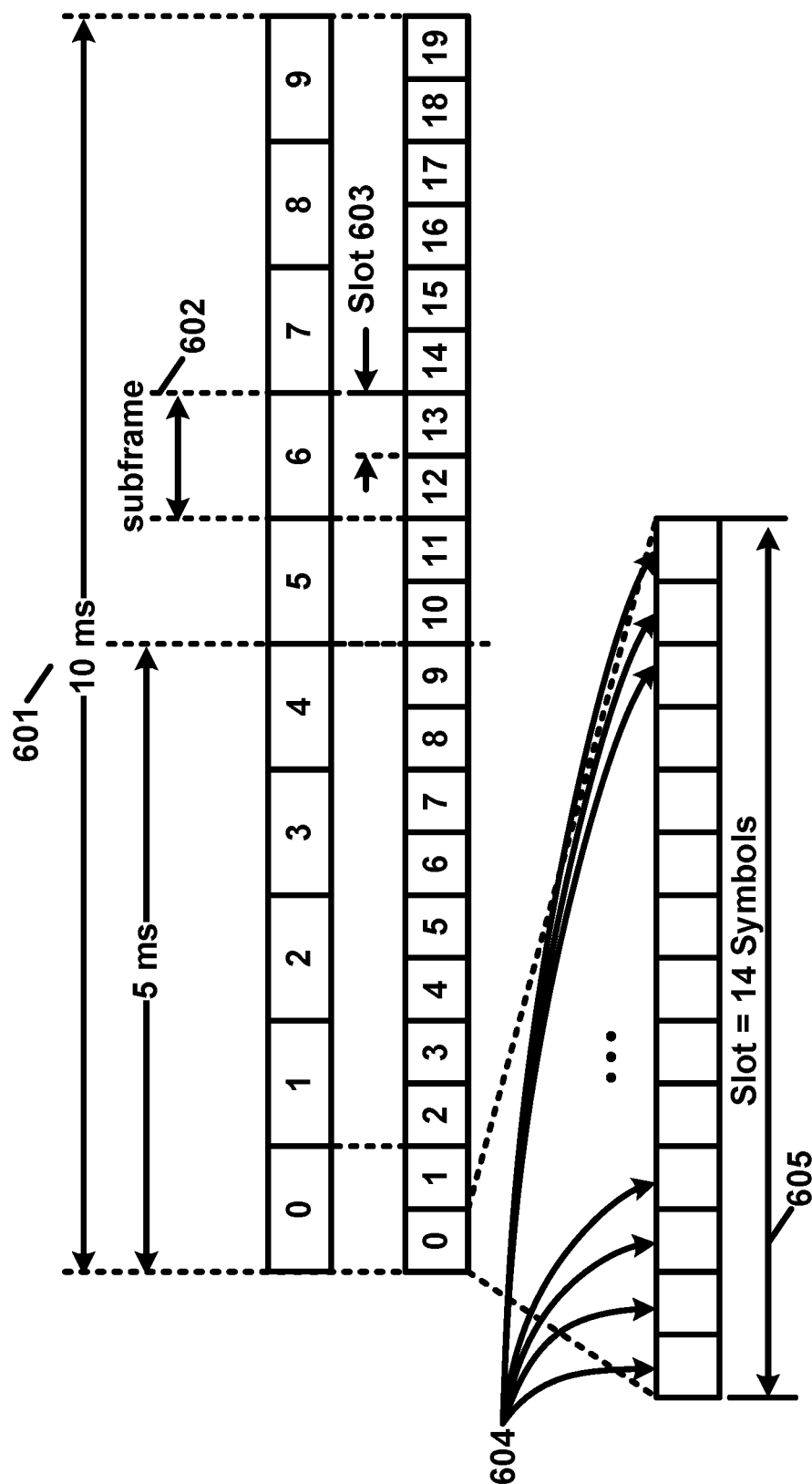
FIG. 6 shows an example transmission time and/or reception time for a carrier.

FIG. 6 shows an example transmission time and reception time, as well as an example frame structure, for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms). FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
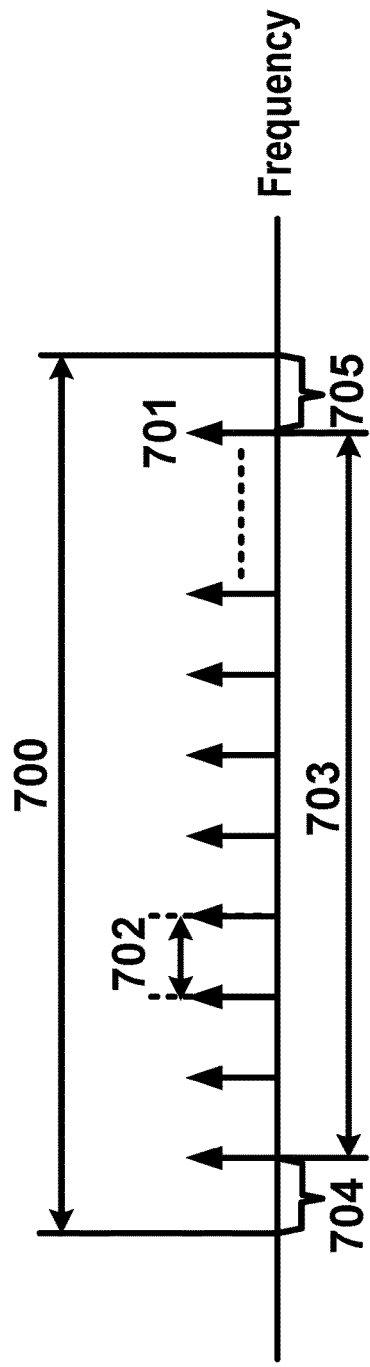
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
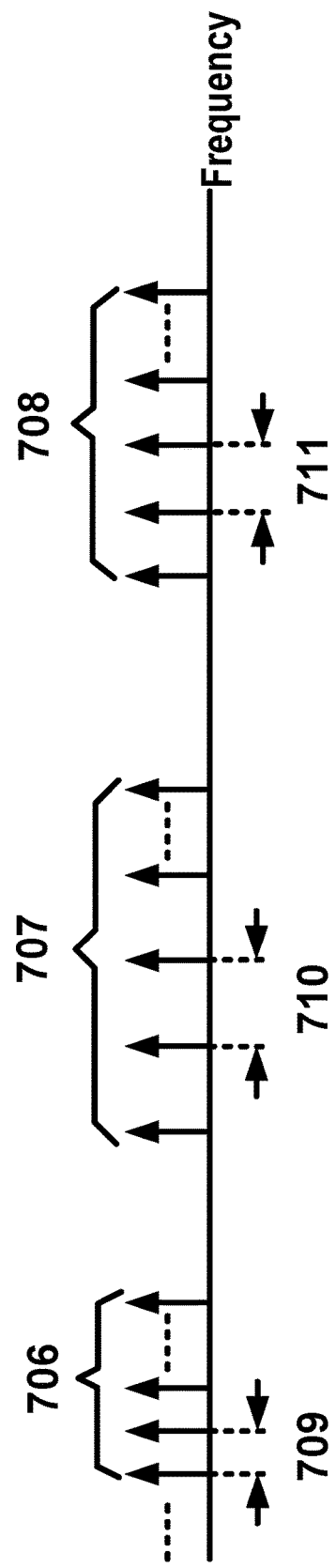

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
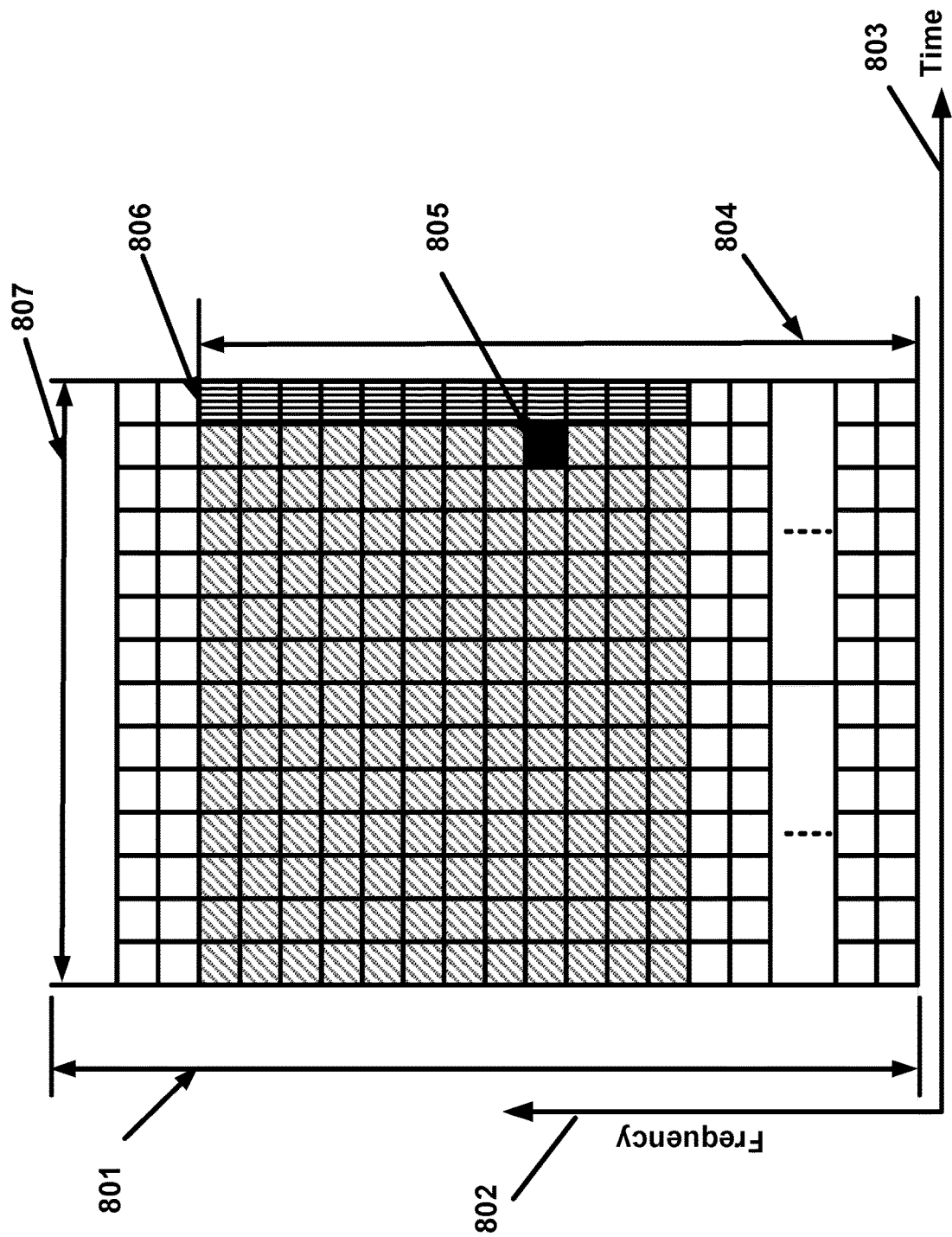
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol (s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
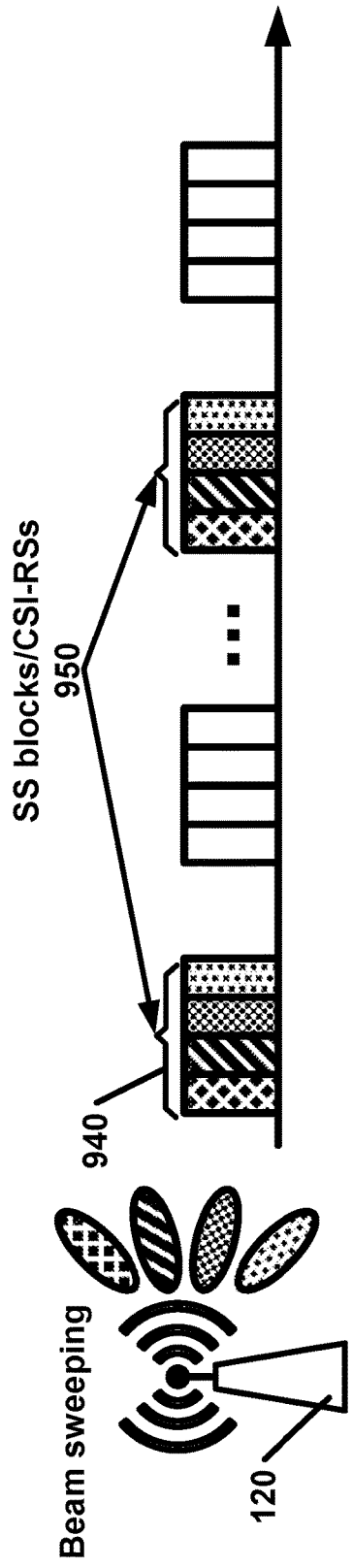
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
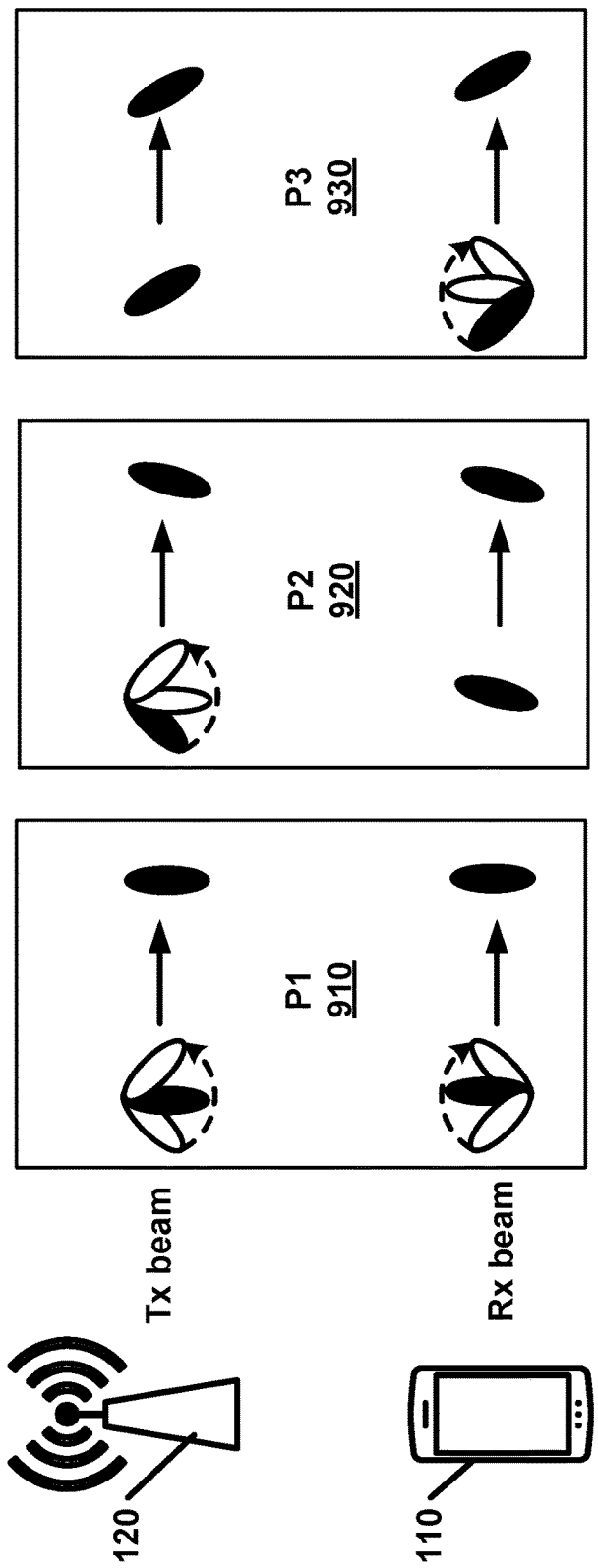
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth(s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
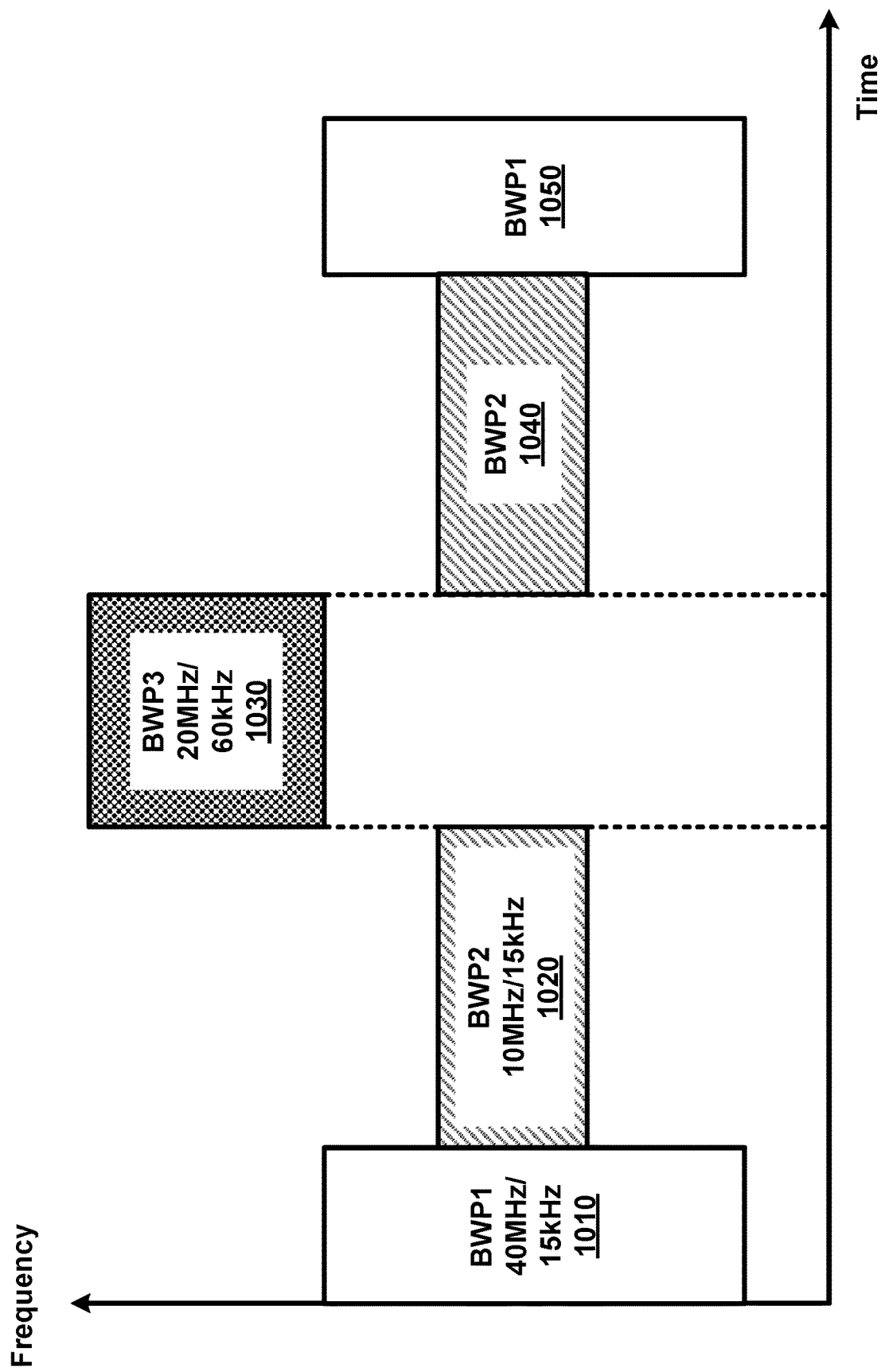
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a CORESETs for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for a UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
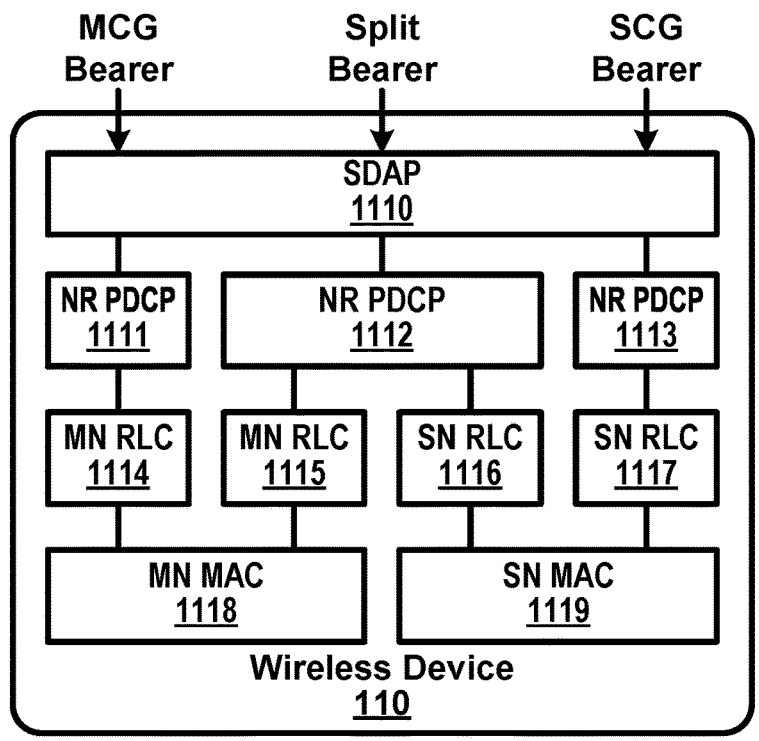
FIG. 11A and FIG. 11B show examples of multi connectivity.
Figure 11B:
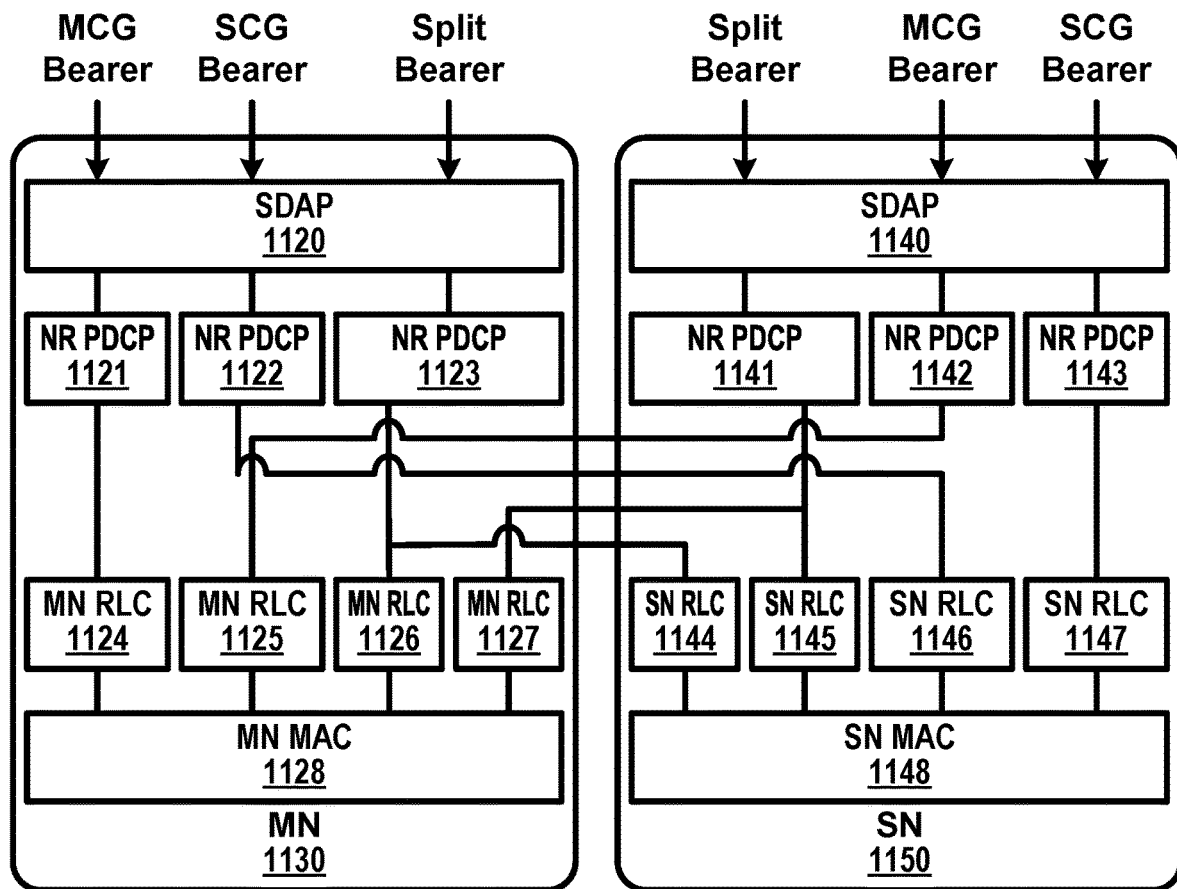

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1119).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
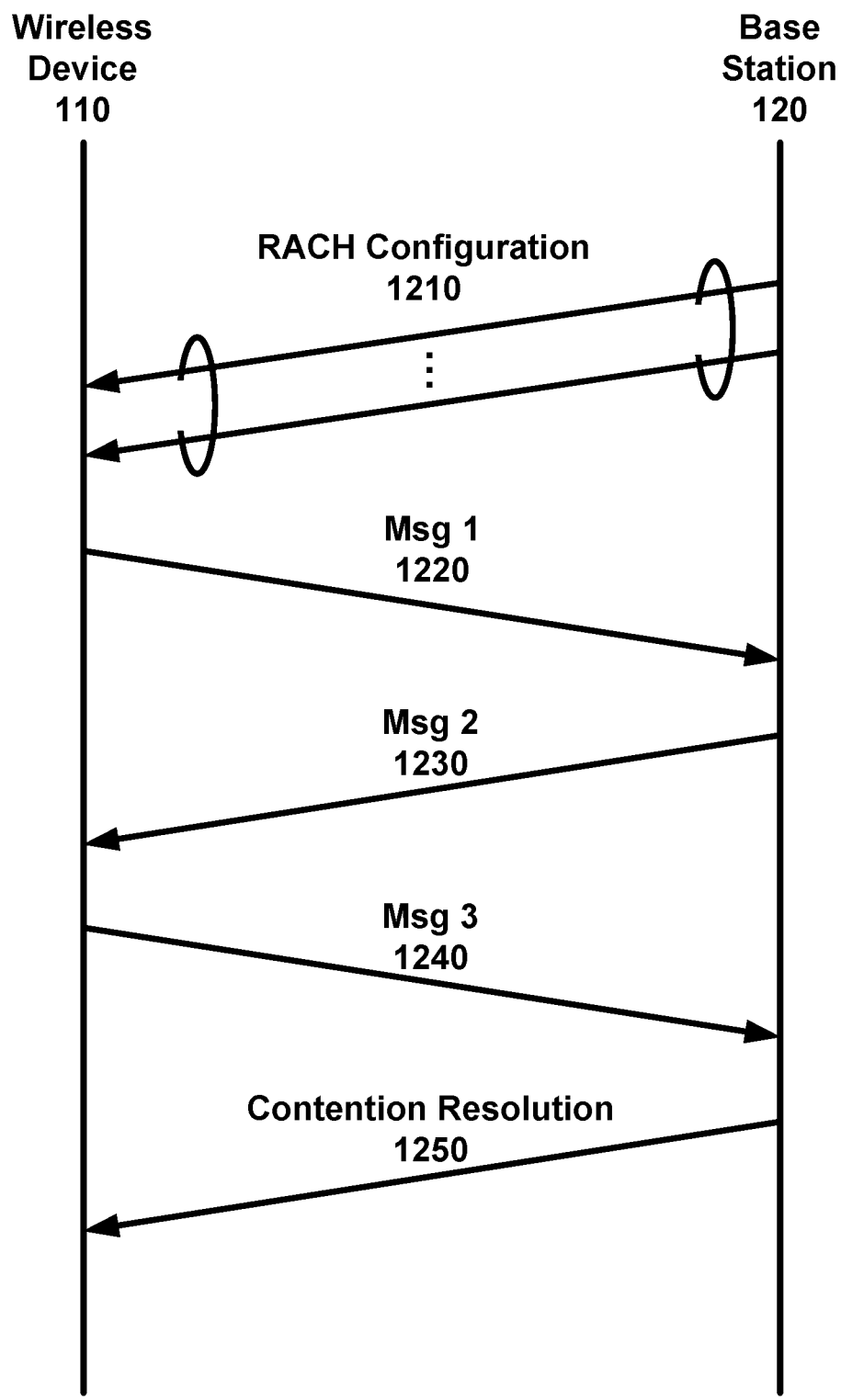
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information.

A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg2 1230 transmissions, one or more Msg3 1240 transmissions, and contention resolution 1250. A contention free random access procedure may comprise one or more Msg 1 1220 transmissions and one or more Msg2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg1 1220 and Msg3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a BFR request and corresponding PRACH resource(s) (e.g., if any), a time window to monitor RA response(s), a time window to monitor response(s) on a BFR request, and/or a contention resolution timer.

The Msg 1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a BFR request associated with at least one of SS blocks and/or CSI-RSs. A wireless device may select a random access preamble index corresponding to a selected SS block or a CSI-RS from a set of one or more random access preambles for a BFR request, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a BFR request. The wireless device may determine an RA-RNTI at least based on an index of a first OFDM symbol, an index of a first slot of a selected PRACH occasions, and/or an uplink carrier index for a transmission of Msg 1 1220.

A wireless device may receive, from a base station, a random access response, Msg 2 1230. The wireless device may start a time window (e.g., ra-ResponseWindow) to monitor a random access response. For a BFR procedure, the base station may configure the wireless device with a different time window (e.g., bfr-ResponseWindow) to monitor response to on a BFR request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a BFR request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention-free random access procedure is triggered for a BFR request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg3 1240 may be provided by at least one higher layer (e.g., RRC) parameter. The wireless device may send (e.g., transmit) a random access preamble via a PRACH, and Msg3 1240 via PUSCH, on the same cell. A base station may indicate an UL BWP for a PUSCH transmission of Msg3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg3 1250, the wireless device may determine that the contention resolution (e.g., comprising contention resolution 1250) is successful and/or the wireless device may determine that the random access procedure is successfully completed.

Figure 13:
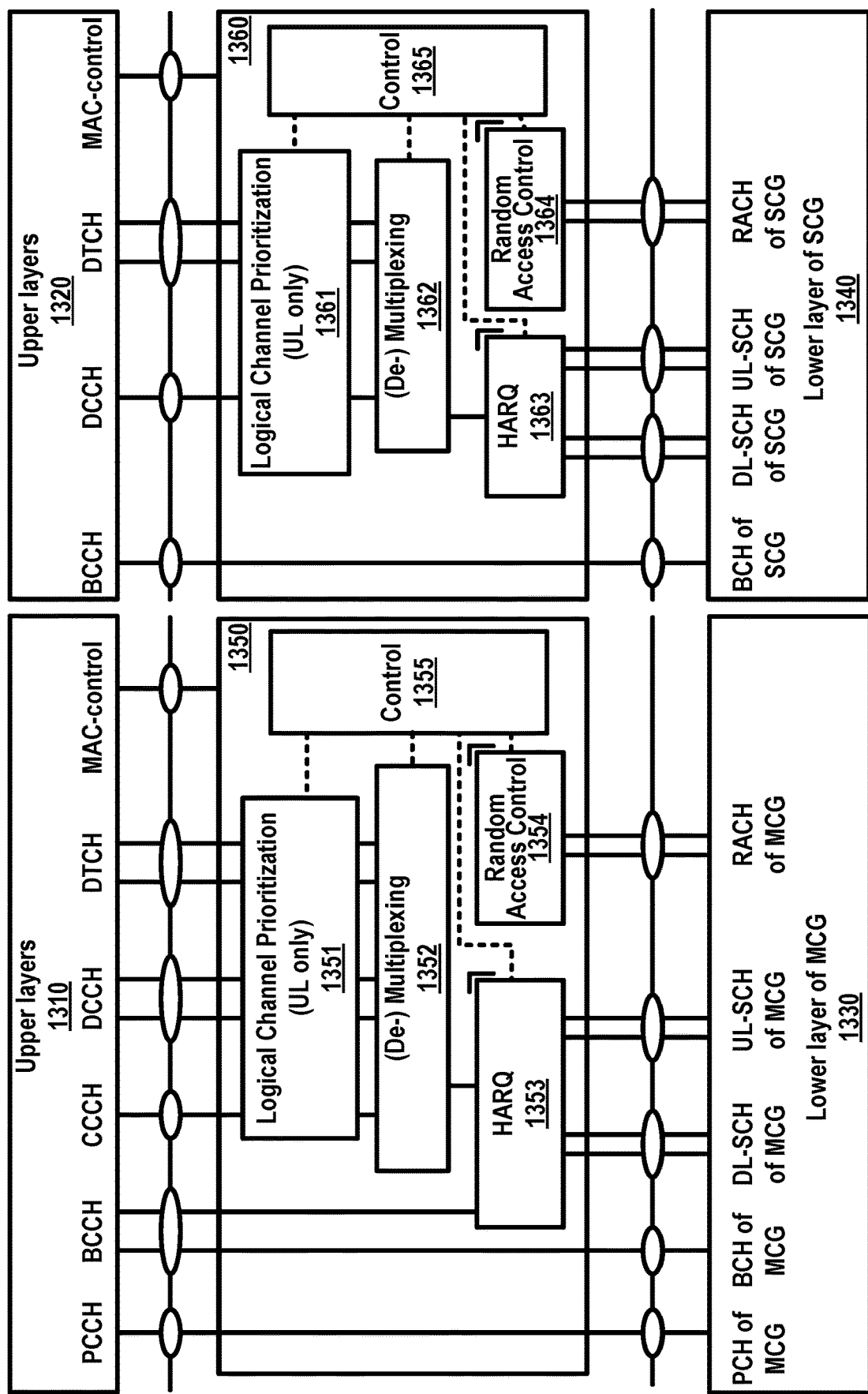
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. A UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
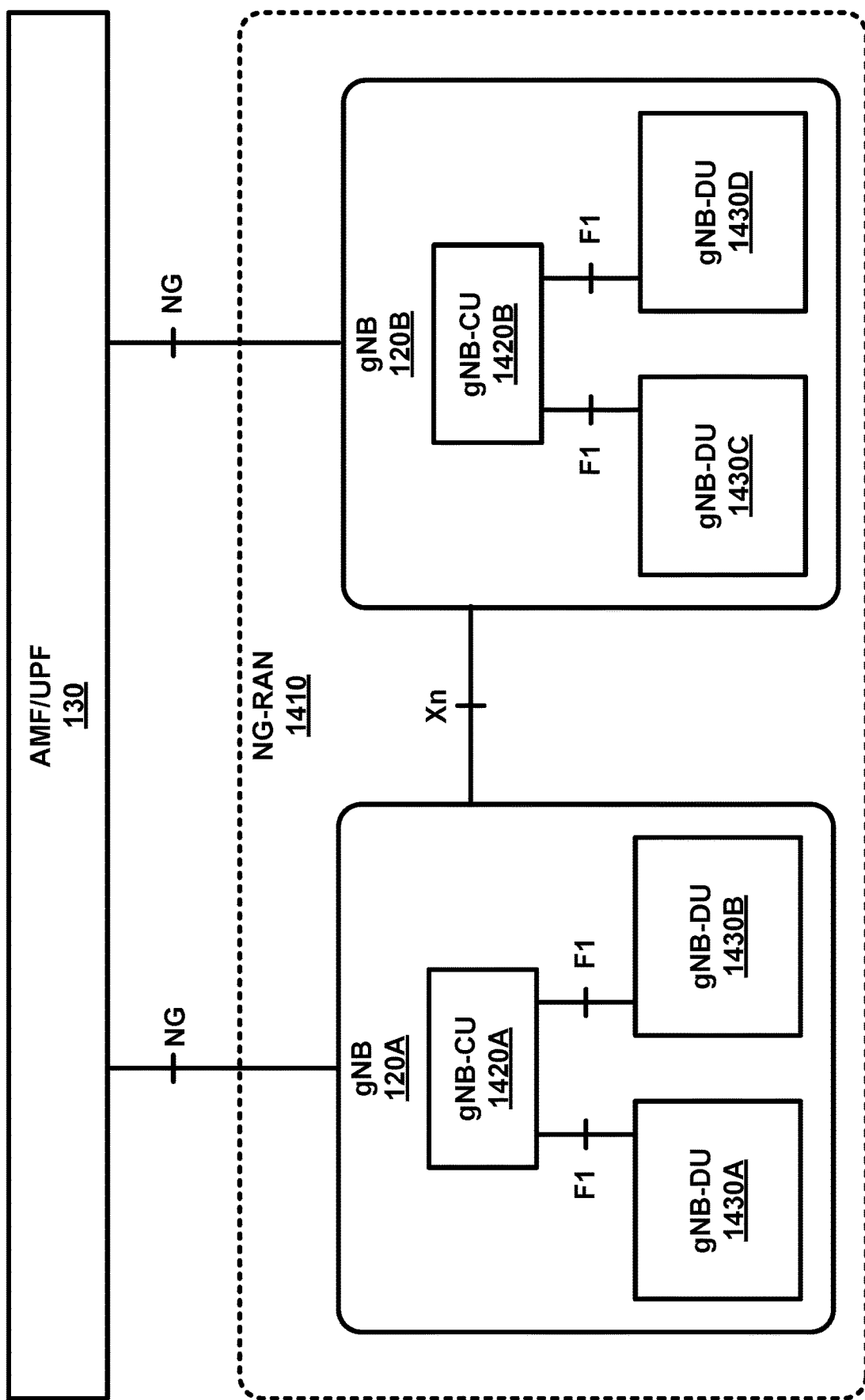
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
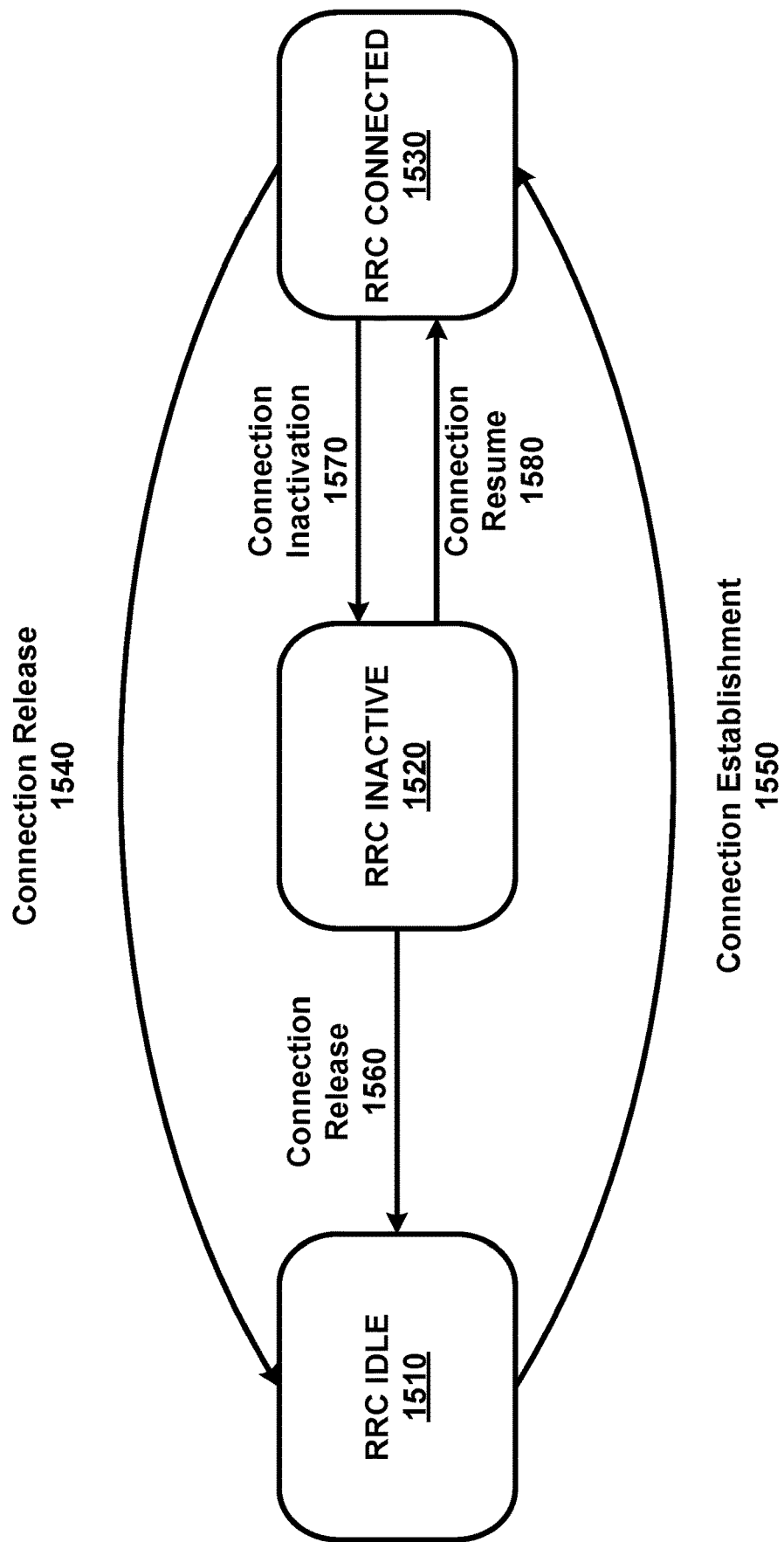
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) one or more packets (e.g., PDUs, MAC packets, MAC PDUs, etc.) to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may stop a BWP inactivity timer associated with the activated SCell, for example, after or in response to deactivating the activated SCell. The wireless device may deactivate any active BWP associated with the activated SCell, for example, after or in response to deactivating the activated SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

An SCell activation/deactivation MAC CE may comprise, for example, one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

An SCell Activation/Deactivation MAC CE may comprise, for example, any size such as any quantity of octets (e.g., four octets). A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A wireless device may receive states or state information (e.g., higher layer parameter TCI-States), for example, for one or more PDCCH receptions. The higher layer parameter TCI-States may comprise/indicate/contain a single TCI state. The wireless device may assume/determine that the DM-RS antenna port associated with the PDCCH receptions is quasi co-located with the one or more DL RS indicated/configured by the single TCI state, for example, if the higher layer parameter TCI-States comprises/indicates the single TCI state.

A base station may indicate, to a wireless device, a TCI state for PDCCH reception for a CORESET of a serving cell by sending, for example, a TCI state indication for a wireless device-specific PDCCH MAC CE. A wireless device (e.g., a MAC entity of a wireless device) may indicate to lower layers (e.g., PHY) information regarding the TCI state indication for the wireless device-specific PDCCH MAC CE, for example, if the wireless device (e.g., MAC entity) receives a TCI state indication for the wireless device-specific PDCCH MAC CE on or for a serving cell.

A TCI state indication for the wireless device-specific PDCCH MAC CE may be indicated (e.g., identified), for example, by a MAC PDU subheader with LCID. The TCI state indication for the wireless device-specific PDCCH MAC CE may have a fixed size (e.g., 16 bits, or any other quantity of bits, bytes, etc.) and/or may comprise one or more fields. The one or more fields may comprise, for example, a serving cell ID, a CORESET ID, a TCI state ID, and/or a reserved bit.

The serving cell ID may indicate, for example, an identity of a serving cell for which the TCI state indication for the wireless device-specific PDCCH MAC CE may apply. The length of the serving cell ID may be n bits (e.g., n=5 bits, or any other quantity of bits, bytes, etc.).

The CORESET ID may indicate, for example, a CORESET. The CORESET may be indicated (e.g., identified) and/or associated with a CORESET ID (e.g., ControlResourceSetId). A length of the CORESET ID may be n bits (e.g., n=4 bits, or any other quantity of bits, bytes, etc.). Although CORESET ID is used as an example, one skilled in the relevant art recognizes that indications provided and/or from CORESET ID and/or information provided and/or from CORESET ID can be made and/or provided (e.g., indicated) by any field in any message.

The TCI state ID may indicate, for example, the TCI state indicated (e.g., identified) by TCI-StateId. The TCI state may be applicable to the CORESET indicated (e.g., identified) by the CORESET ID. A length of the TCI state ID may be n4 bits (e.g., n=6 bits, or any other quantity of bits, bytes, etc.).

A wireless device may trigger a SR for requesting an uplink resource (e.g., a UL-SCH resource), for example, based on the wireless device having a new transmission. A base station (e.g., a gNB) may send (e.g., transmit) to a wireless device at least one message comprising parameters indicating zero, one, or more SR configurations. A SR configuration may comprise a set of uplink resources (e.g., PUCCH resource(s)) for a SR for one or more BWPs and/or for one or more cells. A PUCCH resource for a SR may be configured for a BWP. For example, one PUCCH resource for a SR may be configured for a BWP. One or more SR configurations may correspond to one or more logical channels. One or more logical channels may be mapped to zero or one SR configurations. One or more logical channels may be configured by the at least one message. A SR configuration of a logical channel (LCH) that triggers a buffer status report (BSR) may be determined and/or assumed (e.g., considered) to be a corresponding SR configuration for a triggered SR.

The at least one message, for one or more SR configurations, may further comprise one or more parameters indicating at least one of: a SR prohibit timer; a maximum quantity of SR transmissions; a parameter indicating a periodicity and offset of SR transmission; and/or a PUCCH resource. The SR prohibit timer may be a duration, for example, during which the wireless device may be not allowed to send (e.g., transmit) the SR. A maximum quantity (e.g., number) of SR transmissions may be a transmission quantity (e.g., number) for which the wireless device may be allowed to send (e.g., transmit) the SR.

An uplink resource (e.g., PUCCH resource) may be indicated (e.g., identified) by: a frequency location (e.g., starting PRB), and/or an uplink format (e.g., PUCCH format) associated with initial cyclic shift of a base sequence and time domain location (e.g., starting symbol index).

A wireless device may maintain a SR transmission counter (e.g., SR_COUNTER) associated with a SR configuration. A wireless device may set the SR transmission counter (e.g., SR_COUNTER) of the SR configuration to a first value (e.g., 0), for example, based on a SR of a SR configuration being triggered, and/or no other SRs pending corresponding to a same SR configuration. A wireless device may determine and/or assume that (e.g., consider) the SR is pending until it is cancelled, for example, based on an SR being triggered. All pending SR(s) may be cancelled, for example, based on one or more UL grants accommodating all pending data available for transmission. A wireless device may determine one or more uplink resources (e.g., a PUCCH resource(s)) of an active BWP as valid uplink resources (e.g., PUCCH resource(s)) before a time of a SR transmission occasion.

A wireless device may send (e.g., transmit) an uplink signal via an uplink resource (e.g., a PUCCH via a PUCCH resource) associated with a SR configuration, for example, based on the wireless device sending (e.g., transmitting) a positive SR. A wireless device may send (e.g., transmit) the uplink signal using an uplink format (e.g., PUCCH using PUCCH format 0, or PUCCH format 1), according to the uplink configuration (e.g., PUCCH configuration).

A wireless device may receive one or more RRC message comprising parameters of one or more SR configurations. The parameters, for one or more of the one or more SR configurations, may indicate at least one of: a SR prohibit timer; a maximum quantity of SR transmissions; a parameter indicating a periodicity and offset of SR transmission; and/or an uplink resource indicated (e.g., identified) by an uplink resource index (e.g., PUCCH resource indicated (e.g., identified) by a PUCCH resource index). A wireless device may set a SR transmission counter (e.g., SR_COUNTER) to a first value (e.g., 0), if there is no other pending SRs corresponding to the SR configuration, for example, based on a SR of a SR configuration triggered (e.g., pending) based on a BSR being triggered on a LCH corresponding to the SR configuration.

A wireless device may determine whether there is at least one valid uplink resource (e.g., PUCCH resource) for the pending SR, for example, before the time of a SR transmission occasion. The wireless device may initiate a random access procedure on a PCell, for example, based on determining that there is no valid PUCCH resource for the pending SR. The wireless device may cancel the pending SR, for example, based on or in response to determining that there is no valid uplink resource (e.g., PUCCH resource) for the pending SR.

A wireless device may determine a SR transmission occasion on the at least one valid uplink resource (e.g., PUCCH resource), for example, based on at least one valid uplink resource (e.g., PUCCH resource) for the pending SR and/or a periodicity and an offset of SR transmission. The wireless device may wait for another SR transmission occasion, for example, based on the SR prohibit timer running. The wireless device may increment the SR transmission counter (e.g., SR_COUNTER) (e.g., by one) and/or cause (e.g., instruct) the physical layer of the wireless device to indicate and/or signal the SR on the at least one valid uplink resource (e.g., PUCCH resource) for the SR. The wireless device may increment the SR transmission counter and/or cause (e.g., instruct) the physical later of the wireless device to indicate and/or signal the SR on the at least one valid uplink resource for the SR, for example, based on: a determination that the SR prohibit timer is not running, and/or a determination that the at least one valid uplink resource (e.g., PUCCH resource) for the SR transmission occasion is not overlapping with a measurement gap. The wireless device may increment the SR transmission counter (e.g., SR_COUNTER) (e.g., by one) and/or cause (e.g., instruct) the physical layer of the wireless device to indicate and/or signal the SR on the at least one valid uplink resource (e.g., PUCCH resource) for the SR, for example, based on: a determination that the at least one valid uplink resource (e.g., PUCCH resource) for the SR transmission occasion is not overlapping with an uplink shared channel (UL-SCH) resource, and/or a determination that the SR transmission counter (e.g., SR_COUNTER) is less than the maximum quantity of SR transmissions. A wireless device (e.g., a physical layer of the wireless device) may send (e.g., transmit) a PUCCH via the at least one valid uplink resource (e.g., PUCCH resource) for the SR. The wireless device may monitor an uplink channel (e.g., PDCCH) for detecting a DCI for uplink grant, for example, based on or in response to sending (e.g., transmitting) the uplink signal (e.g., PUCCH).

The wireless device may cancel the pending SR and/or stop the SR prohibit timer, for example, based on receiving one or more uplink grants which may accommodate all pending data available for transmission. The wireless device may repeat one or more actions comprising: determining the at least one valid uplink resource (e.g., PUCCH resource); checking whether the SR prohibit timer is running; determining that the SR transmission counter (e.g., SR_COUNTER) is equal or greater than the maximum quantity of SR transmissions; incrementing the SR transmission counter (e.g., SR_COUNTER), sending (e.g., transmitting) the SR, and/or starting the SR prohibit timer; and/or monitoring an uplink channel (e.g., PDCCH) for an uplink grant. The wireless device may repeat some or all of these actions, for example, based on the wireless device not receiving one or more uplink grants that accommodate pending data available for transmission.

A wireless device may release an uplink channel (e.g., PUCCH) for one or more serving cells, release SRS for the one or more serving cells, clear one or more configured downlink assignments and uplink grants, initiate a random access procedure on a PCell, and/or cancel all the pending SRs, for example, based on the SR transmission counter (e.g., SR_COUNTER) indicating a quantity equal to or greater than the maximum quantity (e.g., number) of SR transmissions.

A wireless device and/or a base station may trigger a BFR mechanism. A wireless device may trigger a BFR procedure, for example, if at least a beam failure occurs. A beam failure may occur if a quality of beam pair link(s) of at least one PDCCH falls below a threshold. The threshold comprise be an RSRP value (e.g., −140 dbm, −110 dbm, or any other value) and/or a SINR value (e.g., −3 dB, −1 dB, or any other value), which may be configured in a RRC message.

Figure 16A:
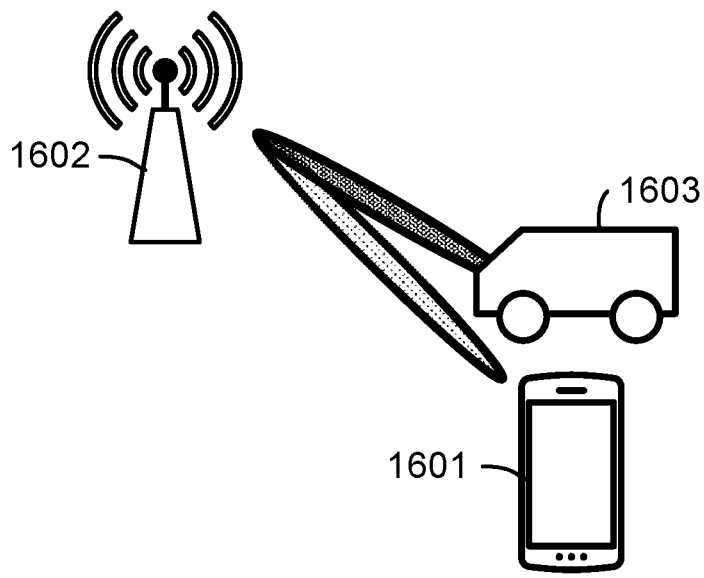
FIG. 16A and FIG. 16B show examples of beam failure scenarios.

FIG. 16A shows an example of a first beam failure event. A base station 1602 may send (e.g., transmit) a PDCCH from a transmission (Tx) beam to a receiving (Rx) beam of a wireless device 1601 from a TRP. The base station 1602 and the wireless device 1601 may start a BFR procedure on the TRP, for example, if the PDCCH on the beam pair link (e.g., between the Tx beam of the base station 1602 and the Rx beam of the wireless device 1601) have a lower-than-threshold RSRP and/or SINR value due to the beam pair link being blocked (e.g., by a moving vehicle 1603, a building, or any other obstruction).

Figure 16B:
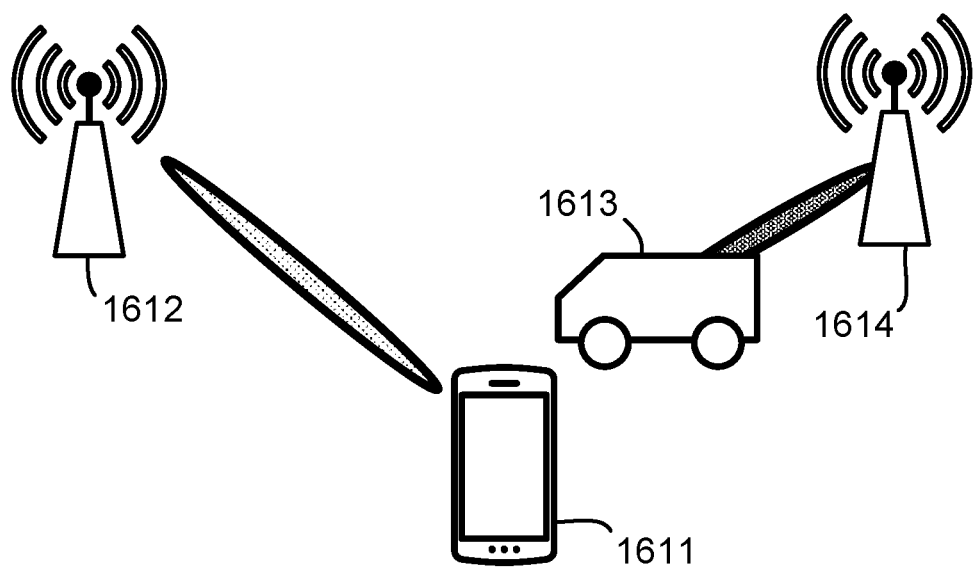

FIG. 16B shows an example of a second beam failure event. A base station may send (e.g., transmit) a PDCCH from a beam to a wireless device 1611 from a first TRP 1614. The base station and the wireless device 1611 may start a BFR procedure on a new beam on a second TRP 1612, for example, if the PDCCH on the beam is blocked (e.g., by a moving vehicle 1613, building, or any other obstruction).

A wireless device may measure a quality of beam pair links using one or more RSs. The one or more RSs may comprise one or more SS blocks and/or one or more CSI-RS resources. A CSI-RS resource may be determined by a CSI-RS resource index (CRI). A quality of beam pair links may be indicated by, for example, an RSRP value, a reference signal received quality (e.g., RSRQ) value, and/or a CSI (e.g., SINR) value measured on RS resources. A base station may indicate whether an RS resource, used for measuring beam pair link quality, is QCLed (Quasi-Co-Located) with DM-RSs of a PDCCH. The RS resource and the DM-RSs of the PDCCH may be QCLed, for example, if the channel characteristics from a transmission on an RS to a wireless device, and that from a transmission on a PDCCH to the wireless device, are similar or same under a configured criterion. The RS resource and the DM-RSs of the PDCCH may be QCLed, for example, if Doppler shift and/or Doppler shift of the channel from a transmission on an RS to a wireless device, and that from a transmission on a PDCCH to the wireless device, are the same.

A base station may send (e.g., transmit) one or more messages comprising configuration parameters of an uplink physical channel, or signal, for transmitting a BFR request. The uplink physical channel or signal may be based on one of: a contention-free PRACH (BFR-PRACH), which may be a resource orthogonal to resources of other PRACH transmissions; a PUCCH (e.g., BFR-PUCCH); a PUSCH (e.g., BFR MAC-CE); and/or a contention-based PRACH resource (e.g., CF-PRACH). Combinations of these candidate signals and/or channels may be configured by the base station. A wireless device may autonomously select a first resource for transmitting the BFR signal, for example, if the wireless device is configured with multiple resources for a BFR signal. The wireless device may select a BFR-PRACH resource for transmitting a BFR signal, for example, if the wireless device is configured with the BFR-PRACH resource, a BFR-PUCCH resource, and/or a CF-PRACH resource. The base station may send (e.g., transmit) a message to the wireless device indicating a resource for transmitting the BFR signal, for example, if the wireless device is configured with a BFR-PRACH resource, a BFR-PUCCH resource, and/or a CF-PRACH resource.

A wireless device may receive one or more RRC messages that comprise BFR parameters. The one or more RRC messages may comprise one or more of an RRC connection reconfiguration message, an RRC connection reestablishment message, and/or an RRC connection setup message. The wireless device may detect at least one beam failure according to at least one of BFR parameters and trigger a BFR procedure. The wireless device may start a first timer, if configured, in response to detecting the at least one beam failure. The wireless device may select a beam (e.g., a selected beam) in response to detecting the at least one beam failure. The selected beam may be a beam with good channel quality (e.g., determined based on RSRP, SINR, or BLER, etc.) from a set of candidate beams. The set of candidate beams may be identified by a set of reference signals (e.g., SSBs, or CSI-RSs). The wireless device may transmit at least a first BFR signal to a base station in response to selecting the selected beam. The at least first BFR signal may be associated with the selected beam. The at least first BFR signal may be, for example, a preamble transmitted on a PRACH resource, or a beam failure request (e.g., which may be similar to an SR) signal transmitted on a PUCCH resource, or a beam indication transmitted on a PUCCH/PUSCH resource. The wireless device may transmit the at least first BFR signal with a transmission beam corresponding to a receiving beam associated with the selected beam. The wireless device, may, for example, determine transmission beam by using the RF and/or digital beamforming parameters corresponding to the receiving beam. The wireless device may start a response window in response to transmitting the at least first BFR signal. The response window may be tracked using, for example, a timer with a value configured by the base station. The wireless device may monitor a PDCCH in a first CORESET while the response window is running. The first CORESET may be associated with the BFR procedure. The wireless device may monitor the PDCCH in the first CORESET in condition of transmitting the at least first BFR signal. The wireless device may receive a first DCI via the PDCCH in the first CORESET while the response window is running. The wireless device may consider the BFR procedure successfully completed if the wireless device receives the first DCI via the PDCCH in the first CORESET before the response window expires. The wireless device may stop the first timer, if configured, if the BFR procedure is successfully completed.

Figure 17:
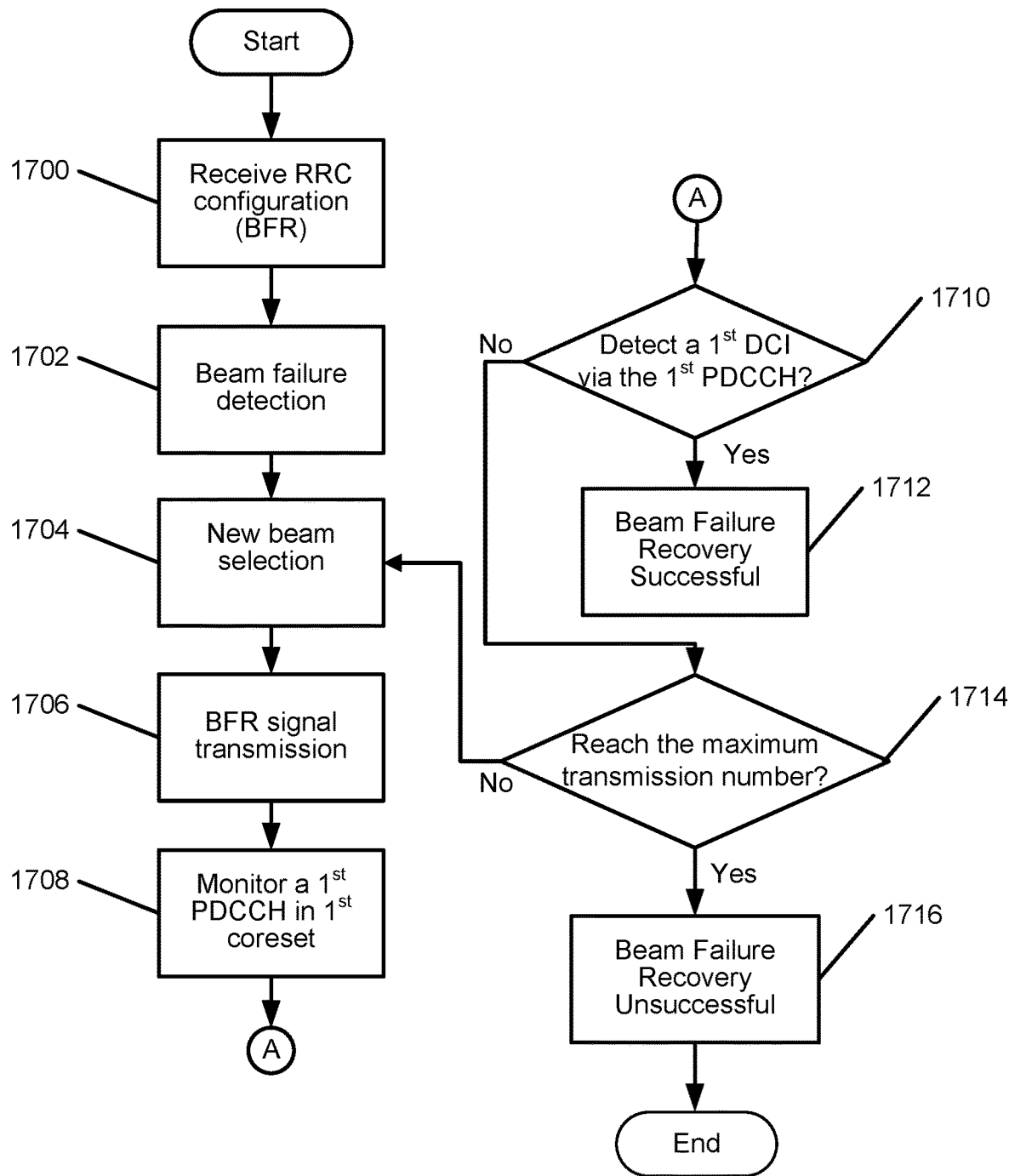
FIG. 17 shows an example of a BFR procedure.

FIG. 17 shows an example of a BFR procedure. In some communication systems, a wireless device may stop a BWP inactivity timer if a random access procedure is initiated, and/or the wireless device may restart the BWP inactivity timer if the random access procedure is successfully completed (e.g., based on or in response to receiving DCI addressed to a C-RNTI of the wireless device). At step 1700, a wireless device may receive one or more RRC messages comprising BFR parameters. At step 1702, the wireless device may detect at least one beam failure according to at least one BFR parameter. The wireless device may start a first timer, if configured, based on detecting the at least one beam failure. At step 1704, the wireless device may select a beam (e.g., a selected beam) based on detecting the at least one beam failure. The selected beam may be a beam with good channel quality (e.g., based on RSRP, SINR, and/or BLER) that may be selected from a set of candidate beams. The candidate beams may be indicated by a set of reference signals (e.g., SSBs, or CSI-RSs). At step 1706, the wireless device may send (e.g., transmit) at least a first BFR signal to a base station, for example, based on selecting the beam (e.g., selected beam). The at least first BFR signal may be associated with the selected beam. The wireless device may send (e.g., transmit) the at least first BFR signal with a transmission beam corresponding to a receiving beam associated with the selected beam. The at least first BFR signal may be a preamble sent (e.g., transmitted) via a PRACH resource, an SR signal sent (e.g., transmitted) via a PUCCH resource, a BFR signal sent (e.g., transmitted) via a PUCCH resource, a beam indication (e.g., BFR medium access control control element (BFR MAC CE)) transmitted on a PUCCH/PUSCH resource, and/or a beam report sent (e.g., transmitted) via a PUCCH and/or PUSCH resource. At step 1708, the wireless device may start a response window, for example, based on sending (e.g., transmitting) the at least first BFR signal. The response window may be associated with a timer with a value configured by the base station. The wireless device may monitor a PDCCH in a first CORESET (e.g., UE specific or dedicated to the wireless device or wireless device specific), for example, if the response window is running. The first CORESET may be configured by the BFR parameters (e.g., RRC). The first CORESET may be associated with the BFR procedure. The wireless device may monitor the PDCCH in the first CORESET in condition of transmitting the at least first BFR signal.

At step 1710, the wireless device may detect (e.g., receive) a first DCI via the PDCCH in the first CORESET, for example, if the response window is running. At step 1712, the wireless device may determine that the BFR procedure has successfully completed, for example, if the wireless device receives the first DCI via the PDCCH in the first CORESET before the response window expires. The wireless device may stop the first timer, if configured, based on the BFR procedure successfully being completed. The wireless device may stop the response window, for example, based on the BFR procedure successfully being completed. If the response window expires, and the wireless device does not receive the DCI (e.g., at step 1710), the wireless device may, at step 1714, increment a transmission number. The transmission number may be initialized to a first number (e.g., 0, 1 or any other number) before the BFR procedure is triggered/initiated. At step 1714, if the transmission number indicates a number less than the configured maximum transmission number, the wireless device may repeat one or more actions (e.g., at step 1704). The one or more actions to be repeated may comprise at least one of a BFR signal transmission, starting the response window, monitoring the PDCCH, and/or incrementing the transmission number, for example, if no response received during the response window is running. At step 1716, if the transmission number indicates a number equal or greater than the configured maximum transmission number, the wireless device may declare the BFR procedure is unsuccessfully completed.

A failure recovery procedure associated with one or more resources may be used. A BFR procedure may be performed, for example, after a beam failure is detected/determined by a wireless device and/or by a base station. A base station may configure a wireless device with one or more first reference signals (e.g., SS/PBCH block, CSI-RS, etc.) for a beam failure detection. The wireless device may determine/declare/detect a beam failure, for example, based on the one or more first reference signals (RSs). The wireless device may determine/declare/detect a beam failure, for example, if a quantity/number of beam failure instance indications (e.g., sent from a physical layer of the wireless device to a higher layer (e.g., a MAC layer, a MAC entity) of the wireless device) reaches a threshold (e.g., a configured threshold such as a beamFailureInstanceMaxCount) and/or before an expiry of a configured timer (e.g., beamFailureDetectionTimer).

An SSB (e.g., cell-defining SSB) may be associated with an initial downlink BWP of a cell. The wireless device may determine/declare/detect a beam failure based on the SSB, for example, if the SSB is associated with the initial downlink BWP. The base station may configure the SSB for the initial downlink BWP, for example, for a beam failure detection. A downlink BWP of the cell may comprise the SSB. The base station may configure the SSB for the downlink BWP, for example, by configuring the downlink BWP comprising the SSB. The wireless device may receive the SSB and/or may determine/declare/detect a beam failure, for example, based on measuring the SSB. The one or more first RSs may comprise the SSB.

A downlink BWP of the cell may not comprise the SSB. The wireless device may determine/declare/detect a beam failure for the downlink BWP, for example, based on measuring one or more CSI-RSs. The one or more first RSs may comprise the one or more CSI-RSs.

A wireless device may trigger/initiate/perform BFR, for example, by initiating a random-access procedure on a primary cell, based on detecting a beam failure. A wireless device may select/determine/identify a suitable/candidate beam for BFR, for example, after or based on detecting a beam failure. The wireless device may determine that the BFR is complete, for example, based on a successful completion of the random-access procedure.

Figure 18:
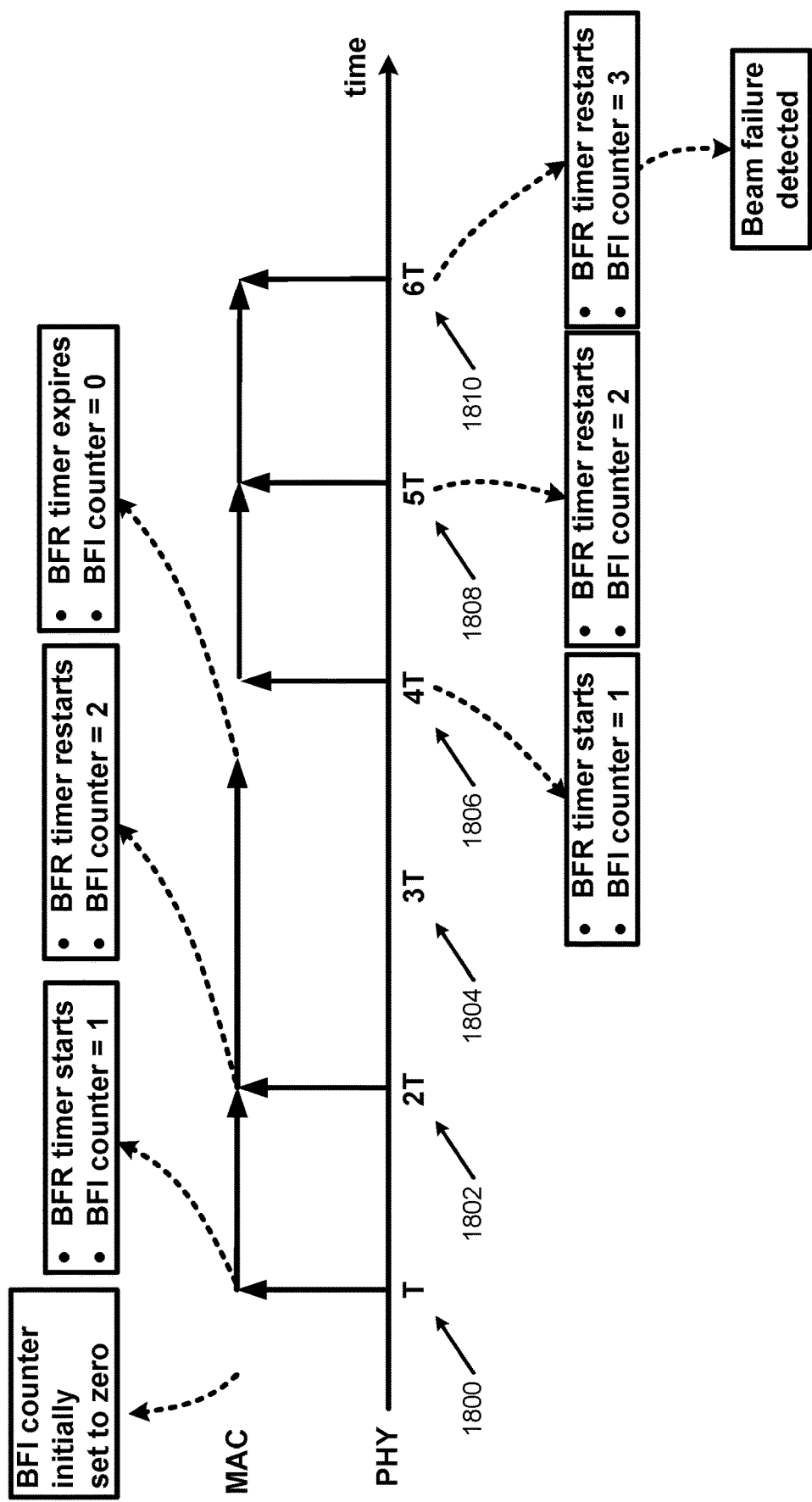
FIG. 18 shows an example of downlink BFR.

FIG. 18 shows an example of downlink BFR. A base station may configure a wireless device (e.g., a MAC entity of a wireless device) with a BFR procedure, for example, by an RRC message. The wireless device may determine/declare/detect a beam failure, for example, based on measuring one or more first RSs (e.g., SSB, CSI-RS). The BFR procedure may be used for indicating, to the base station, of a candidate RS (e.g., candidate SSB or candidate CSI-RS), for example, if the wireless device determines/declares/detects the beam failure of the one or more first RSs and determines/identifies the candidate RS. The wireless device may determine/declare/detect the beam failure, for example, based on counting a beam failure instance indication received/reported from a lower layer of the wireless device (e.g. PHY layer) to a MAC entity (e.g., the MAC entity of the wireless device).

A base station may reconfigure a BFR configuration (e.g., an information element (IE) beamFailureRecoveryConfig). The base station may reconfigure the BFR configuration, for example, during an ongoing random-access procedure for BFR. The wireless device (e.g., the MAC entity of the wireless device) may stop/abort the ongoing random-access procedure, for example, after or in response to the reconfiguring the BFR configuration (e.g., the IE beamFailureRecoveryConfig). The wireless device may initiate/trigger a second random-access procedure for the BFR using/with the reconfigured BFR configuration (e.g., IE beamFailureRecoveryConfig), for example, after stopping/aborting the ongoing random-access procedure.

An RRC message may configure a wireless device with one or more parameters in one or more IEs (e.g., an IE BeamFailureRecoveryConfig and an IE RadioLinkMonitoringConfig) for a beam failure detection and/or BFR procedure. The one or more parameters may comprise at least one of: beamFailureInstanceMaxCount for a beam failure detection; beamFailureDetectionTimer for the beam failure detection; beamFailureRecoveryTimer for a BFR; rsrp-ThresholdSSB: an RSRP threshold for the BFR; PowerRampingStep for the BFR; powerRampingStepHighPriority for the BFR; preambleReceivedTargetPower for the BFR; preambleTransMax for the BFR; scalingFactorBI for the BFR; ssb-perRACH-Occasion for the BFR; ra-OccasionList for the BFR; ra-ssb-OccasionMaskIndex for the BFR; prach-ConfigurationIndex for the BFR; and/or ra-ResponseWindow. The ra-ResponseWindow may be a time window to monitor at least one response (e.g., a random-access response, a BFR response) for the BFR. The wireless device may use a contention-free random-access preamble for the BFR or a contention-based random-access preamble for the BFR.

A wireless device may use at least one wireless-device-variable (e.g., a UE variable) for a beam failure detection. BFI_COUNTER may be one of the at least one wireless-device-variable. The BFI_COUNTER may be a counter for a beam failure instance indication. The wireless device may set the BFI_COUNTER initially to a first value (e.g., a default value, such as zero, one, or any other value).

A wireless device (e.g., a MAC entity of the wireless device) may determine/identify a beam failure instance (BFI) indication (e.g., receives the BFI indication from a lower layer (e.g., a PHY layer) of the wireless device). The wireless device (e.g., the MAC entity of the wireless device) may start or restart a timer (e.g., the beamFailureDetectionTimer, a BFR timer), for example, based on the receiving the BFI indication. The wireless device (e.g., the MAC entity of the wireless device) may increment BFI_COUNTER by one (e.g., at time T 1800, 2T 1802, 4T 1806, 5T 1808, and 6T 1810 shown in FIG. 18), for example, based on the receiving the BFI indication.

The BFI_COUNTER may be equal to or greater than a threshold (e.g., the beamFailureInstanceMaxCount). The wireless device may initiate/trigger the random-access procedure at time 6T, for example, if the BFI_COUNTER is equal to or greater than the beamFailureInstanceMaxCount (e.g., 2, 3, 4, or any other value). The wireless device (e.g., the MAC entity of the wireless device) may initiate/trigger a random-access procedure (e.g., via an SpCell) for a BFR (e.g., at time T1 1904 shown in FIG. 19), for example, based on the BFI_COUNTER being equal to or greater than the beamFailureInstanceMaxCount.

The wireless device may select, or may be assigned with, an uplink carrier (e.g., SUL, NUL) to perform the random-access procedure for the BFR. The base station may configure an active uplink BWP of the selected uplink carrier with an IE (e.g., IE beamFailureRecoveryConfig). The wireless device may start, if configured, the beamFailureRecoveryTimer, for example, if the wireless device initiates/triggers/starts the random-access procedure for the BFR, based on the active uplink BWP of the selected uplink carrier being configured with the IE (e.g., the IE beamFailureRecoveryConfig). The wireless device may use/apply one or more parameters (e.g., powerRampingStep, preambleReceivedTargetPower, and preambleTransMax) configured in the IE (e.g., the IE BeamFailureRecoveryConfig) for the random-access procedure, for example, if the wireless device initiates/triggers/starts the random-access procedure for the BFR, based on the active uplink BWP of the selected uplink carrier being configured with the IE (e.g., the IE beamFailureRecoveryConfig).

The base station may configure one or more parameters (e.g., powerRampingStepHighPriority) in the IE (e.g., the IE beamFailureRecoveryConfig). The wireless device may set PREAMBLE_POWER_RAMPING_STEP to the powerRampingStepHighPriority, for example, if the wireless device initiates/triggers/starts the random-access procedure for the BFR and the active uplink BWP of the selected uplink carrier is configured with the IE (e.g., the IE beamFailureRecoveryConfig), based on the powerRampingStepHighPriority being configured in the IE (e.g., the IE beamFailureRecoveryConfig).

The base station may not configure a power ramping priority (e.g., powerRampingStepHighPriority) in the IE (e.g., the IE beamFailureRecoveryConfig). The wireless device may set a power ramping parameter (e.g., PREAMBLE_POWER_RAMPING_STEP) to a power ramping step (e.g., the powerRampingStep), for example, if the wireless device initiates/triggers/starts the random-access procedure for the BFR and the active uplink BWP of the selected uplink carrier is configured with the IE (e.g., the IE beamFailureRecoveryConfig), based on the powerRampingStepHighPriority not being configured in the IE.

The base station may configure a scaling factor (e.g., scalingFactorBI) in the IE (e.g., the IE beamFailureRecoveryConfig). The wireless device may set SCALING_FACTOR_BI to the scalingFactorBI, for example, if the wireless device initiates/triggers/starts the random-access procedure for the BFR and the active uplink BWP of the selected uplink carrier is configured with the IE (e.g., the IE beamFailureRecoveryConfig), based on the scalingFactorBI being configured in the IE.

The base station may configure the active uplink BWP of the selected uplink carrier with the IE (e.g., the IE beamFailureRecoveryConfig). The random-access procedure may be a contention-free random-access procedure, for example, based on the active uplink BWP of the selected uplink carrier being configured with the IE (e.g., the IE beamFailureRecoveryConfig).

The base station may not configure the active uplink BWP of the selected uplink carrier with the IE (e.g., the IE beamFailureRecoveryConfig). The random-access procedure may be a contention-based random-access procedure, for example, based on the active uplink BWP of the selected uplink carrier not being configured with the IE (e.g., the IE beamFailureRecoveryConfig).

A timer associated with a beam failure (e.g., the beamFailureDetectionTimer) may expire, for example, after running for a configured time period without receiving an additional beam failure indication. The wireless device (e.g., the MAC entity of the wireless device) may set the BFI_COUNTER to zero (or an initial value or any other value) (e.g., in FIG. 18, between time 3T 1804 and 4T 1806), for example, based on the expiry of the timer (e.g., the beamFailureDetectionTimer). The timer may be initialized and may (re)start and a BFI counter may increment (e.g., by one), for example, based on determining/receiving a beam failure indication.

A base station may configure a wireless device with one or more first RSs (e.g., SS/PBCH block, CSI-RS, etc.) for a beam failure detection (e.g., by RadioLinkMonitoringRS configured in the IE RadioLinkMonitoringConfig). The base station may reconfigure the beamFailureDetectionTimer or the beamFailureInstanceMaxCount or at least one RS of the one or more first RSs by higher layer signaling (e.g., an RRC message). The wireless device (e.g., the MAC entity of the wireless device) may set the BFI_COUNTER to zero (or an initial value or any other value), for example, based on the reconfiguring.

The wireless device may complete the random-access procedure (e.g., contention-free random-access or contention-based random-access) for the BFR successfully. The wireless device may determine/consider that the BFR is successfully completed, for example, based on the completing the random-access procedure successfully. The wireless device may, if configured, stop/reset/initialize the beamFailureRecoveryTimer, for example, based on the successful completion of the random-access procedure. The wireless device may set the BFI_COUNTER to zero (or an initial value or any other value), for example, based on the successful completion of the random-access procedure.

A BFR timer (e.g., beamFailureRecoveryTimer) may start to run, for example, based on a triggering event that causes the BFR timer to run. The base station may not configure the wireless device with the BFR timer. The base station may configure the wireless device with one or more second RSs (e.g., SS/PBCH blocks, periodic CSI-RSs, etc.) for a BFR, for example, by a higher layer parameter (e.g., candidateBeamRSList in the IE beamFailureRecoveryConfig). The base station may configure the wireless device with one or more uplink resources (e.g., contention-free random-access resources) for a BFRQ used in the BFR, for example, by a higher layer (e.g., RRC) parameter (e.g., candidateBeamRSList, ssb-perRACH-Occasion, ra-ssb-OccasionMaskIndex in the IE beamFailureRecoveryConfig). An uplink resource of the one or more uplink resources may be associated with a candidate RS (e.g., SSB, CSI-RS) of the one or more second RSs. The association between the uplink resource and the candidate RS may be one-to-one (or one-to-many or many-to-one).

At least one RS among the one or more second RSs may have a signal quality and/or an RSRP (e.g., SS-RSRP, CSI-RSRP) greater than a second threshold (e.g., rsrp- ThresholdSSB, rsrp-ThresholdCSI-RS). The wireless device may select a candidate RS among the at least one RS for the BFR.

The candidate RS may be a CSI-RS. There may be no ra-PreambleIndex associated with the candidate RS. The wireless device (e.g., the MAC entity of the wireless device) may set PREAMBLE_INDEX to a ra-PreambleIndex, for example, based on the candidate RS being the CSI-RS and no ra-PreambleIndex being associated with the candidate RS. The ra-PreambleIndex may be associated with (or corresponding to) an SSB in the one or more second RSs (e.g., indicated by candidateBeamRSList). The SSB may be quasi-colocated with the candidate RS.

The candidate RS may be a CSI-RS. A random-access preamble index (e.g., ra-PreambleIndex) may be associated with the candidate RS. The candidate RS may be an SSB. The wireless device (e.g., the MAC entity of the wireless device) may set a preamble index (e.g., PREAMBLE_INDEX) to a random-access preamble index (e.g., ra-PreambleIndex), that may be associated with (or corresponding to) the candidate RS, from a set of random-access preambles for the BFRQ. A higher layer (e.g., RRC) parameter may configure the set of random-access preambles for the BFRQ for the random-access procedure for the BFR.

A wireless device (e.g., a MAC entity of the wireless device) may send/transmit an uplink signal (e.g., contention-free random-access preamble) for the BFRQ. The wireless device (e.g., the MAC entity of the wireless device) may determine/start a response window (e.g., ra-ResponseWindow configured in the IE BeamFailureRecoveryConfig) at a first PDCCH occasion from the end of the sending/transmitting the uplink signal, for example, based on the sending/transmitting the uplink signal. The wireless device may, during the response window, monitor at least one PDCCH on a search space indicated by a search space indicator (e.g., recoverySearchSpaceId) of a cell (e.g., of an SpCell) for DCI, for example, after the sending/transmitting the uplink signal. The DCI may be indicated/identified by an RNTI (e.g., C-RNTI, MCS-C-RNTI) of the wireless device.

The wireless device (e.g., the MAC entity of the wireless device) may receive, from a lower layer (e.g., a PHY layer) of the wireless device, a notification of a reception of the DCI via the search space indicated by the recoverySearchSpaceId. The wireless device may receive the DCI via a serving cell. The wireless device may send/transmit the uplink signal via the serving cell. The DCI may be addressed to the RNTI (e.g., C-RNTI) of the wireless device. The wireless device may determine/consider that the random-access procedure is successfully completed, for example, based on the receiving the notification and the DCI being addressed to the RNTI.

The wireless device may send/transmit the uplink signal via a cell (e.g., an SpCell). The response window configured in the IE (e.g., the IE BeamFailureRecoveryConfig) may expire, for example, before receiving a response (e.g., a DCI). The wireless device may not receive DCI (and/or a PDCCH transmission) addressed to the RNTI of the wireless device via the search space indicated by a search space indicator (e.g., recoverySearchSpaceId) on the serving cell (e.g., before the response window expires). The wireless device may determine/consider that a reception of a random-access response (e.g., a BFR response) is unsuccessful, for example, based on the expiry of the response window and not receiving the DCI. The wireless device may increment a transmission counter (e.g., PREAMBLE_TRANSMISSION_COUNTER) by one, for example, based on the expiry of the response window and/or not receiving the DCI.

The transmission counter may be incremented. The transmission counter may be equal to preambleTransMax plus one. The wireless device may indicate a random-access problem to one or more upper layers (e.g., an RRC layer), for example, based on: the transmission counter being equal to the preambleTransMax plus one and/or transmitting the uplink signal via the SpCell.

The wireless device (e.g., the MAC entity of the wireless device) may stop monitoring during the response window (and stop monitoring for one or more random access responses) after successful reception of a random-access response (e.g., the DCI addressed to the RNTI of the wireless device, the BFR response), for example, after determining that the random access response comprises a random access preamble identifier that matches the transmitted PREAMBLE_INDEX.

A wireless device (e.g., a MAC entity of the wireless device) may discard explicitly signaled contention-free random-access resources except one or more uplink resources (e.g., contention-free random-access resources) for BFRQ, for example, based on completion of a random-access procedure.

Figure 19:
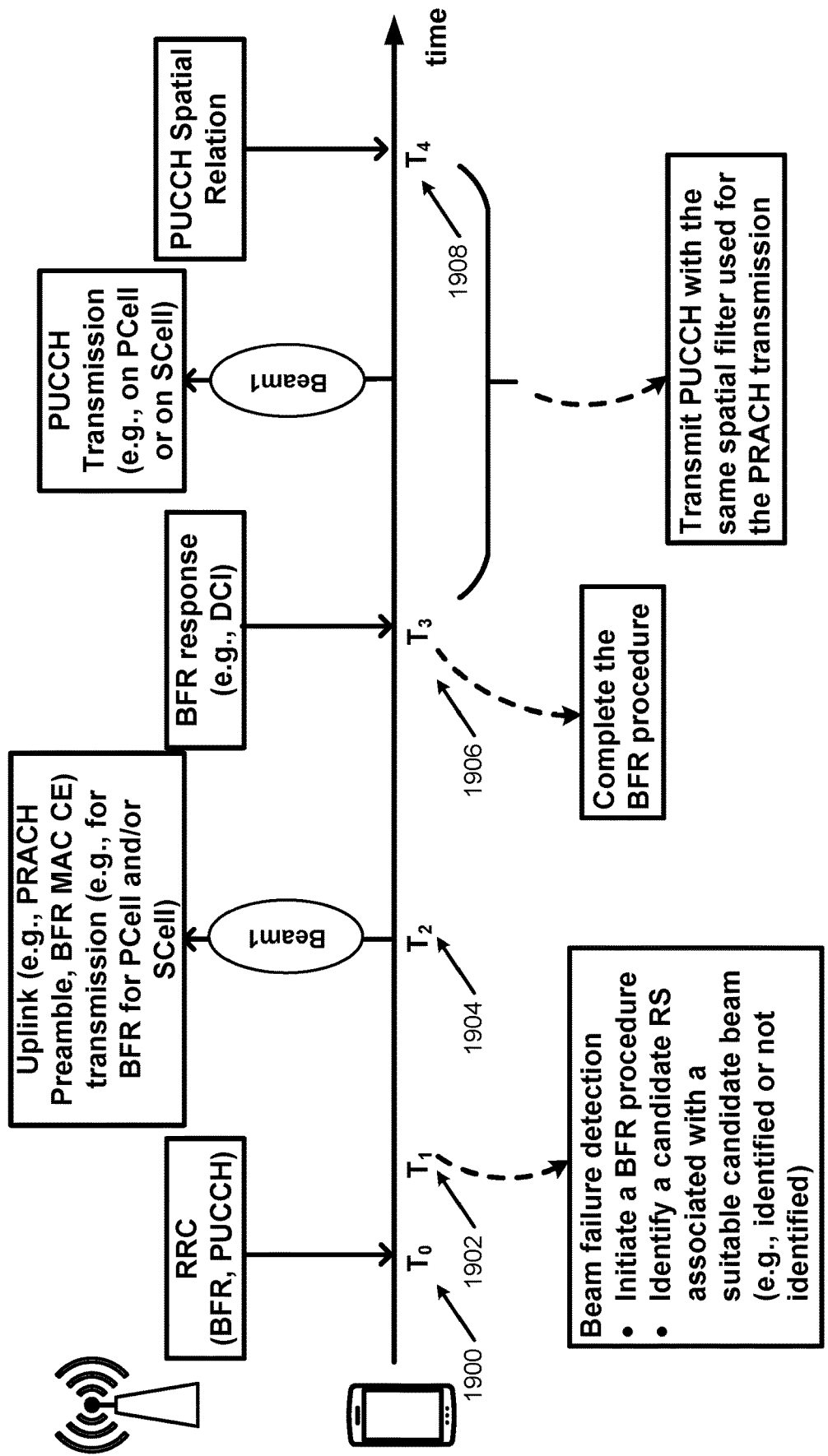
FIG. 19 shows an example of downlink BFR (e.g., for a primary cell, a secondary cell).

FIG. 19 shows an example of downlink BFR. A base station may configure a wireless device, for a serving cell (e.g., a primary cell, a secondary cell), with a first set of resource configuration indexes (e.g., periodic CSI-RS resource configuration indexes), for example, by a higher layer parameter failureDetectionResources (e.g., at time T0 1900 shown in FIG. 19). The first set of resource configuration indexes may indicate one or more first RSs (e.g., CSI-RS, SS/PBCH block, etc.). The base station may configure one or more parameters (e.g., the higher layer parameter failureDetectionResources) for a downlink BWP (of configured downlink BWPs) of the serving cell. The base station may configure the wireless device, for the serving cell, with a second set of resource configuration indexes (e.g., periodic CSI-RS resource configuration indexes, SS/PBCH block indexes), for example, by a higher layer parameter candidateBeamRSList (e.g., at time T0 1900 shown in FIG. 19). The second set of resource configuration indexes may indicate one or more second RSs (e.g., CSI-RS, SS/PBCH block, etc.). The base station may configure one or more parameters (e.g., the higher layer parameter candidateBeamRSList) for an uplink BWP (of configured uplink BWPs) of the serving cell. The wireless device may use the one or more first RSs and/or the one or more second RSs for radio link quality measurements on the serving cell.

A base station may not configure a wireless device with one or more parameters, such as a higher layer parameter associated with failure detection resources (e.g., failureDetectionResources). The wireless device may determine a first set of resource configuration indexes to include a resource configuration index (e.g., periodic CSI-RS resource configuration indexes), for example, based on not being configured with the higher layer parameter (e.g., failureDetectionResources). The resource configuration index may be the same as an RS index in an RS set. The RS index may be indicated by a TCI state (e.g., via a higher layer parameter TCI-state). The TCI state may be used for a control resource set (CORESET) that the wireless device is configured to monitor at least one PDCCH. The base station may configure the TCI state for the CORESET. The TCI state may comprise two RS indexes. Based on the TCI state comprising two RS indexes, the first set of resource configuration indexes may include an RS index, of the two RS indexes, with QCL-TypeD configuration. The base station may configure the TCI state for the CORESET.

The wireless device may expect/assume/determine the first set of resource configuration indexes to include up to two RS indexes (or any other quantity of RS indexes). The wireless device may expect/assume/determine a single port RS in the first set of resource configuration indexes. The one or more first RSs may comprise up to two RSs (or any other quantity of RSs) indicated by the two RS indexes (or any other quantity of RS indexes).

A first threshold (e.g. Qout,LR) may correspond to a default value of higher layer parameter (e.g., rlmInSyncOutOfSyncThreshold). A second threshold (e.g. Qin,LR) may correspond to a value configured/provided by a higher layer parameter (e.g., rsrp-ThresholdSSB) in a BFR configuration (e.g., the IE BeamFailureRecoveryConfig).

A physical layer in a wireless device may assess a first radio link quality of the one or more first RSs (or the first set of resource configuration indexes) against the first threshold. A first RS of the one or more first RSs may be associated (e.g. quasi co-located) with at least one DM-RS of a PDCCH monitored by the wireless device.

The wireless device may use/compare/apply the second threshold to a first L1-RSRP measurement obtained from a SS/PBCH block of the one or more second RSs (or the second set of resource configuration indexes). The wireless device may use/compare/apply the second threshold to a second L1-RSRP measurement obtained from a CSI-RS of the one or more second RSs (or the second set of resource configuration indexes), for example, after changing/adjusting/reducing/scaling a reception power of the CSI-RS with a value configured/provided by a higher layer parameter (e.g., powerControlOffsetSS).

A wireless device may assess/determine the first radio link quality of the one or more first RSs (e.g., indicated by the first set of resource configuration indexes). A physical layer in the wireless device may send/transmit/provide a BFI indication to a higher layer (e.g. a MAC layer, a MAC entity) of the wireless device, for example, if the first radio link quality does not satisfy (e.g., worse/lower than) the first threshold. The physical layer may inform the higher layer (e.g., in non-DRX mode operation) with a first periodicity, for example, if the first radio link quality is worse/less than the first threshold. The wireless device may determine the first periodicity by determining the largest value between a shortest periodicity, among one or more periodicities of the one or more first RSs (e.g., resource configurations in the first set), and a first value (e.g., 2 msec or any other value). The first periodicity may be defined as a maximum of the first value and a TBFD-RS,M, wherein TBFD-RS,M may be the shortest periodicity.

The physical layer may inform the higher layer (e.g., in DRX mode operation) of a second periodicity, for example, if the first radio link quality is worse/less than the first threshold. The base station may configure the wireless device with a cycle length (e.g., DRX_cycle_length) for an operation mode (e.g., the DRX mode operation). The wireless device may determine the second periodicity, for example, by the MAX function, max (1.5*DRX_cycle_length, 1.5*TBFD-RS,M), if the cycle length (e.g., DRX_cycle_length) is less than or equal to 320 ms (or any other time value). The wireless device may determine that the second periodicity is equal to the cycle length (e.g., DRX_cycle_length), for example, if the cycle length (e.g., DRX_cycle_length) is greater than 320 ms (or any other time value).

The wireless device may send/transmit/provide to the higher layer one or more candidate RSs (e.g., the periodic CSI-RS configuration indexes, the SS/PBCH blocks indexes) from the one or more second RSs (e.g., the second set) and one or more L1-RSRP measurements, for example, based on a request from a higher layer (e.g. a MAC layer, a MAC entity) of the wireless device. Each candidate RS of the one or more candidate RSs may be associated with a L1-RSRP measurement of the one or more L1-RSRP measurements. The association may be one-to-one (or one-to-many or many-to-one). The one or more L1-RSRP measurements associated with the one or more candidate RSs may be greater than or equal to the second threshold. The higher layer may select a candidate RS (e.g., periodic CSI-RS resource configuration, SS/PBCH block) among the one or more candidate RSs. The candidate RS may be determined/identified/indicated by a first RS index of the second set of resource configuration indexes. The first RS index may indicate the candidate RS.

A wireless device may be provided/configured with a CORESET through a link to a search space set. The CORESET may be wireless-device specific or dedicated to the wireless device. The wireless device may monitor the CORESET for a BFR. The base station may configure/provide the wireless device with the search space set, for example, by a higher layer parameter (e.g., recoverySearchSpaceId) in a BFR configuration (e.g., the IE BeamFailureRecoveryConfig). The wireless device may monitor at least one PDCCH in the control resource set (e.g., the CORESET).

The base station may configure/provide the wireless device with a higher layer parameter (e.g., recoverySearchSpaceId). The wireless device may not expect to be configured/provided with a second search space set for monitoring at least one PDCCH in the CORESET, for example, based on being configured/provided with the higher layer parameter recoverySearchSpaceId. The CORESET may be associated with the search space set configured/provided by the higher layer parameter (e.g., recoverySearchSpaceId). The wireless device may not expect that the CORESET is associated with a second search space set, for example, based on the CORESET being associated with the search space set configured/provided by the higher layer parameter (e.g., recoverySearchSpaceId).

The base station may configure/provide the wireless device with a configuration for a transmission of an uplink signal (e.g., a PRACH transmission), for example, by a higher layer parameter (e.g., PRACH-ResourceDedicatedBFR) in a BFR configuration (e.g., the IE BeamFailureRecoveryConfig). The wireless device, starting from a second slot (e.g., slot n+4), may monitor at least one PDCCH in a search space set (e.g., configured/provided by the higher layer parameter recoverySearchSpaceId) for detection of a DCI format within a response window (e.g., ra-responseWindow), for example, based on the transmission of the uplink signal (e.g., the PRACH transmission, BFR MAC CE, etc.) in a first slot (e.g., slot n, time T2 1904 shown in FIG. 19). The wireless device may monitor the at least one PDCCH in the search space set (or the CORESET) according to antenna port quasi co-location parameters associated with the candidate RS (e.g., configured/provided by the higher layer). The response window may be configured by an IE (e.g., the IE BeamFailureRecoveryConfig). The DCI format may be configured with CRC scrambled by an RNTI (e.g., C-RNTI, MCS-C-RNTI).

The wireless device may assume/determine that antenna port quasi-collocation parameters for the at least one PDCCH, and/or the corresponding PDSCH are the same as the candidate RS. The wireless device may assume/determine that the antenna port quasi-collocation parameters are the same as the candidate RS, for example, at least until the wireless device receives (e.g., by higher layers) an activation for a TCI state or a higher layer parameter (e.g., TCI-StatesPDCCH-ToAddlist and/or TCI-StatesPDCCH-ToReleaseList). The wireless device may assume/determine that the antenna port quasi-collocation parameters are the same as the candidate RS, for example, if the wireless device monitors at least one PDCCH in the search space set (e.g., configured/provided by the higher layer parameter recoverySearchSpaceId) and for a reception of corresponding PDSCH. A DCI format received in the search space set while monitoring the at least one PDCCH may comprise scheduling information for the corresponding PDSCH.

The wireless device may continue to monitor at least one PDCCH in the search space set, for example, at least until the wireless device receives an activation command (e.g., a MAC CE) for a TCI state or a higher layer parameter (e.g., TCI-StatesPDCCH-ToAddlist and/or TCI-StatesPDCCH-ToReleaseList). The wireless device may continue to monitor the at least one PDCCH in the search space set, for example, after the wireless device receives/detects the DCI format with CRC scrambled by the RNTI (e.g., C-RNTI or MCS-C-RNTI) in the search space set (e.g., configured/provided by the higher layer parameter recoverySearchSpaceId) at time T3 1906 shown in FIG. 19.

The wireless device may send/transmit the uplink signal (e.g., a PRACH) via a serving cell (e.g., PCell, SCell). The wireless device may use the same spatial filter (e.g., associated with beam1 configured for the wireless device for one or more uplink transmissions via PCell) for the transmission of the uplink signal (e.g., preamble transmission for the PRACH transmission). The wireless device may receive/detect a DCI format, with a CRC scrambled by the RNTI, in at least one PDCCH in the search space set (e.g., configured/provided by the higher layer parameter recoverySearchSpaceId). The wireless device may send/transmit a second uplink signal via PUCCH (e.g., PUCCH transmission shown in FIG. 19) via the serving cell using the spatial filter used for the transmission of the uplink signal (e.g., the PRACH transmission), for example, at least until the wireless device receives an activation command (e.g., a MAC CE) for spatial relation information (e.g., PUCCH-Spatialrelationinfo) or is configured/provided PUCCH-Spatialrelationinfo for PUCCH resource(s) for the serving cell (e.g., at time T4 1908 shown in FIG. 19). The wireless device may send/transmit the second uplink signal via PUCCH, for example, after a first number of symbols (e.g., 28 symbols or any other number of symbols) from the last symbol in which a reception of the at least one PDCCH is complete. The wireless device may assume/determine that antenna port quasi-collocation parameters for CORESET with index zero (e.g., Coreset 0) are the same as the candidate RS for PDCCH monitoring in the CORESET with index zero, for example, after a first number of symbols (e.g., 28 symbols or nay other number of symbols) from the last symbol in which a reception of the at least one PDCCH is complete.

The base station may not configure/provide the wireless device with a higher layer parameter (e.g., recoverySearchSpaceId). The wireless device may not initiate/trigger/start a contention-free random access procedure for BFR, for example, based on not being configured/provided with the higher layer parameter (e.g., recoverySearchSpaceId). The wireless device may initiate/trigger/start a contention-based random-access procedure for a BFR, for example, based on not being configured/provided with the higher layer parameter (e.g., recoverySearchSpaceId).

A wireless device may assess/determine/measure a downlink link quality of a serving cell, for example, based on one or more first RSs (e.g., periodic CSI-RS, SSB, etc.) in the first set of resource configuration indexes to determine/identify/detect a beam failure instance (BFI). A wireless device may estimate/determine/measure a first radio link quality for an RS of the one or more first RSs and compare the first radio link quality to a first threshold (Qout,LR) to assess/determine downlink radio link quality of the serving cell. The first threshold may be defined as a level at which a downlink radio level link (e.g., of a resource configuration associated with the first set of resource configuration indexes) may not be reliable and/or may not be reliably received. The first threshold may correspond to a first percent (e.g., 10% or any other percent) block error rate (BLER) of a hypothetical PDCCH transmission.

A wireless device may perform L1-RSRP measurements based on one or more second RSs (e.g., periodic CSI-RS, SSB, etc.) in the second set of resource configuration indexes to detect a candidate beam (or a candidate RS). An L1-RSRP measurement of the candidate beam (or the candidate RS) may indicate a signal quality that is better than a second threshold (e.g., indicated by higher layer parameter rsrp-ThresholdSSB, rsrp-ThresholdCSI-rs (rsrp-ThresholdSSB+powerControlOffsetSS)). A wireless device may not be required to perform a candidate beam detection outside the active DL BWP.

A wireless device may perform an L1-RSRP measurement for an RS of the one or more second RSs. The wireless device may compare the L1-RSRP measurement to the second threshold (rsrp-ThresholdSSB, rsrp-ThresholdCSI-rs), for example, to select/determine at least one candidate beam (or candidate RS) for BFR.

A wireless device may be active on a first DL BWP of a serving cell. The first DL BWP may be an active DL BWP of the serving cell based on being active on the first DL BWP. The wireless device may not perform a beam failure detection outside the active DL BWP. The wireless device may not perform a candidate beam detection outside the active DL BWP. A second DL BWP of the serving cell may be deactivated. The wireless device may not perform a beam failure detection for the second DL BWP based on the second DL BWP being deactivated. The wireless device may not perform a candidate beam detection for the second DL BWP based on the second DL BWP being deactivated.

A wireless device may estimate/determine/measure a first radio link quality of a CSI-RS with/using a first subcarrier spacing (SCS) for a beam failure detection. A wireless device may estimate/determine/measure a second radio link quality of a SSB with/using a second subcarrier spacing (SCS) for a beam failure detection. The wireless device may not perform beam failure detection measurements, for example, based on the first SCS and the second SCS being different. The wireless device may not perform beam failure detection measurements, for example, based on the CSI-RS and the SSB being frequency division multiplexes (FDM-ed) in at least one symbol (e.g., an OFDM symbol).

A wireless device may perform a BFR procedure on an SpCell (e.g., PCell or PSCell). A base station may send (e.g., transmit), to a wireless device, one or more messages comprising configuration parameters of one or more cells. The one or more cells may comprise at least one PCell/PSCell and/or one or more SCells. An SpCell (e.g., PCell or PSCell) and one or more SCells may operate on different frequencies and/or different bands.

An SCell of the one or more SCells may support a multi-beam operation. A wireless device may perform one or more beam management procedures (e.g., a BFR procedure) on or for the SCell, for example, based on the SCell supporting multi-beam operation. The wireless device may perform a BFR procedure for the SCell, for example, if at least one of one or more beam pair links between the SCell and the wireless device fails. Certain BFR procedures may result in inefficiencies based on a beam failure for the SCell. Certain BFR procedures may be inefficient, take a long time, and/or increase battery power consumption.

Downlink radio efficiency may be improved and/or uplink signaling overhead may be reduced, for example, if a beam failure occurs for one or more SCells based on one or more BFR procedures described herein. Random access resources of a first cell may be used, for example, if a beam failure occurs for an SCell of one or more SCells. Downlink signaling processes may be enhanced for recovery of a beam failure for an SCell. Uplink signaling may be enhanced for a BFR procedure of the SCell.

A BFR procedure for an SCell may be provided based on the one or more BFR procedures described herein. A duration of the BFR procedure may be reduced and/or battery power consumption may be reduced based on the one or more BFR procedures described herein.

A wireless device may be configured, by a base station, with an SCell. The SCell may not have uplink resources. The SCell may comprise downlink resources. The wireless device may not transmit an uplink signal (e.g., preamble) for a BFR procedure of the SCell on the SCell, for example, based on not having uplink resources and/or if the wireless device detects a beam failure on the SCell. The wireless device may not perform a BFR procedure on the SCell. The base station may not be aware of the beam failure on the SCell based on the wireless device not performing the BFR procedure. A BFR procedure may be provided, for example, if an SCell comprises downlink-only resources based on the one or more BFR procedures described herein.

An SCell may operate in a high frequency (e.g., 23 GHz, 60 GHz, 70 GHz, or any other frequency such as a frequency greater than a low frequency). An SpCell may operate in a low frequency (e.g., 2.4 GHz, 5 GHz, or any other frequency such as a frequency less than a high frequency). A channel condition of the SCell may be different from a channel condition of the SpCell. The wireless device may use uplink resources of the SpCell to send (e.g., transmit) a preamble for a BFR request for the SCell, for example, to improve robustness of transmission of the preamble. A BFR procedure may be provided, for example, if an SCell operates in a different frequency than a PCell. A BFR procedure may be provided, for example, if an SCell used uplink resources (e.g., random access resources, uplink BWPs of the PCell) of the PCell for a BFR procedure of the SCell.

A BFR procedure may reuse one or more features of a random-access procedure. The wireless device may determine/start a response window, for example, after or in response to sending/transmitting a preamble for a random-access procedure if the wireless device initiates/triggers/starts the random-access procedure for BFR of a primary cell. The wireless device may complete the BFR, for example, after or in response to receiving, during the response window, DCI in a dedicated control resource set (e.g., CORESET).

A BFR procedure for a secondary cell may not reuse the random-access procedure. The BFR procedure for the secondary cell may be based on a PUCCH transmission and/or a PUSCH transmission. The wireless device may send/transmit an SR-like signal or a BFRQ via a PUCCH resource of a cell (e.g., primary cell) for the BFR procedure of the secondary cell, for example, for the PUCCH-based BFR procedure, if the wireless device initiates/triggers/starts the BFR procedure. The wireless device may send/transmit a MAC-CE (e.g., a BFR MAC-CE) via a PUSCH resource of a cell (e.g., a primary cell) for the BFR procedure of the secondary cell, for example, for a PUSCH-based BFR procedure, if the wireless device initiates/triggers/starts the BFR procedure.

In MAC-CE transmissions of at least some systems, a wireless device may not determine/start a window (e.g., a response window), It may not be clear if/when the wireless device starts monitoring a dedicated CORESET (e.g., CORESET) to complete the BFR procedure of the secondary cell, for example, in a MAC-CE based BFR procedure. The wireless device may consume unnecessary power for monitoring the dedicated CORESET, such as by monitoring the dedicated CORESET for a longer time period (e.g., if the wireless device starts monitoring earlier than the time at which the base station sends/transmits the DCI in the dedicated CORESET). The wireless device may miss and/or may not receive the DCI, for example, if the wireless device starts monitoring the dedicated CORESET after the base station sends/transmits the DCI in the dedicated CORESET. The wireless device may not complete the BFR procedure, which may cause increased latency/delay of the BFR procedure, for example, based on missing and/or not receiving the DCI. In examples described herein, a wireless device may start a response window for a MAC-CE based BFR procedure. One or more determinations to start the response window for a PUCCH based BFR procedure may be made by a base station and/or by a wireless device.

A wireless device may experience a failure of one or more uplink channels, for example, if the wireless device detects a beam failure on corresponding downlink channels. The wireless device may be configured to send/transmit a PUCCH with/using the same spatial filter (e.g., associated with the beam1) used in the preamble transmission for the random-access procedure of the BFR for the primary cell, for example, after the wireless device completes a BFR procedure for a primary cell. The wireless device may be configured to send/transmit the PUCCH, for example, until the PUCCH of the primary cell is reconfigured/activated (e.g., during a time period between T3 1906 and T4 1908 shown in FIG. 19).

A wireless device may send/transmit an uplink signal (e.g., a preamble, a BFR MAC-CE, a PUCCH, a BFRQ) via the primary cell, for example, for a BFR procedure for a secondary cell. The wireless device may not apply/use the spatial filter used for the transmission of the uplink signal via a primary cell, for example, for the PUCCH transmission via the secondary cell. The wireless device may apply/use a spatial filter associated with a candidate beam (e.g., candidate beam1 shown in FIG. 20) for the PUCCH transmission via the secondary cell. The primary cell and the secondary cell may operate on different frequencies. The spatial filter on the primary cell may not be suitable, and/or may not be used, for the PUCCH transmission on the secondary cell. The base station may not receive the PUCCH transmission via the secondary cell reliably, for example, if the PUCCH is sent/transmitted with the spatial filter used in the uplink signal transmission via the primary cell. One or more factors may be used by the base station and/or by the wireless device to determine which spatial filter to use for a PUCCH transmission via the secondary cell, for example, during/ after a BFR procedure of a secondary cell. Examples described herein for spatial filters to use for a PUCCH transmission, via the secondary cell during/after a BFR procedure of the secondary cell, may be determined by the base station and/or by the wireless device.

A wireless device may initiate/start/trigger a BFR procedure for a secondary cell (e.g., an SCell configured with a PUCCH, an SCell not configured with a PUCCH, etc.). The wireless device may send/transmit, via a primary cell (e.g., a PCell, a PSCell, etc.), an uplink signal (e.g., a BFR MAC CE, a preamble, an SR, etc.) for BFR associated with the secondary cell. The wireless device may measure one or more candidate RSs. The wireless device may select a candidate beam and/or a candidate beam RS. The uplink signal may comprise an indication of the selected candidate beam and/or the candidate beam RS. The wireless device may receive a response (e.g., a BFR response) to the uplink signal. The wireless device may complete the BFR procedure, for example, based on the response to the uplink signal. The wireless device may have not received activation/reconfiguration of PUCCH resource(s), for example, after completing the BFR procedure. The wireless device may send/transmit a PUCCH via the secondary cell and/or via another secondary cell configured with PUCCH, for example, with/using the beam/spatial relation/spatial filter used to send/transmit the uplink signal via the primary cell (e.g., after completing the BFR procedure but before PUCCH resource(s) are activated/reconfigured). A performance loss may occur, for example, due to different beam characteristics of the primary cell and the secondary cell. The primary cell and the secondary cell may operate in different frequencies/bands/sub-bands/BWPs/etc. The beam, spatial relation, and/or spatial filter optimized for the primary cell may not suitable for an uplink channel transmission (e.g., a PUCCH transmission, a PUSCH transmission) via the secondary cell. The beam, spatial relation, and/or spatial filter previously configured for the secondary cell may not be suitable for an uplink channel transmission (e.g., a PUCCH transmission, a PUSCH transmission) via the secondary cell, for example, due to the occurrence of the beam failure associated with the secondary cell.

As described in examples herein, a wireless device may use a beam/spatial relation/spatial filter associated with a selected candidate beam and/or a selected candidate beam RS. The wireless device may use the beam/spatial relation/spatial filer associated with the selected candidate beam and/or the selected candidate beam RS, for example, for the uplink channel transmission, at least until the wireless device receives activation/reconfiguration of uplink resource(s) (e.g., PUCCH resources for the secondary cell). The beam/spatial relation/spatial filter may be more suitable for the uplink channel transmission after completing the BFR procedure, for example, if the wireless device supports beam correspondence.

Figure 20:
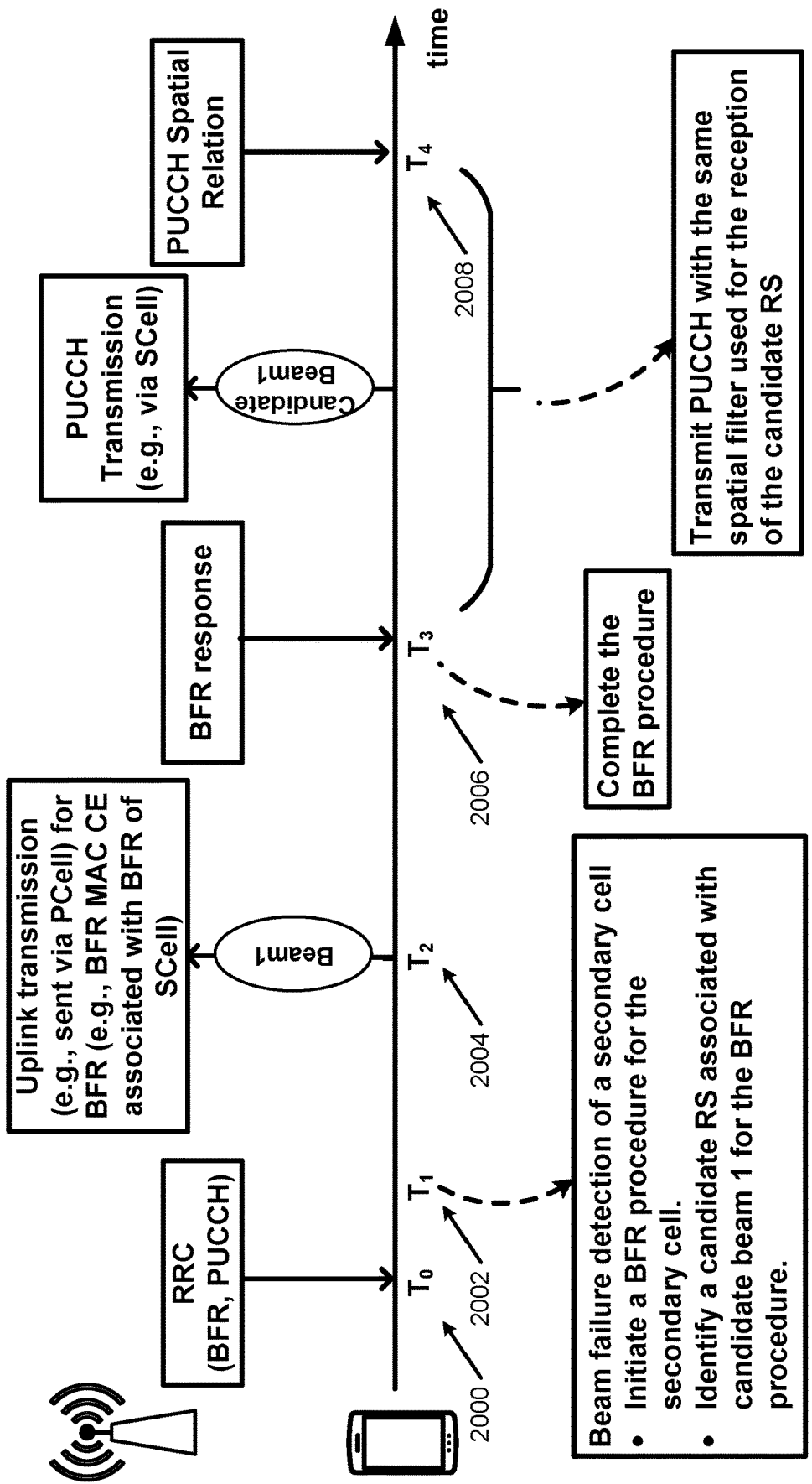
FIG. 20 show an example of downlink BFR (e.g., for a secondary cell).

FIG. 20 shows an example of downlink BFR (e.g., of a secondary cell). A wireless device may receive, from a base station, one or more messages comprising one or more configuration parameters for a first cell (e.g., PCell, PSCell, PUCCH SCell, SCell) and one or more secondary cells (e.g., at time T0 2000 shown in FIG. 20). The one or more secondary cells may comprise a second cell (e.g., SCell, SCell that may not be configured with PUCCH, SCell that may be configured with PUCCH). The one or more messages may comprise one or more RRC messages (e.g., an RRC connection reconfiguration message, an RRC connection reestablishment message, or an RRC connection setup message).

The one or more configuration parameters may comprise one or more BWP configuration parameters for a plurality of BWPs. The plurality of BWPs may comprise a first plurality of DL BWPs of the first cell and a first plurality of UL BWPs of the first cell. The plurality of BWPs may comprise a second plurality of DL BWPs of the second cell and a second plurality of UL BWPs of the second cell. The first plurality of DL BWPs may comprise a first downlink BWP of the first cell. The first plurality of UL BWPs may comprise a first uplink BWP of the first cell. The second plurality of DL BWPs may comprise a second downlink BWP of the second cell. The second plurality of UL BWPs may comprise a second uplink BWP of the second cell.

The one or more configuration parameters may indicate one or more first RSs (e.g., RadioLinkMonitoringRS configured/provided in an IE RadioLinkMonitoringConfig) for the second downlink BWP of the second cell. The one or more first RSs may comprise one or more CSI-RSs. The one or more first RSs may comprise one or more SS/PBCH blocks. The one or more configuration parameters may indicate a maximum beam failure instance (BFI) counter (e.g., beamFailureInstanceMaxCount) for the second cell. The wireless device may assess/determine/measure the one or more first RSs to determine/detect a beam failure for the second downlink BWP of the second cell. The one or more configuration parameters may indicate a first threshold (e.g., configured/provided by rlmInSyncOutOfSyncThreshold, Qout,LR).

The one or more configuration parameters may indicate one or more second RSs (e.g., candidateBeamRSList configured/provided in IE BeamFailureRecoveryConfig) for the second downlink BWP of the second cell. The wireless device may assess/determine the one or more second RSs to determine/select a candidate RS among the one or more second RSs for BFR of the second downlink BWP of the second cell.

The one or more configuration parameters may indicate a search space set (e.g., configured/provided by recoverySearchSpaceID in the IE BeamFailureRecoveryConfig). The search space set may be linked/associated with a control resource set (e.g., the CORESET). The search space set may indicate the CORESET. The wireless device may monitor the CORESET for a BFR of the second cell. The base station may configure the CORESET on the first cell. The base station may configure the CORESET on the second cell. The wireless device may monitor the search space set (e.g., linked to the CORESET) for a BFR of the second downlink BWP.

The one or more configuration parameters may indicate a second threshold (e.g., configured/provided by rsrp-ThresholdSSB in the IE BeamFailureRecoveryConfig) for BFR of the second cell (or the second downlink BWP). The one or more configuration parameters may indicate a BFR timer (e.g., configured/provided by beamFailureRecoveryTimer in the IE BeamFailureRecoveryConfig) for BFR of the second cell (or the second downlink BWP).

The base station may configure the second threshold in a BWP (e.g., UL BWP, DL BWP) of the first cell. The base station may configure the BFR timer in a BWP (e.g., UL BWP, DL BWP) of the first cell.

The base station may configure the second threshold in a BWP (e.g., UL BWP, DL BWP) of the second cell. The base station may configure the BFR timer in a BWP (e.g., UL BWP, DL BWP) of the second cell.

The second downlink BWP may be an active downlink BWP of the second cell. A physical layer in the wireless device may measure/assess/determine a first radio link quality of the one or more first RSs (for a beam failure detection of the second downlink BWP). The physical layer may send/transmit/provide a BFI indication to a higher layer (e.g., a MAC layer, a MAC entity) of the wireless device, for example, if the first radio link quality is worse/lower (e.g., higher BLER, lower L1-RSRP, lower L1-SINR) than the first threshold.

The higher layer (e.g., a MAC layer, a MAC entity) of the wireless device may increment BFI_COUNTER by one, for example, after or in response to the physical layer sending/transmitting/providing the BFI indication (e.g., at time T 1800, 2T 1802, 4T 1806, 5T 1808, and 6T 1810 shown in FIG. 18). The BFI_COUNTER may be a counter for a BFI indication. The wireless device may initially set the BFI_COUNTER to zero.

After incrementing the BFI_COUNTER one or more times, the BFI_COUNTER may be equal to or greater than the maximum BFI counter (e.g., beamFailureInstanceMaxCount). The wireless device may determine/detect a beam failure of the second downlink BWP of the second cell, for example, based on the BFI_COUNTER being equal to or greater than the maximum BFI counter (e.g., at time T1 2002 shown in FIG. 20). The wireless device may initiate/trigger/starts a BFR procedure for the second downlink BWP of the second cell, for example, based on the determining/detecting the beam failure of the second downlink BWP (e.g., at time T1 2002 shown in FIG. 20). The wireless device, if configured, may start/trigger/initiate the BFR timer, for example, based on the initiating the BFR procedure.

The wireless device may initiate/trigger/start a candidate beam selection for the BFR procedure (e.g., at time T1 2002 shown in FIG. 20), for example, based on the initiating/triggering/starting the BFR procedure. The candidate beam selection may comprise selecting/identifying/determining a candidate RS (e.g., CSI-RS, SS/PBCH blocks) in the one or more second RSs.

The wireless device may initiate/trigger/start the candidate beam selection for the BFR procedure, for example, before the initiating/starting/triggering the BFR procedure. The wireless device may initiate/trigger/start a candidate beam selection for the BFR procedure, for example, before the determining/detecting the beam failure of the second downlink BWP. The wireless device may perform one or more measurements on the one or more second RSs in parallel with measuring/estimating/determining a first radio link quality of the one or more first RSs.

The initiating/triggering/starting the candidate beam selection may comprise requesting (e.g., by the higher layer from the physical layer) one or more indexes (e.g., periodic CSI-RS configuration indexes and/or the SSB indexes configured/provided by the one or more configuration parameters) of one or more candidate RSs among the one or more second RSs and one or more candidate measurements (e.g., L1-RSRP measurements) of the one or more candidate RSs. Each measurement of the one or more candidate measurements may indicate a signal quality that is better/higher (e.g. lower BLER or higher L1-RSRP or higher L1-SINR) than the second threshold (e.g., rsrp-ThresholdSSB).

The wireless device (e.g., the physical layer of the wireless device) may perform one or more measurements (e.g. L1-RSRP measurement) for the one or more second RSs, for example, for the candidate beam selection. The wireless device may perform one or more measurements for each RS of the one or more second RSs. The wireless device (e.g., the physical layer of the wireless device) may perform a first measurement of the one or more measurements for a first RS of the one or more second RSs. The wireless device (e.g., the physical layer) may perform a second measurement of the one or more measurements for a second RS of the one or more second RSs. The wireless device (e.g., the physical layer) may perform a third measurement of the one or more measurements for a third RS of the one or more second RSs.

One or more candidate RSs of the one or more second RSs may have one or more candidate measurements indicating a signal quality that is better/greater (e.g., lower BLER or higher L1-RSRP or higher SINR) than the second threshold (e.g., rsrp-ThresholdSSB). The first measurement for the first RS may indicate a signal quality that is better/greater (e.g., higher L1-RSRP) than the second threshold. The second measurement for the second RS may indicate a signal quality that is better/greater (e.g., higher L1-RSRP) than the second threshold. The third measurement for the third RS may indicate a signal quality that is worse/less (e.g., lower L1-RSRP) than the second threshold. The one or more candidate RSs may comprise the first RS and the second RS, for example, based on the first measurement and second measurement indicating a signal quality being better/greater than the second threshold and the third measurement indicating a signal quality being worse/less than the second threshold, respectively.

The wireless device (e.g., the physical layer of the wireless device) may send/transmit/provide, to the higher layer (e.g., a MAC layer, a MAC entity) of the wireless device, one or more indexes of the one or more candidate RSs (e.g., the first RS, the second RS) and one or more candidate measurements (e.g., the first measurement, the second measurement) of the one or more candidate RSs. The one or more configuration parameters may indicate the one or more indexes. Each RS of the one or more second RSs may be determined/identified by an RS index (e.g., indicated by the one or more configuration parameters, periodic CSI-RS configuration indexes and/or the SSB indexes).

The wireless device (e.g., the higher layer of the wireless device, such as a MAC layer, a MAC entity, etc.) may select/determine a candidate RS among the one or more candidate RSs, for example, after or in response to receiving the one or more indexes and the one or more candidate measurements associated with the one or more candidate RSs. The higher layer may indicate the candidate RS to the physical layer of the wireless device. The candidate RS may be associated with a candidate RS index (e.g., periodic CSI-RS configuration indexes and/or the SSB indexes configured/provided by the one or more configuration parameters).

The one or more configuration parameters may indicate one or more uplink physical channels for BFR of the second cell. The one or more uplink physical channels may comprise a physical random-access channel (PRACH), a physical uplink control channel (PUCCH), or a physical uplink shared channel (PUSCH).

The base station may configure the one or more uplink physical channels on the first cell. The base station may configure the one or more uplink physical channels on the second cell.

The one or more uplink physical channels may be dedicated to the BFR procedure of the second cell. The base station may be informed of the BFR procedure of the second cell, for example, after or in response to being dedicated to the BFR procedure of the second cell, if the base station receives an uplink signal (e.g., a preamble via PRACH, BFR request (BFRQ) transmission via a PUCCH, a scheduling request (SR) via a PUCCH, a BFR MAC-CE via a PUSCH) via at least one uplink physical channel (e.g., a BFR-PRACH or a BFR-PUCCH) of the one or more uplink physical channels.

The one or more uplink physical channels may not be dedicated to the BFR procedure of the second cell. The base station may not distinguish whether the uplink signal is sent/transmitted for a BFR procedure of the second cell or for requesting uplink shared channel (UL-SCH) resources for an uplink transmission, for example, if the base station receives an uplink signal (e.g., the SR) via at least one uplink physical channel (e.g., the PUCCH) of the one or more uplink physical channels.

The wireless device may send/transmit an uplink signal (e.g., a preamble via a PRACH, a BFRQ transmission via a PUCCH, a scheduling request (SR) via a PUCCH, a BFR MAC-CE via a PUSCH) via at least one uplink physical channel (e.g., a BFR-PRACH or a BFR-PUCCH or a PUSCH or a PUCCH) of the one or more uplink physical channels, for example, based on initiating/triggering/starting the BFR procedure for the second cell (e.g., at time T2 2004 in FIG. 20).

The BFR procedure may be a PUCCH-based (e.g., a BFR-PUCCH) procedure. The uplink signal may be a BFRQ/SR/SR-like-signal and the at least one uplink physical channel may be a PUCCH, for example, based on the BFR procedure being the PUCCH-based procedure.

The BFR procedure may be a MAC-CE-based (e.g., BFR-PUSCH) procedure. The uplink signal may be a BFR MAC-CE and the at least one uplink physical channel may be a PUSCH, for example, if the BFR procedure being the MAC-CE-based procedure.

The BFR procedure may be a RACH-based (e.g., BFR-PRACH) procedure. The uplink signal may be a random-access preamble and the at least one uplink physical channel may be a PRACH, for example, if the BFR procedure being the RACH-based procedure.

The one or more configuration parameters may indicate a response window for BFR of the second cell. The one or more configuration parameters may indicate a maximum transmission counter (e.g., sr-TransMax, bfrq-TransMax, preambleTransMax) for BFR of the second cell.

The wireless device may determine/start the response window (e.g., ra-responseWindow, sr-prohibit timer, bfrq-prohibit timer), for monitoring a BFR response from the base station, for example, based on the sending/transmitting the uplink signal. The wireless device may monitor, for the BFR response from the base station, at least one PDCCH in the CORESET (e.g., linked to the search space set) during the response window (or while the response window is running) At least one DM-RS of the at least one PDCCH may be associated (e.g., QCL-ed) with the candidate RS.

The BFR response may comprise DCI indicating an uplink grant (e.g., for the second cell). The BFR response may comprise DCI indicating a downlink assignment (e.g., for the second cell). The DCI may be configured with CRC scrambled by an RNTI (e.g., C-RNTI, MCS-C-RNTI) of the wireless device. The DCI may be addressed to the RNTI.

The wireless device may increment a transmission counter (e.g., preamble_transmission_counter, sr-counter, bfrq-counter) by one, for example, based on the sending/transmitting an uplink signal. The wireless device may initially set the transmission counter to an initial value (e.g., zero, one or any other value) based on the initiating/triggering/starting the BFR procedure. The wireless device may resend/retransmit an uplink signal for the BFR procedure, for example, until the transmission counter reaches the maximum transmission counter.

The wireless device may complete the BFR procedure for the second cell successfully, for example, based on receiving the BFR response in the CORESET (or in the search space set) during the response window (e.g., at time T3 2006 shown in FIG. 20). The one or more configuration parameters may indicate one or more PUCCH resources (e.g., PUCCH at time T0 2000 shown in FIG. 20) on the second cell.

The base station may configure/provide the wireless device with a parameter, spatial relation (or setting) info (e.g., indicated by IE PUCCH-Spatialrelationinfo), for a PUCCH resource of the one or more PUCCH resources. The IE PUCCH-SpatialRelationInfo (or the spatial relation info) for the PUCCH resource may provide/indicate/comprise an index (e.g., ssb-Index, csi-RS-Index, srs).

The index may be an ssb-Index indicating a SS/PBCH block. The wireless device may use a spatial domain filter for a reception of the SS/PBCH block. The wireless device may send/transmit a second uplink signal via the PUCCH resource using the spatial domain filter (e.g., used for the reception of the SS/PBCH block), for example, based on the index being the ssb-Index indicating the SS/PBCH block.

The index may be a csi-RS-Index indicating a CSI-RS. The wireless device may use a spatial domain filter for a reception of the CSI-RS. The wireless device may send/transmit a second uplink signal via the PUCCH resource using the spatial domain filter (e.g., used for the reception of the CSI-RS), for example, based on the index being the csi-RS-Index indicating the CSI-RS.

The index may be a parameter, srs, indicating an SRS. The wireless device may use a spatial domain filter for a transmission of the SRS. The wireless device may send/transmit a second uplink signal via the PUCCH resource using the spatial domain filter (e.g., used for the transmission of the SRS), for example, based on the index being the srs indicating the SRS.

A base station may activate and deactivate a spatial relation (e.g., configured by a spatial relation info parameter) for a PUCCH resource of one or more PUCCH resources of a serving cell (e.g., the second cell), for example, by sending a PUCCH spatial relation Activation/Deactivation MAC CE. The PUCCH spatial relation Activation/Deactivation MAC CE may be determined/identified by a MAC PDU subheader with LCID (e.g., index 49 or any other index number). The PUCCH spatial relation Activation/Deactivation MAC CE may comprise one or more fields. A first field of the one or more fields may indicate an index of the serving cell (e.g., Serving Cell ID). The first field may indicate an identity of the serving cell for which the PUCCH spatial relation Activation/Deactivation MAC CE applies. A second field of the one or more fields may indicate a BWP index (e.g., BWP ID) of an uplink BWP for which the PUCCH spatial relation Activation/Deactivation MAC CE applies. A third field of the one or more fields may indicate an identifier of a PUCCH resource (PUCCH Resource ID), of the one or more PUCCH resources, determined/identified by a higher layer parameter PUCCH-ResourceId. A fourth field of the one or more fields may comprise a spatial relation info index (e.g., PUCCH-SpatialRelationInfoId) indicating spatial relation info (e.g., configured/provided by IE PUCCH-Spatialrelationinfo).

The base station may use a spatial relation info index (e.g., PUCCH-SpatialRelationInfo) to configure spatial relation (or setting) info for a PUCCH transmission (or resource). The base station may configure one or more spatial relation info parameters (e.g., configured/provided by a higher layer parameter spatialRelationInfoToAddModList) for an uplink BWP (e.g., the second uplink BWP) of a serving cell (e.g., the second cell). A spatial relation info parameter of the one or more spatial relation info parameters may be identified/indicated by a spatial relation info index (e.g., configured/provided by a higher layer parameter PUCCH-SpatialRelationInfoId). The base station may configure one or more PUCCH resources for the uplink BWP of the serving cell. A PUCCH resource of the one or more PUCCH resources may be identified/indicated by a PUCCH resource index (e.g., configured/provided by a higher layer parameter PUCCH-ResourceId).

The base station may send/transmit a PUCCH spatial relation Activation/Deactivation MAC CE comprising one or more fields. A third field of the one or more fields may comprise the PUCCH resource index indicating the PUCCH resource of the one or more PUCCH resources. A fourth field of the one or more fields may comprise the spatial relation information index indicating the spatial relation information parameter. The spatial relation information parameter may indicate a spatial transmission filter (e.g., by ssb-Index, csi-RS-Index, srs). Based on the third field indicating the PUCCH resource and the fourth field indicating the spatial relation information parameter, the wireless device may send/transmit a second uplink signal via the PUCCH resource using the spatial transmission filter indicated by the spatial relation information parameter.

The wireless device may use a second spatial filter for a reception of the candidate RS. The BFR response may be DCI. The wireless device may determine/detect the DCI, with CRC scrambled by the RNTI, in the at least one PDCCH in the CORESET (or the search space set configured/provided by the higher layer parameter recoverySearchSpaceId). The wireless device may send/transmit a second uplink signal via the PUCCH resource (e.g., PUCCH transmission in FIG. 20) of the one or more PUCCH resources on the second cell, for example, after a first number of symbols (e.g., 28 symbols or any other number of symbols) from the last symbol in which a reception of the at least one PDCCH is complete. The wireless device may send/transmit the second uplink signal using the second spatial filter used for the reception of the candidate RS, for example, until the wireless device receives an activation command (e.g., PUCCH spatial relation Activation/Deactivation MAC CE) for a spatial relation info parameter (e.g., PUCCH-Spatialrelationinfo) or is configured/provided with IE PUCCH-Spatialrelationinfo for the one or more PUCCH resources (or the PUCCH resource) for the second cell (e.g., at time T4 2008 in FIG. 20).

The wireless device may use a second spatial filter for a reception of the candidate RS. The wireless device may receive the BFR response completing the BFR procedure successfully. The wireless device may send/transmit a second uplink signal via the PUCCH resource (e.g., PUCCH transmission in FIG. 20) on the second cell, for example, after a first quantity of symbols (e.g., 28 symbols or any other quantity of symbols) from the last symbol in which a reception of the BFR response is complete. The wireless device may send/transmit the second uplink signal using the second spatial filter used for the reception of the candidate RS, for example, at least until the wireless device receives an activation command (e.g., PUCCH spatial relation Activation/Deactivation MAC CE) for a spatial relation info parameter (e.g., PUCCH-Spatialrelationinfo) or is configured/provided with IE PUCCH-Spatialrelationinfo for the one or more PUCCH resources (or the PUCCH resource) for the second cell (e.g., time T4 2008 shown in FIG. 20).

The wireless device may use a second spatial filter for a reception of the candidate RS. The wireless device may receive the BFR response completing the BFR procedure successfully. The wireless device may send/transmit a second uplink signal via an uplink resource (e.g., PUSCH, SRS) via the second cell, for example, after a first quantity of symbols (e.g., 28 symbols or any other quantity of symbols) from the last symbol in which a reception of the BFR response is complete. The wireless device may send/transmit the second uplink signal using the second spatial filter used for the reception of the candidate RS, for example, at least until the wireless device receives an activation command or a reconfiguration message (e.g., a MAC CE, an RRC message) for a spatial relation info parameter for the uplink resource for the second cell (e.g., at time T4 2008 shown in FIG. 20).

A wireless device may perform a downlink measurement on one or more transmit (TX) beams of a transmission and reception point (TRP). The TRP may perform an uplink measurement on one or more receive (RX) beams of the TRP. A Tx/Rx beam correspondence at the TRP may exist/hold or may be assumed/configured, for example, if the TRP determines an RX beam of the TRP for an uplink reception based on the downlink measurement at the wireless device. A Tx/Rx beam correspondence at the TRP may exist/hold or may be assumed/configured/determined, for example, if the TRP determines a TX beam of the TRP for a downlink transmission based on the uplink measurement at the TRP.

A wireless device may perform a downlink measurement on one or more RX beams of the wireless device. The TRP may perform an uplink measurement on one or more TX beams of the wireless device. The TRP may send an indication of the uplink measurement to the wireless device. A Tx/Rx beam correspondence at the wireless device may exist/hold or be assumed/configured, for example, if the wireless device determines a TX beam of the wireless device for an uplink transmission based on the downlink measurement at the wireless device. A Tx/Rx beam correspondence at the wireless device may exist/hold or may be assumed/configured, for example, if the wireless device determines an RX beam of the wireless device for a downlink reception based on the indication of the uplink measurement.

A base station may use a TX beam in a downlink transmission for a RX beam in an uplink reception, for example, if a Tx/Rx beam correspondence exists/holds or is assumed/configured. A wireless device may use a RX beam in a downlink reception for a TX beam in an uplink transmission, for example, if a Tx/Rx beam correspondence exists/holds or is assumed/configured.

Transmit antennas and receive antennas may be separated. The transmit antennas and the receive antennas may not share physical antenna elements, for example, if the transmit antennas and receive antennas are separately configured. An angle of arrival and an angle of departure may be different, for example, if the transmit antennas and the receive antennas do not share physical antenna elements. A Tx/Rx beam correspondence may not exist/hold or may not be assumed/configured, for example, based on the angle of arrival and the angle of departure being different.

An angle of arrival and an angle of departure may be the same, for example, if the transmit antennas and the receive antennas share physical antenna elements. A Tx/Rx beam correspondence may exist/hold or may be assumed/configured, for example, based on the angle of arrival and the angle of departure being the same or substantially the same.

A Tx/Rx beam correspondence may require a calibration of an antenna array at a wireless device. The calibration of the antenna array may be difficult to achieve. Some wireless device may not use the TX/RX beam correspondence, for example, if the calibration of the antenna array is difficult to achieve. A capability indication and/or a signaling mechanism may be used to differentiate wireless devices that can use the TX/RX beam correspondence (and can skip UL beam sweeping) and wireless devices that cannot use the TX/RX beam correspondence (e.g., and may not skip UL beam sweeping). A wireless device may send/transmit a capability indication of a Tx/Rx beam correspondence to a TRP (or to a base station). The wireless device may report the capability indication of the Tx/Rx beam correspondence to the TRP (or to the base station), for example, during an initial access stage.

Figure 21:
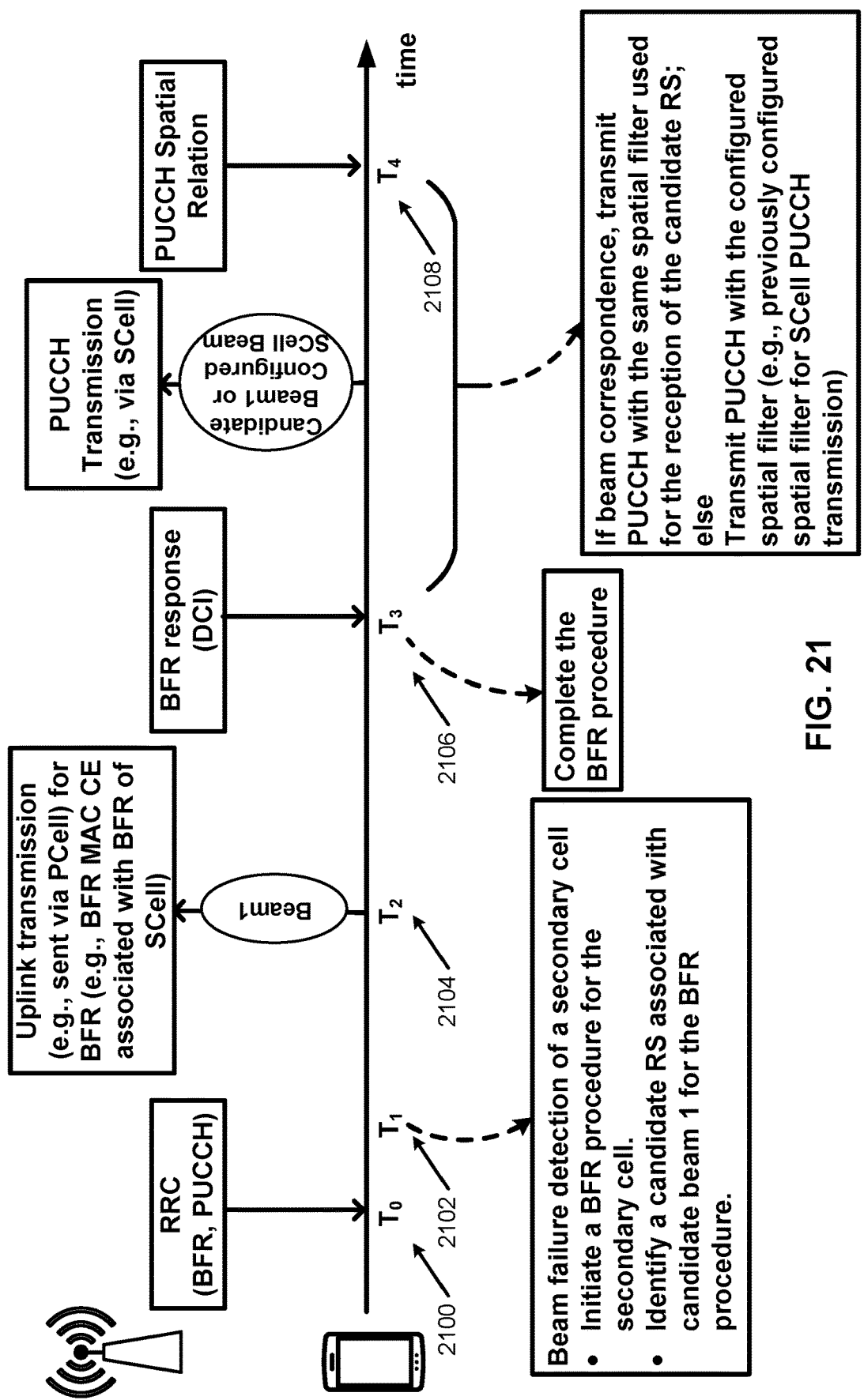
FIG. 21 shows an example of downlink BFR (e.g., for a secondary cell).

FIG. 21 shows an example of downlink BFR (e.g., of a secondary cell). The steps at time T0 2100, T1 2102, T2 2104, and T3 2106 shown in FIG. 21 may be the same as (or substantially the same as) the steps at time T0 2000, T1 2002, T2 2004, and T3 2006 shown in FIG. 20. One or more operations discussed for the steps at time T0 2000, T1 2002, T2 2004, and T3 2006 shown in FIG. 20 may be applicable for the steps at time T0 2100, T1 2102, T2 2104, and T3 2106 shown in FIG. 21.

The wireless device may use a second spatial filter for a reception of the candidate RS. The BFR response may be DCI. The wireless device may determine/detect the DCI, with/using CRC scrambled by the RNTI, in the at least one PDCCH in the CORESET (and/or using the search space set configured/provided by the higher layer parameter recoverySearchSpaceId).

A Tx/Rx beam correspondence (e.g., at the wireless device and/or at the TRP) may exist/hold or may be assumed/configured. The wireless device may send/transmit a second uplink signal via the PUCCH resource (e.g., PUCCH transmission in FIG. 21) on the second cell, for example, after a first quantity of symbols (e.g., 28 symbols or any other quantity of symbols) from the last symbol in which a reception of the at least one PDCCH is complete. The wireless device may send/transmit the second uplink signal using the second spatial filter used for the reception of the candidate RS if the Tx/Rx beam correspondence exists/holds or is assumed/configured, for example, at least until the wireless device receives an activation command (e.g., PUCCH spatial relation Activation/Deactivation MAC CE) for a spatial relation info parameter (e.g., PUCCH-Spatialrelationinfo) or is configured/provided IE PUCCH-Spatialrelationinfo for the one or more PUCCH resources (or the PUCCH resource) for the second cell (e.g., at time T4 2108 shown in FIG. 21).

The wireless device may determine/detect the DCI, with/using CRC scrambled by the RNTI, in the at least one PDCCH in the CORESET (and/or using the search space set configured/provided by the higher layer parameter recoverySearchSpaceId). A Tx/Rx beam correspondence (e.g., at the wireless device and/or at the TRP) may not exist/hold or may not be assumed/configured. The wireless device may send/transmit a second uplink signal via the PUCCH resource (e.g., PUCCH transmission shown in FIG. 21) on/associated with/via the second cell, for example, if the Tx/Rx beam correspondence does not exist/hold and/or is not assumed/configured. The wireless device may send/transmit the second uplink signal using the configured/activated spatial transmission filter associated with SCell PUCCH transmission and/or the spatial transmission filter indicated by the spatial relation info parameter (e.g., configured/provided IE PUCCH-Spatialrelationinfo, activated by PUCCH spatial relation Activation/Deactivation MAC CE). The wireless device may send/transmit the second uplink signal via the PUCCH resource, for example, if the Tx/Rx beam correspondence does not exist/hold or is not assumed/configured. The wireless device may send/transmit the second uplink signal via the PUCCH resource, for example, until the wireless device receives an activation command (e.g., PUCCH spatial relation Activation/Deactivation MAC CE) for a spatial relation info parameter (e.g., PUCCH-Spatialrelationinfo) and/or is configured/provided IE PUCCH-Spatialrelationinfo for the one or more PUCCH resources (or the PUCCH resource) for the second cell (e.g., at time T4 2108 in FIG. 21). The wireless device may send/transmit the second uplink signal, for example, during the BFR procedure. The wireless device may send/transmit the second uplink signal, for example, after completing the BFR procedure successfully.

The wireless device may use a second spatial filter for a reception of the candidate RS. The wireless device may receive the BFR response completing the BFR procedure successfully. A Tx/Rx beam correspondence (e.g., at the wireless device and/or at the TRP) may exist/hold or may be assumed/configured/determined. The wireless device may send/transmit a second uplink signal via the PUCCH resource (e.g., PUCCH transmission in FIG. 21) on/associated with/via the second cell, for example, after a first quantity of symbols (e.g., 28 symbols or any other quantity of symbols) from the last symbol in which a reception of the BFR response is complete. The wireless device may send/transmit the second uplink signal via the PUCCH resource, for example, if the Tx/Rx beam correspondence exists/holds and/or is assumed/configured/determined. The wireless device may send/transmit the second uplink signal using the second spatial filter used for the reception of the candidate RS, for example, at least until the wireless device receives an activation command (e.g., PUCCH spatial relation Activation/Deactivation MAC CE) for a new spatial relation info parameter (e.g., PUCCH-Spatialrelationinfo) or is configured/provided with IE PUCCH-Spatialrelationinfo for the one or more PUCCH resources (or the PUCCH resource) for/associated with the second cell (e.g., at time T4 2108 shown in FIG. 21).

The wireless device may receive the BFR response. The wireless device may complete the BFR procedure successfully, for example, based on receiving the BFR response. A Tx/Rx beam correspondence (e.g., at the wireless device and/or at the TRP) may not exist/hold and/or may not be assumed/configured/determined. The wireless device may send/transmit a second uplink signal via the PUCCH resource (e.g., PUCCH transmission in FIG. 21) on/associated with/via the second cell, for example, if the Tx/Rx beam correspondence does not exist/hold. The wireless device may send/transmit the second uplink signal via the PUCCH resource, for example, if the Tx/Rx beam correspondence is not assumed/configured/determined. The wireless device may send/transmit the second uplink signal, for example, using the spatial transmission filter indicated by the spatial relation info parameter (e.g., configured/provided IE PUCCH-Spatialrelationinfo, activated by PUCCH spatial relation Activation/Deactivation MAC CE). The wireless device may send/transmit the second uplink signal, for example, at least until the wireless device receives an activation command (e.g., PUCCH spatial relation Activation/Deactivation MAC CE) for a new spatial relation info parameter (e.g., PUCCH-Spatialrelationinfo) and/or is configured/provided with IE PUCCH-Spatialrelationinfo for the one or more PUCCH resources (or the PUCCH resource) for the second cell (e.g., at time T4 2108 in FIG. 21). The wireless device may send/transmit the second uplink signal, for example, during the BFR procedure. The wireless device may send/transmit the second uplink signal, for example, after completing the BFR procedure successfully.

The wireless device may use a second spatial filter for a reception of the candidate RS. The wireless device may receive the BFR response. The wireless device may complete the BFR procedure successfully, for example, based on receiving the BFR response. A Tx/Rx beam correspondence (e.g., at the wireless device and/or at the TRP) may exist/hold or may be assumed/configured/determined. The wireless device may send/transmit a second uplink signal via an uplink resource (e.g., PUSCH, SRS) on/associated with/via the second cell, for example, after a first quantity of symbols (e.g., 28 symbols or any other quantity of symbols) from the last symbol in which a reception of the BFR response is complete and/or if the Tx/Rx beam correspondence exists/holds and/or is assumed/configured/determined. The wireless device may send/transmit the second uplink signal using the second spatial filter used for the reception of the candidate RS, for example, at least until the wireless device receives an activation command and/or the wireless device receives a reconfiguration message (e.g., a MAC CE, an RRC message) for a new spatial relation info parameter for the uplink resource for the second cell (e.g., at time T4 2008 shown in FIG. 20 and/or at time T4 2108 shown in FIG. 21).

Figure 22A:
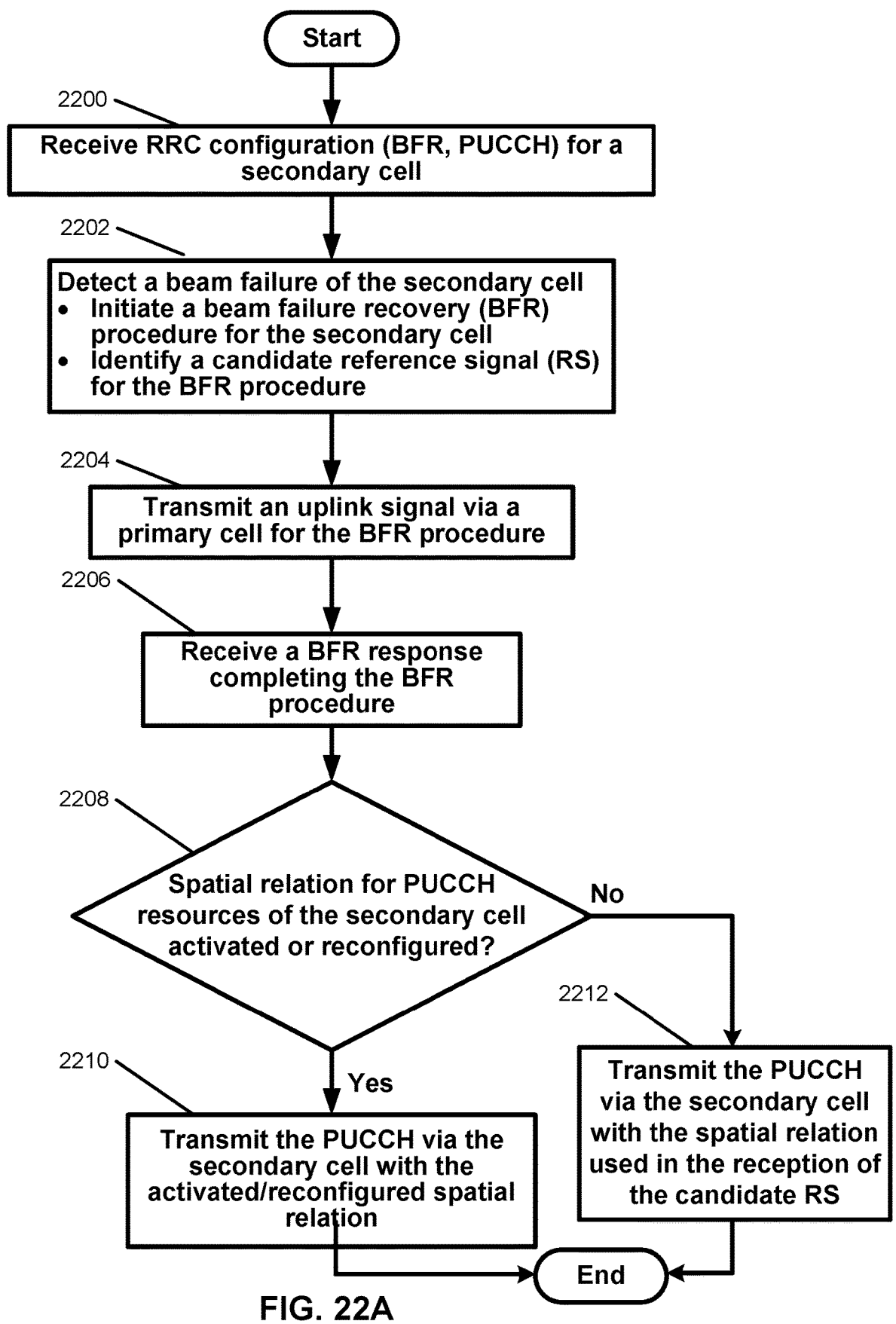
FIG. 22A shows an example method for downlink BFR (e.g., of a secondary cell).

FIG. 22A shows an example method for downlink BFR (e.g., of a secondary cell). At step 2200, a wireless device may receive configuration information (e.g., RRC configurations, such as BFR configurations, PUCCH configurations, etc.) for one or more cells comprising a primary cell and/or a secondary cell. At step 2202, the wireless device may determine/detect a beam failure associated with a secondary cell. The wireless device may initiate/trigger/start BFR associated with the secondary cell, for example, based on the determining/detecting the beam failure associated with the secondary cell. The wireless device may measure/identify/determine a candidate RS and/or a candidate beam for BFR associated with the secondary cell. At step 2204, the wireless device may send/transmit, via a primary cell, an uplink signal for BFR associated with the secondary cell. At step 2206, the wireless device may receive a BFR response, for example, after or in response to transmitting the uplink signal. The BFR response may indicate that BFR associated with the secondary cell is complete. At step 2208, the wireless device may determine whether a spatial relation/spatial filter for PUCCH resources of the secondary cell is activated/reconfigured. At step 2210, the wireless device may send/transmit the PUCCH via the secondary cell with the activated/reconfigured spatial relation/spatial filter, for example, if the spatial relation/spatial filter for PUCCH resources of the secondary cell is activated/reconfigured. At step 2212, the wireless device may send/transmit the PUCCH via the secondary cell with the spatial filter/beam used in the reception of the candidate RS, for example, if the spatial relation for PUCCH resources of the secondary cell is not activated/reconfigured.

Figure 22B:
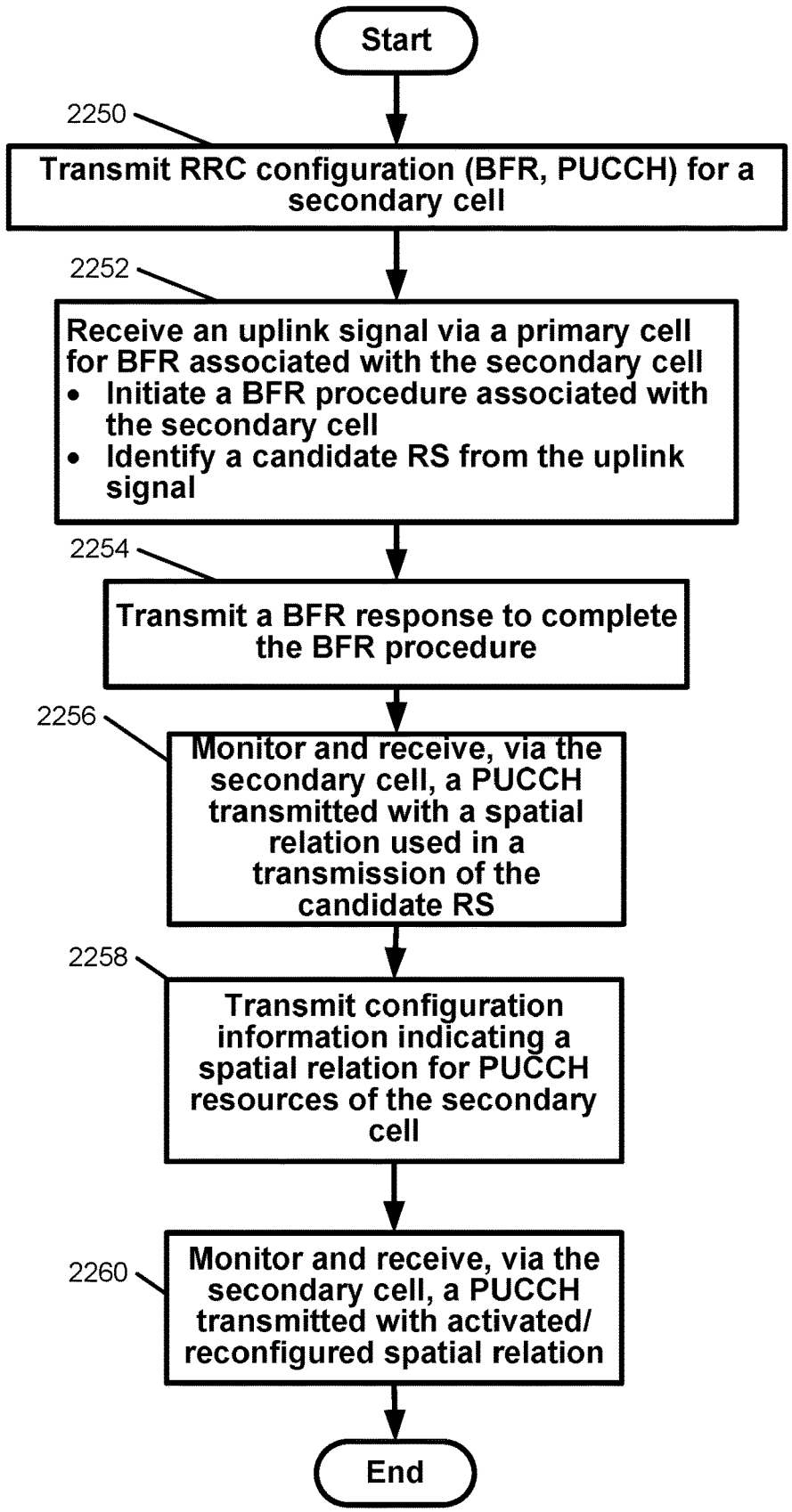
FIG. 22B shows an example method for downlink BFR (e.g., of a secondary cell).

FIG. 22B shows an example method for downlink BFR (e.g., of a secondary cell). At step 2250, a base station may send/transmit one or more messages comprising RRC configuration information (e.g., BFR, PUCCH) for one or more cells comprising a primary cell and/or a secondary cell. The base station may configure one or more candidate RSs for a wireless device. The wireless device may determine a candidate RS among the one or more candidate RSs, for example, based on a quality of the one or more candidate RSs. At step 2252, the base station may receive, from the wireless device, an uplink signal via a primary cell (or via a secondary cell configured with an uplink channel) for BFR associated with the secondary cell. The uplink signal may indicate that the wireless device has a beam failure associated with the secondary cell. The uplink signal may indicate a candidate beam for the secondary cell and/or a candidate beam RS for the secondary cell. The base station may determine/identify the candidate beam for the secondary cell, for example, based on receiving the uplink signal. At step 2254, the base station may send/transmit a BFR response to complete the BFR procedure. At step 2256, the base station may monitor and receive, via the secondary cell, a PUCCH sent/transmitted with a spatial relation/spatial filter used in a transmission of the candidate RS. At step 2258, the base station may send/transmit configuration information indicating a spatial relation/spatial filter for PUCCH resources of the secondary cell. At step 2260, the base station may monitor and receive, via the secondary cell, a PUCCH sent/transmitted with activated/reconfigured spatial relation/spatial filter.

A wireless device may use a response window and/or a timer for one or more determinations during a BFR procedure. The wireless device may monitor a response, for example, after or in response to sending an uplink signal for BFR of one or more secondary cells. The wireless device may not find a suitable candidate beam and may not indicate a suitable candidate beam in the uplink signal. A wireless device may monitor a dedicated CORESET of a primary cell, for example, to determine that a BFR procedure is complete. The wireless device may not indicate that one or more candidate beam is suitable, for example, due to the monitoring is associated with the dedicated CORESET of a primary cell. The wireless device may receive an acknowledgement, for example, after or in response to sending/transmitting the uplink signal (e.g., a MAC CE, a BFR MAC CE). The reception of the acknowledgement may not be sufficient to complete the BFR procedure associated with the one or more secondary cells, for example, if the acknowledgement is received via the primary cell and if the channel environments are different for the primary cell and the one or more secondary cells. The wireless device may monitor, during a response window (e.g., based on a timer), a dedicated CORESET (e.g., a dedicated CORESET of the primary cell, a dedicated CORESET of one or more secondary cells), for example, to complete the BFR procedure. The one or more secondary cells may be used for communication channels that require reliable channel environment (e.g., ultra-reliable low-latency communication (URLLC)), and more reliable BFR procedures for the one or more secondary cells may improve/enhance the communication efficiency and/or reliability.

Figure 23:
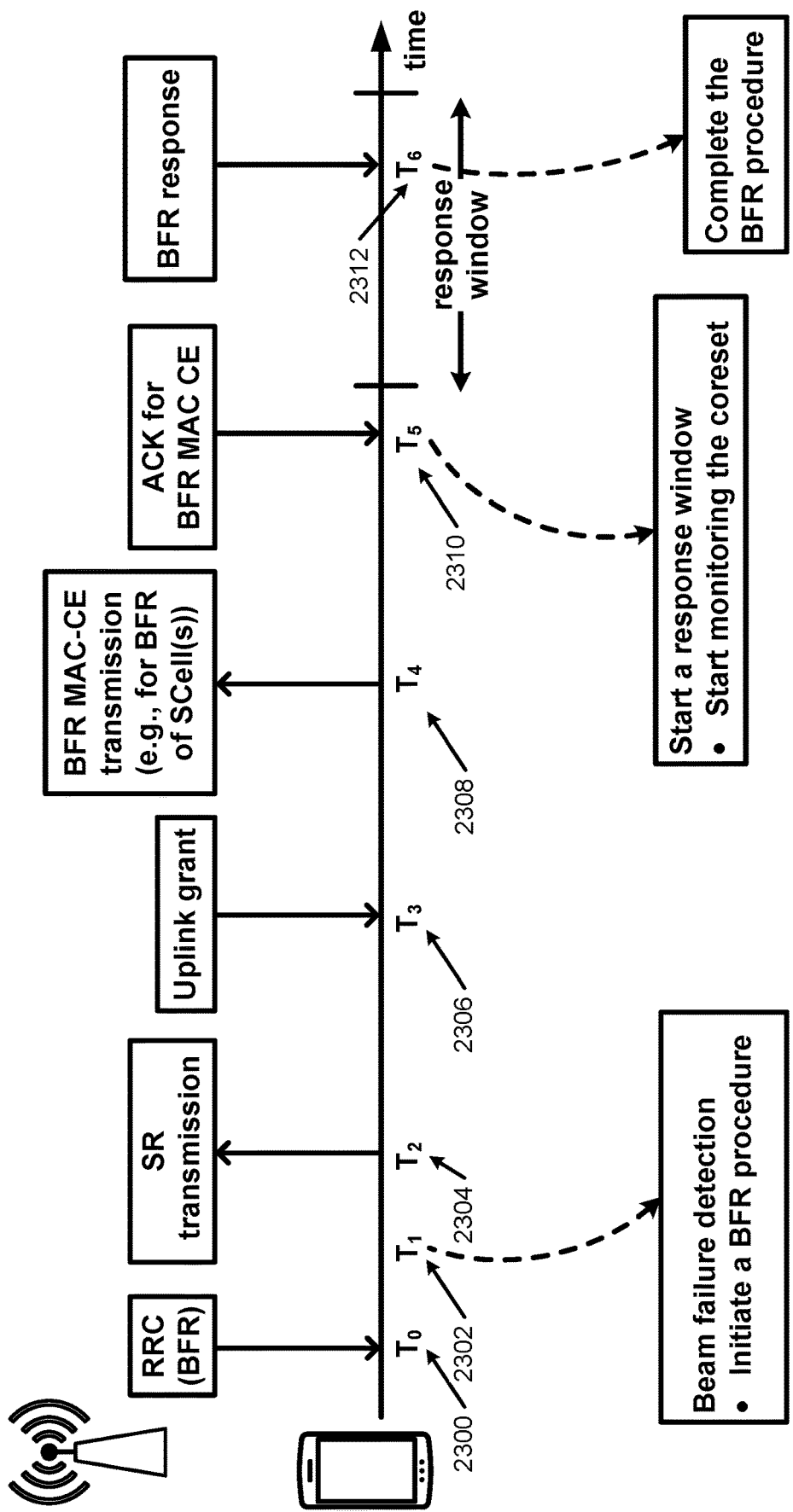
FIG. 23 shows an example of downlink BFR (e.g., for a secondary cell).

FIG. 23 shows an example of downlink BFR (e.g., of a secondary cell). The wireless device may receive the one or more configuration parameters from the base station (e.g., at time T0 2300 shown in FIG. 23). The wireless device may determine/detect the beam failure for the second downlink BWP of the second cell (e.g., at time T1 2302). The one or more configuration parameters may indicate a cell index of the second cell (e.g., configured/provided by a higher layer parameter servCellIndex). The second downlink BWP may be determined/identified/indicated by a downlink BWP index (e.g., configured/provided by a higher layer parameter bwp-ID in the one or more configuration parameters). The wireless device may determine/select/identify/indicate the candidate RS associated with a candidate RS index (e.g., configured/provided by a higher layer parameter in the one or more configuration parameters), for example, after or in response to the detecting the beam failure for the second downlink BWP. The wireless device may determine/select/identify/indicate the candidate RS through the candidate beam selection.

The wireless device may initiate/trigger/start a BFR procedure for the second downlink BWP of the second cell, for example, based on the detecting the beam failure of the second downlink BWP (e.g., at time T1 2302 shown in FIG. 23). The BFR procedure may be a MAC-CE based BFR procedure. In the MAC-CE based BFR procedure, the uplink signal may be a BFR medium access control control element (e.g., a BFR MAC-CE). The wireless device may send/transmit the BFR MAC-CE for the BFR procedure of the second downlink BWP of the second cell (e.g., at time T4 2308 shown in FIG. 23). The BFR MAC CE may comprise one or more fields. The one or more fields may comprise at least one of: a first field indicating the cell index of the second cell, a second field indicating the candidate RS index of the candidate RS or a third field indicating the downlink BWP index of the second downlink BWP. The base station may be informed of the BFR procedure of the second cell and the candidate RS, for example, based on the BFR MAC-CE.

A BFR MAC CE may have an LCID in a MAC subheader corresponding to the BFR MAC CE. The LCID given by a six-digit (or any other quantity of digits) binary number (e.g., 110011) in the MAC subheader may indicate the BFR MAC CE. The LCID of the BFR MAC CE may be fixed/pre-configured.

The wireless device may have an uplink grant, for example, at the time that the wireless device determines/detects the beam failure. The wireless device may have an uplink grant, for example, at the time that the wireless device initiates/triggers/starts the BFR procedure (e.g., at time T1 2302 shown in FIG. 23). The wireless device may have an uplink grant, for example, at the time that the wireless device determines/selects/identifies/indicates the candidate RS for the BFR procedure.

The wireless device may send/transmit a BFR MAC-CE (e.g., at time T4 2308 shown in FIG. 23), to the base station, for the BFR procedure for the second downlink BWP, for example, if the wireless device has the uplink grant. The wireless device may send/transmit the BFR MAC-CE without sending/transmitting an SR, for example, if the wireless device has already received the uplink grant. The wireless device may send/transmit the BFR MAC-CE via one or more PUSCH resources indicated by the uplink grant. The BFR MAC-CE may comprise one or more fields. The one or more fields may comprise at least one of: a first field indicating the cell index, a second field indicating the candidate RS index, and/or a third field indicating the downlink BWP index.

The wireless device may not have an uplink grant, for example, at the time that the wireless device determines/detects the beam failure (e.g., at time T1 2302 shown in FIG. 23). The wireless device may not have an uplink grant, for example, at the time that the wireless device initiates/triggers/starts the BFR procedure. The wireless device may not have an uplink grant, for example, at the time that the wireless device determines/selects/identifies/indicates the candidate RS for the BFR procedure. The wireless device may not send/transmit the BFR MAC-CE, to the base station, for example, if the wireless device has not yet received the uplink grant.

The one or more configuration parameters may indicate at least one PUCCH for the wireless device. The at least one PUCCH may be dedicated to a BFR of at least one secondary cell (e.g., the second cell) of the one or more secondary cells. The wireless device may use the at least one PUCCH to request an uplink grant (e.g., UL-SCH resources) to send/transmit the BFR MAC-CE.

The wireless device may use the at least one PUCCH for requesting UL-SCH resources for an uplink transmission. The wireless device may use the at least one PUCCH for requesting an uplink grant indicating UL-SCH resources for an uplink transmission. The wireless device may send/transmit a second uplink signal (e.g., an SR) via the at least one PUCCH resource for/associated with an uplink grant (e.g., at time T2 2304 shown in FIG. 23).

The wireless device may monitor for an uplink grant, for example, after sending/transmitting the second uplink signal (e.g., an SR). The wireless device may receive the uplink grant from the base station (e.g., at time T3 2306 shown in FIG. 23). The base station may send/transmit the uplink grant, to the wireless device, for example, after or in response to receiving the second uplink signal via the at least one PUCCH.

The wireless device may send/transmit the BFR MAC-CE to the base station, for example, after or in response to receiving the uplink grant. The wireless device may send/transmit the BFR MAC-CE for BFR for the second downlink BWP (e.g., at time T4 2308 shown in FIG. 23). The wireless device may send/transmit the BFR MAC-CE via one or more PUSCH resources indicated by the uplink grant. The BFR MAC-CE may comprise one or more fields. The one or more fields may comprise at least one of: a first field indicating the cell index, a second field indicating the candidate RS index and a third field indicating the downlink BWP index.

The wireless device may send/transmit a MAC PDU (e.g., at time T4 2308 in FIG. 23), for example, after or in response to receiving the uplink grant (at time T3 2306 shown in FIG. 23). The MAC PDU may comprise the BFR MAC-CE for BFR for the second downlink BWP.

The wireless device may successfully complete BFR for the second downlink BWP of the second cell, for example, after or in response to the sending/transmitting the MAC PDU comprising the BFR MAC-CE (e.g., at time T4 2308 shown in FIG. 23).

The wireless device may monitor for an acknowledgement (ACK) for the BFR MAC-CE, for example, after or in response to transmitting the BFR MAC CE. The wireless device may receive the ACK for the BFR MAC CE (e.g., at time T5 2310 shown in FIG. 23). The receiving the ACK for the BFR MAC-CE may ensure that the base station received the BFR MAC-CE.

The wireless device may determine/start the response window (e.g., ra-responseWindow), for monitoring a BFR response from the base station, for example, based on receiving the ACK for the BFR MAC CE (e.g., at T5 2310 shown in FIG. 23). The wireless device may determine/start one or more transmission prohibit timers (e.g., sr-prohibit timer, bfrq-prohibit timer), for example, based on receiving the ACK for the BFR MAC CE (e.g., at T5 2310 shown in FIG. 23). The wireless device may start/trigger/initiates monitoring, for the BFR response from the base station, at least one PDCCH in the CORESET (e.g., linked to the search space set) during the response window (or while the response window is running), for example, after or in response to receiving the ACK for the BFR MAC CE. At least one DM-RS of the at least one PDCCH may be associated (e.g., QCL-ed) with the candidate RS. The wireless device may complete the BFR procedure for the second cell successfully, for example, based on receiving the BFR response in the CORESET (or in the search space set) during the response window (e.g., at time T6 2312 shown in FIG. 23).

Figure 24:
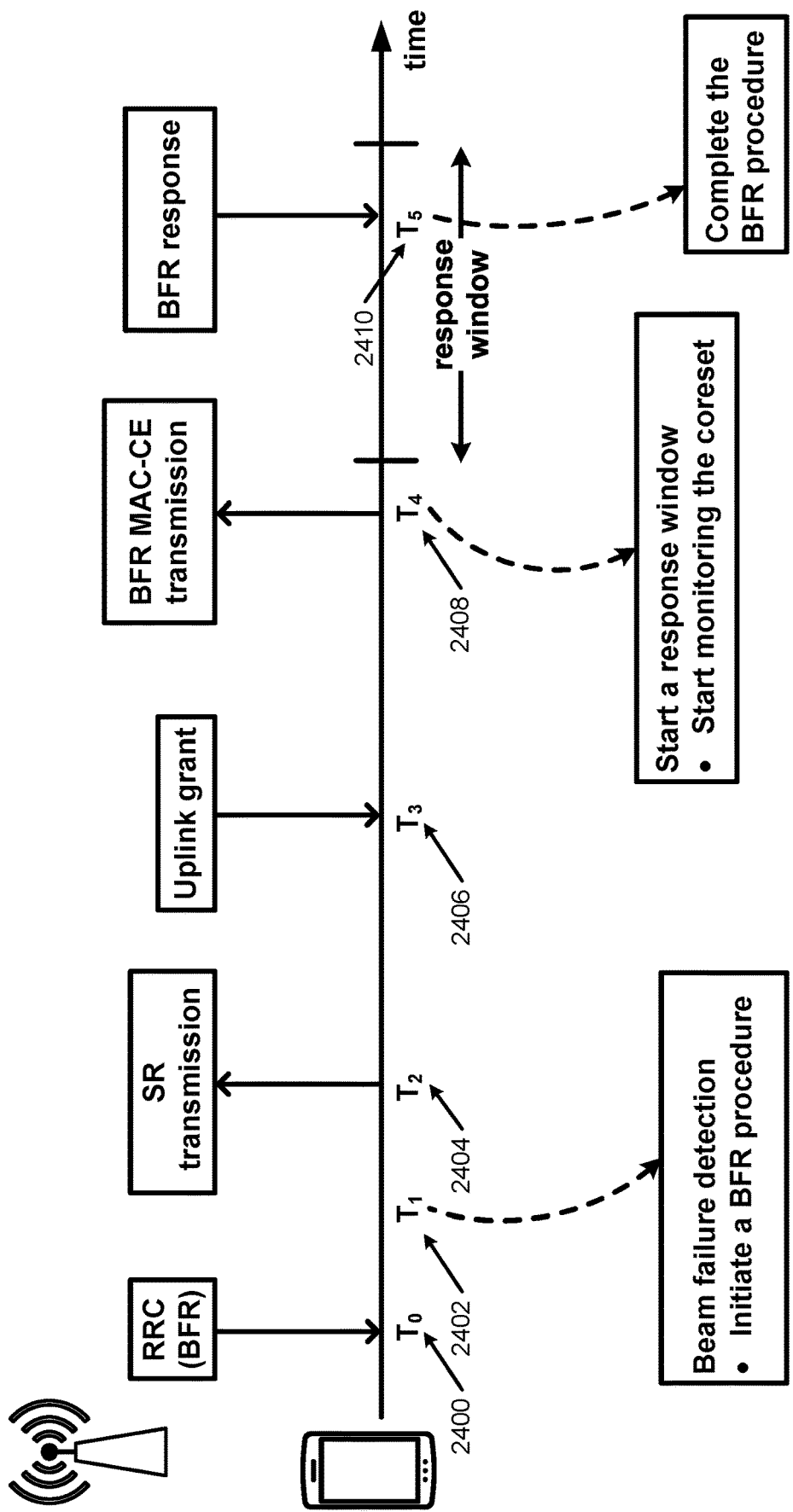
FIG. 24 shows an example of downlink BFR (e.g., for a secondary cell).

FIG. 24 shows an example of downlink BFR (e.g., of a secondary cell). The steps at time T0 2400, T1 2402, T2 2404, T3 2406, and T4 2408 shown in FIG. 24 may be the same as the steps at time T0 2300, T1 2302, T2 2304, T3

2306, and T4 2308 shown in FIG. 23. One or more operations for the steps at time T0 2300, T1 2302, T2 2304, T3 2306, and T4 2308 shown in FIG. 23 may be applicable for the steps at time T0 2400, T1 2402, T2 2404, T3 2406, and T4 2408 shown in FIG. 24.

The wireless device may determine/start the response window (e.g., ra-responseWindow), for monitoring a BFR response from the base station, for example, after or in response to sending/transmitting the BFR MAC-CE (e.g., at T4 2408 shown in FIG. 24). The wireless device may determine/start one or more transmission prohibit timers (e.g., sr-prohibit timer, bfrq-prohibit timer), for example, after or in response to sending/transmitting the BFR MAC-CE (e.g., at T4 2408 shown in FIG. 24). The wireless device may start/trigger/initiate monitoring, for the BFR response from the base station, at least one PDCCH in the CORESET (e.g., linked to the search space set) during the response window (or while the response window is running), for example, after or in response to transmitting the BFR MAC-CE. At least one DM-RS of the at least one PDCCH may be associated (e.g., QCL-ed) with the candidate RS. The wireless device may complete the BFR procedure for the second cell successfully, for example, based on receiving the BFR response in the CORESET (or in the search space set) during the response window (e.g., at time T5 2410 shown in FIG. 24).

Figure 25:
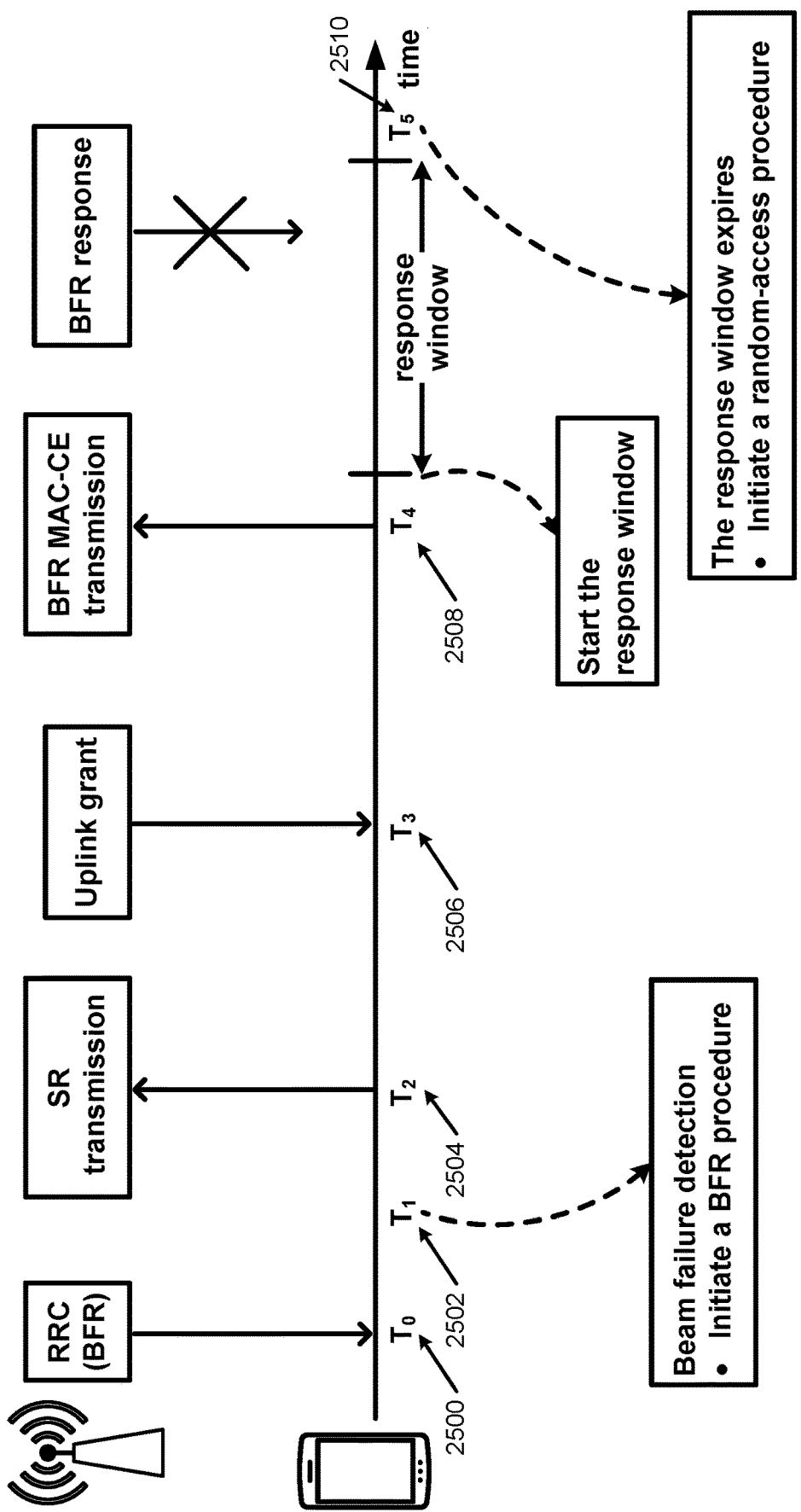
FIG. 25 shows an example of downlink BFR (e.g., for a secondary cell).

FIG. 25 shows an example of downlink BFR (e.g., of a secondary cell). The steps at time T0 2500, T1 2502, T2 2504, T3 2506, and T4 2508 shown in FIG. 25 may be the same as (or substantially the same as) the steps at time T0 2300, T1 2302, T2 2304, T3 2306, and T4 2308 shown in FIG. 23. One or more operations for the steps at time T0 2300, T1 2302, T2 2304, T3 2306, and T4 2308 shown in FIG. 23 may be applicable for the steps at time T0 2500, T1 2502, T2 2504, T3 2506, and T4 2508 shown in FIG. 25.

The wireless device may determine/start the response window (e.g., ra-responseWindow), for a BFR response from the base station, for example, after or in response to transmitting the BFR MAC-CE (e.g., T4 2508 shown in FIG. 25). The wireless device may determine/start one or more transmission prohibit timers (e.g., sr-prohibit timer, bfrq-prohibit timer), for example, after or in response to transmitting the BFR MAC-CE (e.g., T4 2508 shown in FIG. 25).

The wireless device may determine/start the response window (e.g., ra-responseWindow), for a BFR response from the base station, for example, after or in response to receiving the ACK for the BFR MAC-CE (e.g., T5 2310 shown in FIG. 23). The wireless device may determine/start one or more transmission prohibit timers (e.g., sr-prohibit timer, bfrq-prohibit timer), for example, after or in response to receiving the ACK for the BFR MAC-CE (e.g., T5 2310 shown in FIG. 23).

The response window may expire, for example, after a configured time period. The wireless device may not receive the BFR response (e.g., DCI addressed to the RNTI of the wireless device) during the response window (e.g., before the response window expires).

The wireless device may initiate/trigger/start a random-access procedure for BFR of the second downlink BWP of the second cell (e.g., at time T5 2510 shown in FIG. 25), for example, based on the expiry of the response window. The random-access procedure may be a contention-based random-access procedure. The wireless device may perform the random-access procedure via the first cell. The wireless device may send/transmit a preamble for the random-access procedure via at least one random-access resource (e.g., time-frequency resources) of the first cell. The wireless device may monitor for a random-access response, for example, after or in response to transmitting the preamble. The wireless device may receive the random-access response (corresponding to the preamble) comprising an uplink grant for an uplink transmission (e.g., a msg3 transmission). The wireless device may perform the uplink transmission (e.g., msg3) via at least one uplink resource (e.g., a PUSCH resource) indicated by the uplink grant, for example, based on receiving the random-access response. The uplink transmission may comprise a MAC PDU comprising a second BFR MAC-CE. The second BFR MAC-CE may comprise one or more fields indicating the cell index of the second cell. The one or more fields may indicate the candidate RS index. The base station may determine/identify the BFR procedure of the second cell, for example, if the base station receives the second BFR MAC-CE. The base station may initiate/trigger/start a beam management (e.g., aperiodic beam reporting), for example, based on receiving the second BFR MAC-CE. The base station may reconfigure (e.g., by TCI-StatesPDCCH-ToAddlist and/or TCI-StatesPDCCH-ToReleaseList) one or more downlink control channels (e.g., in CORESETS) of the second cell, for example, based on receiving the second BFR MAC-CE.

Figure 26:
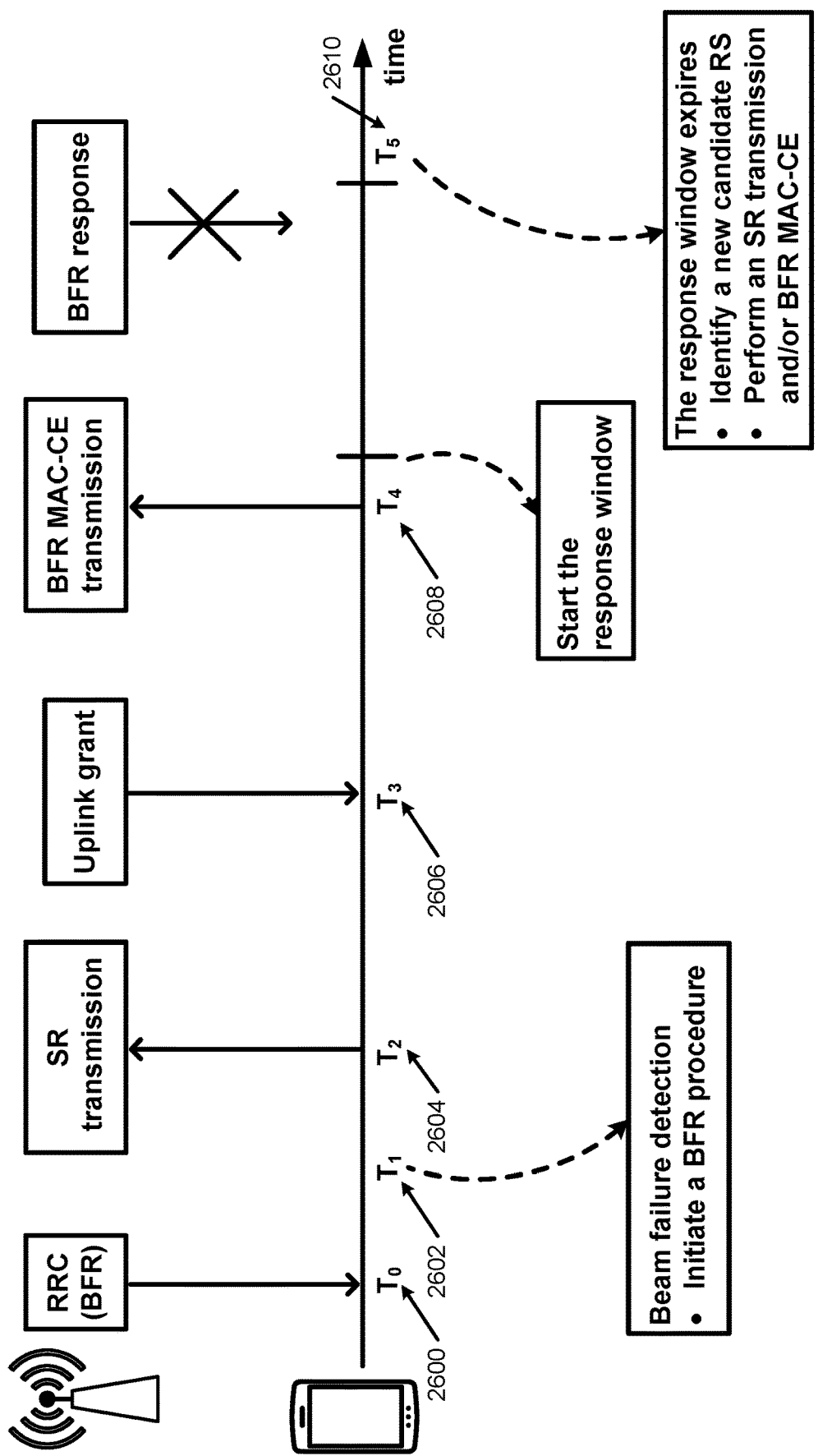
FIG. 26 shows an example of downlink BFR (e.g., for a secondary cell).

FIG. 26 shows an example of downlink BFR (e.g., of a secondary cell). The steps at time T0 2600, T1 2602, T2 2604, T3 2606, and T4 2608 shown in FIG. 26 may be the same as (or substantially the same as) the steps at time T0 2500, T1 2502, T2 2504, T3 2506, and T4 2508 shown in FIG. 25. One or more operations for the steps at time T0 2500, T1 2502, T2 2504, T3 2506, and T4 2508 shown in FIG. 25 may be applicable for the steps at time T0 2600, T1 2602, T2 2604, T3 2606, and T4 2608 shown in FIG. 26.

The wireless device may initiate/trigger/start a second candidate beam selection for the BFR procedure of the second cell (e.g., at time T5 2610 shown in FIG. 26), for example, based on the expiry of the response window. The second candidate beam selection may comprise determining/selecting/identifying a second candidate RS (e.g., CSI-RS, SS/PBCH blocks) in the one or more second RSs. The wireless device may measure/assess the one or more second RSs to determine/select the second candidate RS. For the second candidate beam selection, the wireless device (e.g., the physical layer of the wireless device) may perform one or more second measurements (e.g. L1-RSRP measurement) for the one or more second RSs to select/identify/indicate the second candidate RS. A measurement, of the one or more second measurement, of the second candidate RS may indicate a signal quality that is better/higher (e.g., higher L1-RSRP) than the second threshold. The second candidate RS may be identified/indicated by a second candidate RS index (e.g., configured/provided by the one or more configuration parameters).

The wireless device may have an uplink grant, for example, at the time that the response window expires. The wireless device may have an uplink grant, for example, at the time that the wireless device selects/identifies/indicates the second candidate RS for the BFR procedure.

The wireless device may send/transmit a second BFR MAC-CE (e.g., similar to the BFR MAC-CE transmission at T4 2608 shown in FIG. 26) to the base station for BFR for the second downlink BWP (e.g., at time T5 in FIG. 26), for example, if the wireless device has received the uplink grant. The wireless device may send/transmit the second BFR MAC CE via one or more PUSCH resources indicated by the uplink grant. The second BFR MAC-CE may comprise one or more fields. The one or more fields may comprise at least one of: a first field indicating the cell index of the second cell, a second field indicating the second candidate RS index, and/or a third field indicating the downlink BWP index of the second downlink BWP.

The wireless device may not initiate/trigger/start the second candidate beam selection, for example, if the response window expires. The one or more fields of the second BFR MAC-CE may comprise at least one of: a first field indicating the cell index of the second cell, a second field indicating the candidate RS index, and/or a third field indicating the downlink BWP index of the second downlink BWP.

The wireless device may not have an uplink grant, for example, at the time that the response window expires. The wireless device may not have an uplink grant, for example, at the time that the wireless device selects/identifies/indicates the second candidate RS for the BFR procedure. The wireless device may not send/transmit the second BFR MAC-CE to the base station, for example, if the wireless device does not have the uplink grant.

The one or more configuration parameters may indicate at least one PUCCH. The wireless device may send/transmit a second uplink signal (e.g., an SR) via the at least one PUCCH resource for an uplink grant (e.g., similar to the SR transmission at time T2 2604 shown in FIG. 26), for example, at time T5 2610 shown in FIG. 26.

The wireless device may monitor for an uplink grant, for example, after or in response to sending/transmitting the second uplink signal (e.g., an SR). The wireless device may receive the uplink grant from the base station (e.g., similar to the uplink grant received at time T3 2606 shown in FIG. 26). The base station may send/transmit the uplink grant to the wireless device, for example, based on receiving the second uplink signal via the at least one PUCCH.

The wireless device may send/transmit the second BFR MAC-CE to the base station for BFR for the second downlink BWP (e.g., similar to the BFR MAC-CE transmission sent at time T4 2608 shown in FIG. 26), for example, after or in response to receiving the uplink grant. The wireless device may send/transmit the second BFR MAC CE via one or more PUSCH resources indicated by the uplink grant. The second BFR MAC-CE may comprise one or more fields. The one or more fields may comprise at least one of: a first field indicating the cell index of the second cell, a second field indicating the second candidate RS index, and/or a third field indicating the downlink BWP index of the second downlink BWP.

Figure 27:
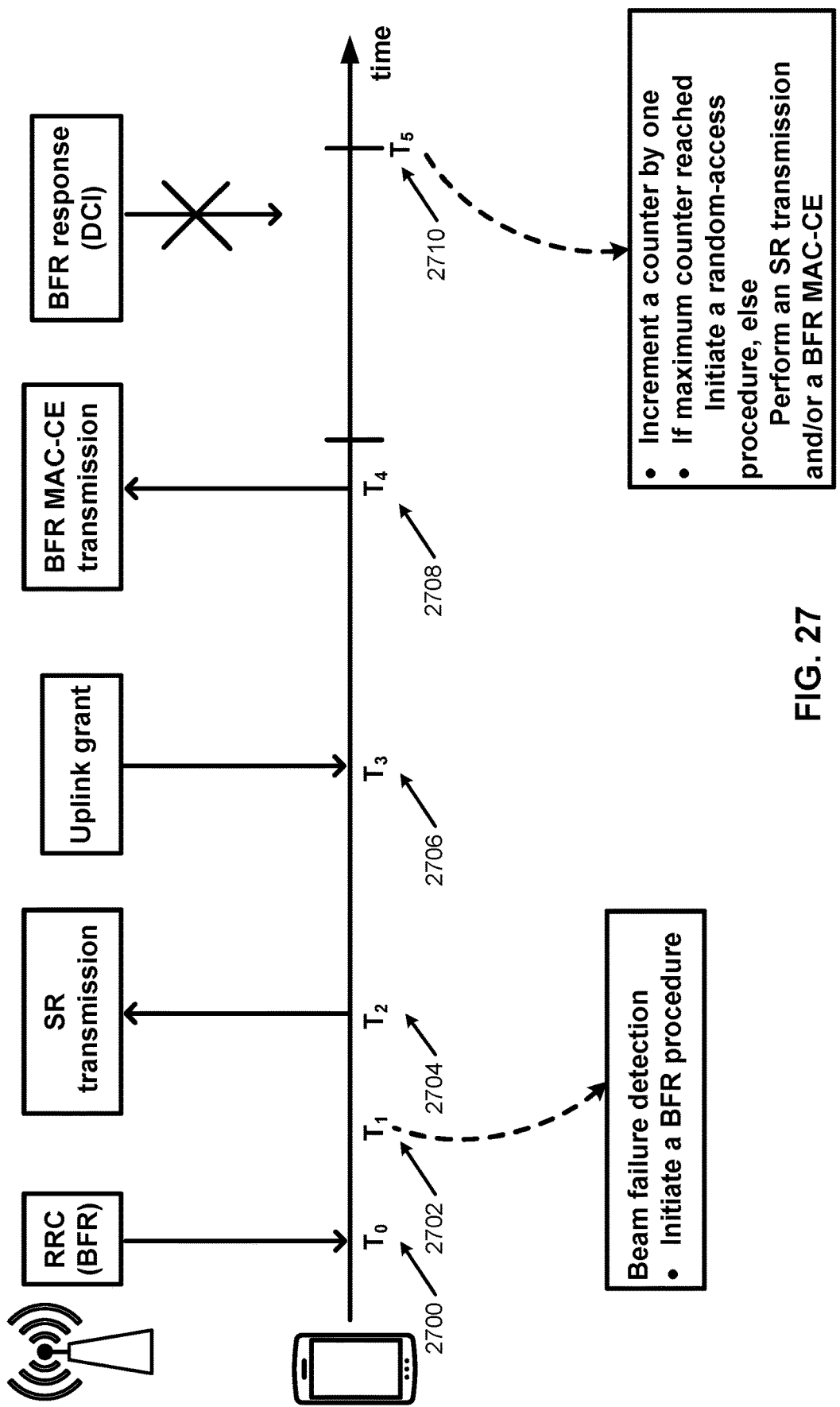
FIG. 27 shows an example of downlink BFR (e.g., for a secondary cell).

FIG. 27 shows an example of downlink BFR (e.g., of a secondary cell). The steps at time T0 2700, T1 2702, T2 2704, T3 2706, and T4 2708 shown in FIG. 27 may be the same as (or substantially the same as) the steps at time T0 2600, T1 2602, T2 2604, T3 2606, and T4 2608 shown in FIG. 26. One or more operations for the steps at time T0 2600, T1 2602, T2 2604, T3 2606, and T4 2608 shown in FIG. 26 may be applicable for the steps at time T0 2700, T1 2702, T2 2704, T3 2706, and T4 2708 shown in FIG. 27.

The wireless device may initially set the transmission counter to an initial value (e.g., zero, one or any other value), for example, based on the initiating/starting the BFR procedure (e.g., at time T1 2702 in FIG. 27). The wireless device may increment the transmission counter (e.g., preamble_transmission_counter, sr-counter, bfrq-counter) by one, for example, based on sending/transmitting the BFR MAC-CE (e.g., at time T4 2708 shown in FIG. 27). The wireless device may increment the transmission counter by one, for example, if the response window expires (e.g., at time T5 2710 in FIG. 27).

The transmission counter may be less than the maximum transmission counter. The wireless device may increment the transmission counter by one or any other quantity (e.g., up to the maximum transmission counter). The wireless device may send/transmit the second BFR MAC-CE for the BFR of the second cell (as described with respect to FIG. 26), for example, based on the transmission counter being less than the maximum transmission counter.

The transmission counter may be equal to or greater than the maximum transmission counter, for example, if the wireless device increments the transmission counter by one (or any other quantity). The wireless device may initiate/trigger/start the random-access procedure for BFR of the second downlink BWP of the second cell (e.g., at time T5 2710 shown in FIG. 27, which may be similar to the random-access procedure at time T5 2510 shown in FIG. 25), for example, if the transmission counter is equal to or greater than the maximum transmission counter.

The BFR timer may expire, for example, during the BFR procedure. The wireless device may initiate/trigger/start the random-access procedure for BFR of the second downlink BWP of the second cell (e.g., similar to the random-access procedure at time T5 2510 in FIG. 25), for example, based on the expiry of the BFR timer.

The wireless device may not complete the BFR procedure of the second cell successfully. The wireless device may determine that the BFR procedure of the second cell is unsuccessfully completed. The wireless device may determine that the BFR procedure of the second cell is unsuccessfully completed, for example, if the BFR timer expires. The wireless device may determine that the BFR procedure of the second cell is unsuccessfully completed, for example, if the transmission counter is equal to or greater than the maximum transmission counter. The wireless device may determine that the BFR procedure of the second cell is unsuccessfully completed, for example, if the wireless device does not receive the BFR response (e.g., DCI, TCI-StatesPDCCH-ToAddlist and/or TCI-StatesPDCCH-ToReleaseList, ACK for the BFR MAC-CE, etc.) completing the BFR procedure.

The wireless device may initiate/trigger/initiate the random-access procedure for BFR of the second downlink BWP of the second cell (e.g., at T5 2701 shown in FIG. 27, which may be similar to the random-access procedure at time T5 2510 shown in FIG. 25), for example, based on determining that the BFR procedure is unsuccessfully completed. The wireless device (e.g., the physical layer of the wireless device) may measure/assess/determine the first radio link quality of the one or more first RSs, for example, if the random-access procedure is ongoing. The wireless device (e.g., the physical layer) may send/transmit/provide a BFI indication to the higher layer (e.g., a MAC layer, a MAC entity) of the wireless device, for example, if the first radio link quality is worse/lower than the first threshold while the random-access procedure is ongoing. The wireless device (e.g., the higher layer of the wireless device) may increment a counter (e.g., BFI_COUNTER) by one (or any other quantity), for example, based on the physical layer sending/transmitting/providing the BFI indication. The BFI_ COUNTER may be equal to or greater than the maximum BFI counter (e.g., beamFailureInstanceMaxCount), for example, based on the incrementing the BFI_COUNTER. The wireless device may not initiate/trigger/start a second BFR procedure (e.g., MAC-CE-based, PUCCH-based) for the second cell, for example, if the BFI_COUNTER is equal to or greater than the maximum BFI counter and if the random-access procedure is ongoing. The wireless device (e.g., the higher layer of wireless device) may not increment the BFI_COUNTER, for example, if the physical layer sends/transmits/provides the BFI indication and the random-access procedure is ongoing. The wireless device (e.g., the higher layer of wireless device) may ignore the BFI indication, for example, if the physical layer sends/transmits/provides the BFI indication and if the random-access procedure is ongoing. The wireless device may set the BFI_COUNTER to zero (or an initial value or any other value), for example, after or in response to completing the BFR procedure for the second downlink BWP of the second cell unsuccessfully.

The wireless device may not initiate/trigger/start a second BFR procedure (e.g., MAC-CE-based, PUCCH-based) for the second cell, for example, after or in response to completing the BFR procedure for the second downlink BWP of the second cell unsuccessfully. The wireless device may fall back to the random-access procedure for the second cell, for example, after or in response to completing the BFR procedure for the second downlink BWP of the second cell unsuccessfully. The wireless device may (successfully) complete BFR for the second downlink BWP of the second cell, for example, after or in response to receiving an ACK for the BFR MAC-CE (e.g., similar to the ACK at time T5 2310 shown in FIG. 23).

The wireless device may receive a higher layer TCI parameter (e.g., TCI-StatesPDCCH-ToAddlist and/or TCI-StatesPDCCH-ToReleaseList), for example, after the BFR MAC-CE transmission. The higher layer TCI parameter may comprise one or more TCI states for the second cell. The wireless device may receive a MAC CE activation command (e.g., UE-specific PDCCH MAC CE) indicating a TCI state of the one or more TCI states for the second cell. The wireless device may successfully complete BFR for the second downlink BWP of the second cell, for example, after or in response to receiving the MAC CE activation command.

The wireless device may receive a MAC CE activation command (e.g., a wireless-device-specific PDCCH MAC CE, a UE-specific PDCCH MAC CE) indicating a TCI state for the second cell, for example, after the BFR MAC-CE transmission. The wireless device may successfully complete BFR for the second downlink BWP of the second cell, for example, after or in response to receiving the MAC CE activation command.

The TCI state may be used for at least one PDCCH reception in a configured CORESET of the second cell. The TCI state may indicate quasi co-location information of a DM-RS antenna port for the at least one PDCCH reception in the configured coreset. The TCI state may indicate that the DM-RS antenna port for the at least one PDCCH reception in the configured CORESET is quasi co-located (e.g., QCL-TypeD) with one or more downlink RSs indicated by the TCI state. The wireless device may set the BFI_COUNTER to zero (or an initial value or any other value), for example, after or in response to completing BFR for the second downlink BWP of the second cell successfully. The wireless device may reset the BFR timer, for example, after or in response to completing BFR for the second downlink BWP of the second cell.

Figure 28:
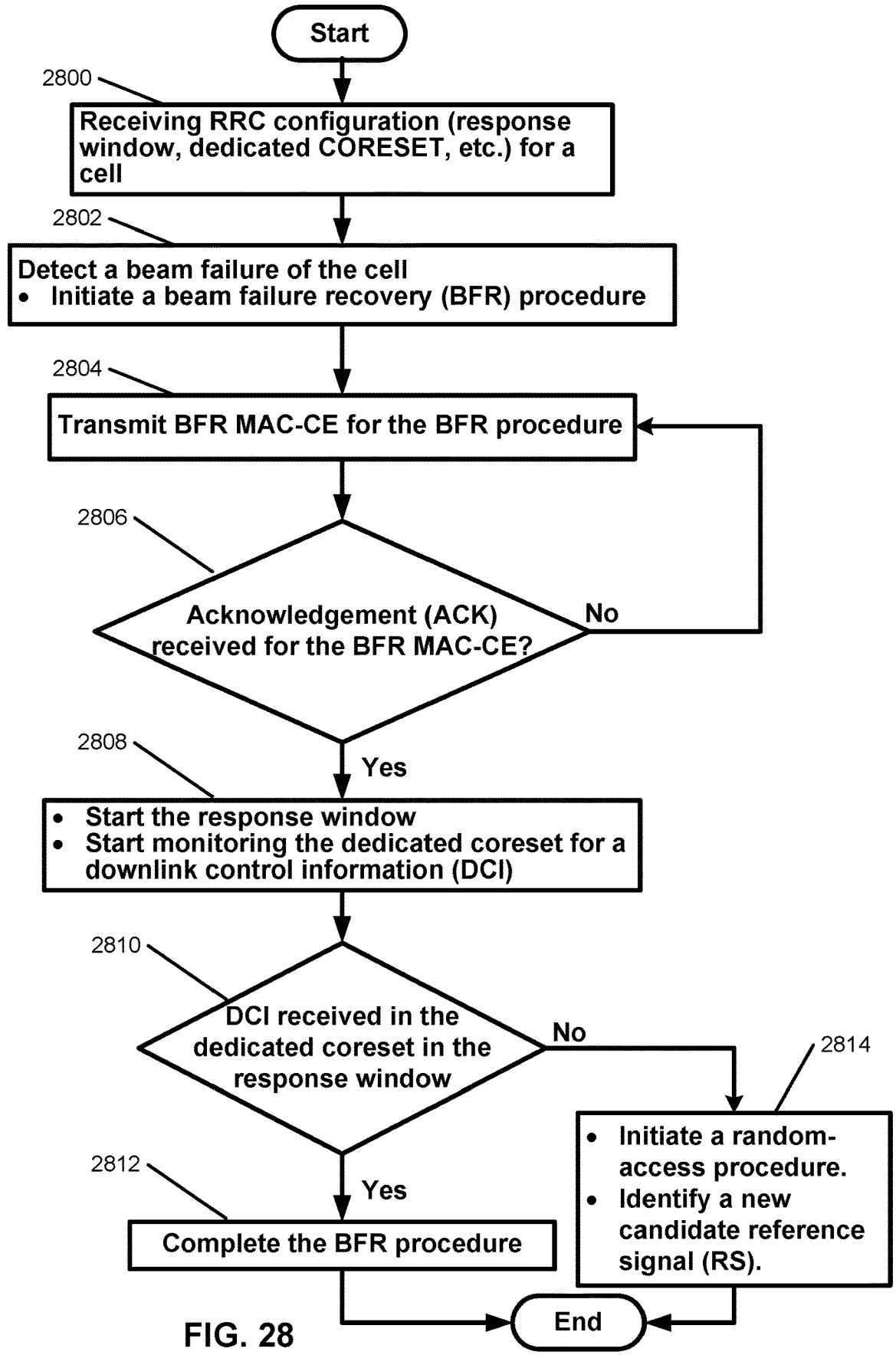
FIG. 28 shows an example method for downlink BFR (e.g., of a secondary cell).

FIG. 28 shows an example method for downlink BFR (e.g., of a secondary cell). At step 2800, a wireless device may receive, from a base station, one or more messages comprising one or more configuration parameters of a cell (e.g., the second cell, SCell, SCell configured with PUCCH, PCell). The one or more configuration parameters may indicate one or more first reference signals (RSs) for the cell. The one or more first RSs may comprise one or more first CSI-RSs and/or one or more first SSB/PBCHs. The wireless device may measure/assess/determine the one or more first RSs for a beam failure detection of the cell.

The one or more configuration parameters may indicate a maximum BFI counter (e.g., beamFailureInstanceMaxCount). The one or more configuration parameters may comprise a first threshold (e.g., rlmInSyncOutOfSyncThreshold) for the beam failure detection of the cell. At step 2802, the wireless device may determine/detect a beam failure of the cell, for example, based on the one or more first RSs. The wireless device may determine a number/quantity of BFI indication (e.g., BFI_COUNTER) associated with the cell reaching the maximum BFI counter. The BFI indication may be determined, for example, if a result of assessing the one or more first RSs of the cell indicates a first radio quality worse/lower (e.g., higher BLER, lower L1-RSRP, lower L1-SINR) than the first threshold. The wireless device may detect/determine the beam failure of the cell, for example, after or in response to determining the number/quantity of beam failure instance indication associated with the cell reaching the maximum BFI counter.

The one or more configuration parameters may indicate a CORESET (e.g., linked to a search space set configured/provided by recoverySearchSpaceID in the IE BeamFailureRecoveryConfig). The one or more configuration parameters may indicate a response window. The CORESET may be configured on the cell. The CORESET may not be configured on the cell but may be configured on another cell (e.g., PCell).

The wireless device may detect/determine a beam failure of the cell, for example, based on the one or more first RSs. The wireless device may initiate/trigger/start BFR for the cell, for example, after or in response to detecting/determining the beam failure.

At step 2804, the wireless device may send/transmit a BFR MAC-CE for BFR. The wireless device may monitor a downlink control channel for an acknowledgement (ACK) for the BFR MAC-CE. At step 2806, the wireless device may determine whether the ACK for the BFR MAC-CE is received. At step 2808, the wireless device may determine/start the response window, for example, based on receiving the ACK. The wireless device may determine/start the response window, for example, based on transmitting the BFR MAC-CE. The wireless device may resend/retransmit the BFR MAC-CE, for example, if the wireless device does not receive the ACK for a certain time period.

The downlink control channel may be configured on the cell. The downlink control channel may not be configured on the cell but may be configured on another cell (e.g., PCell). At step 2808, the wireless device may monitor the CORESET for a BFR response (e.g., DCI) during the response window. The wireless device may start/trigger/initiate monitoring the CORESET for a BFR response (e.g., DCI), for example, based on the determining/starting the response window. At step 2810, the wireless device may determine whether the BFR response is received. At step 2812, the wireless device may complete the BFR procedure, for example, based on receiving the BFR response during the response window.

The response window may expire, for example, after a configured time period. At step 2810, the wireless device may determine an expiry of the response window and may determine that the BFR response is not received. At step 2814, the wireless device may initiate/trigger/start a random-access procedure (e.g., similar to the random-access procedure at time T5 2510 shown in FIG. 25). The wireless device may perform the random-access procedure via a first cell (e.g., PCell). The first cell may be different from the cell (e.g., SCell).

The wireless device may not have an uplink grant, for example, at the time that the response window expires. The wireless device may send/transmit a scheduling request for an uplink grant, for example, if the wireless device does not have the uplink grant and the response window expires. The wireless device may use the uplink grant for a second BFR MAC-CE transmission (e.g., similar to the second BFR MAC-CE described with respect to FIG. 26).

The wireless device may initiate/trigger/determine a second candidate beam selection for BFR of the cell (e.g., similar to the second candidate beam selection at time T5 2610 shown in FIG. 26), for example, based on the determining the expiry of the response window. The wireless device may measure/assess/determine one or more second RSs to determine/select a second candidate RS. The one or more configuration parameters may indicate the one or more second RSs (e.g., periodic CSI-RSs, SS/PBCH block).

A wireless device may receive, from a base station, one or more messages comprising one or more configuration parameters of a primary cell (e.g., the first cell) and a secondary cell (e.g., the second cell). The one or more configuration parameters may indicate one or more first reference signals (RSs) of the secondary cell. The one or more first RSs may comprise one or more first CSI-RSs and/or one or more first SSB/PBCHs. The wireless device may measure/assess/determine the one or more first RSs for a beam failure detection of the secondary cell.

The one or more configuration parameters may indicate one or more second RSs of the secondary cell. The one or more second RSs may comprise one or more second CSI-RSs and/or one or more second SSB/PBCHs. The wireless device may measure/assess/determine the one or more second RSs for a candidate beam selection of the secondary cell.

The one or more configuration parameters may indicate a CORESET (e.g., linked to a search space set configured/provided by recoverySearchSpaceID in the IE BeamFailureRecoveryConfig). The one or more configuration parameters may indicate one or more physical uplink control channel (PUCCH) resources of the secondary cell.

The wireless device may detect a beam failure of the secondary cell, for example, based on the one or more first RSs. The wireless device may initiate/trigger/start BFR (e.g., PUCCH-based, MAC-CE-based) for the secondary cell, for example, based on the detecting/determining the beam failure of the secondary cell.

The wireless device may initiate/trigger/start a candidate beam selection, for example, based on the initiating/triggering/starting the BFR procedure. For the candidate beams selection, the wireless device may select/identify/indicate a candidate RS among the one or more second RSs for the BFR procedure. The wireless device may use a spatial domain filter to receive the candidate RS. The wireless device may use a receive beam associated with/using the spatial domain filter for a reception of the candidate RS.

The wireless device may send/transmit an uplink signal (e.g., a BFRQ, an SR, an SR-like signal, a BFR MAC-CE, a preamble) via the primary cell for the BFR procedure. The wireless device may start/trigger/initiate monitoring the CORESET for a BFR response (e.g., DCI), for example, based on the sending/transmitting the uplink signal. The wireless device may complete the BFR procedure (successfully), for example, based on receiving the BFR response.

The wireless device may send/transmit a second uplink signal via the one or more PUCCH resources of the secondary cell using/with the spatial domain filter, for example, based on completing the BFR procedure (e.g., successfully). The wireless device may send/transmit the second uplink signal, for example, until receiving an activation command (e.g., a PUCCH spatial relation Activation/Deactivation MAC CE) for a spatial relation info parameter (e.g., PUCCH-Spatialrelationinfo) or receiving a spatial setting configuration (e.g., configured/provided by IE PUCCH-Spatialrelationinfo) for the one or more PUCCH resources.

Figure 29:
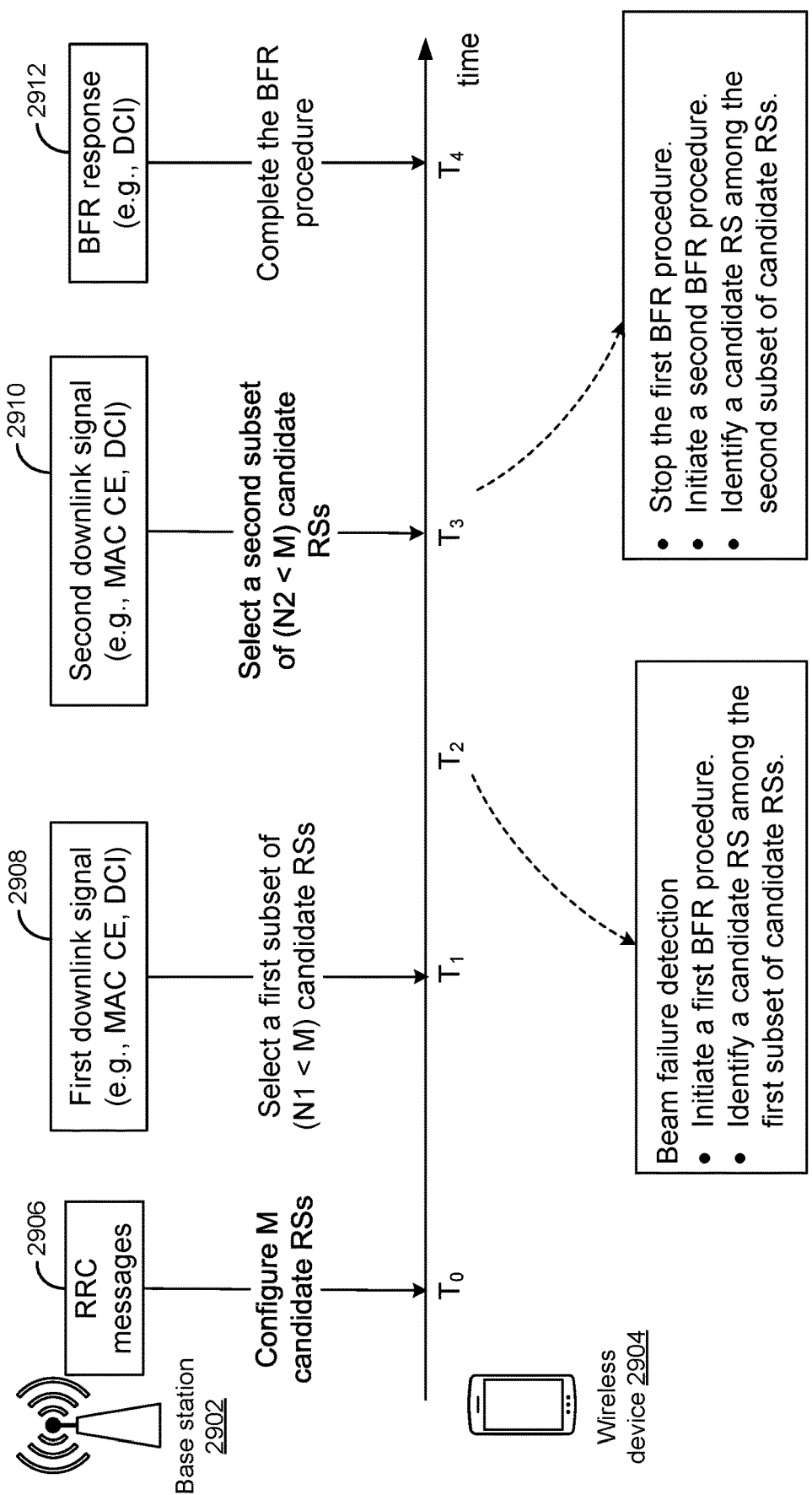
FIG. 29 shows an example of a DL BFR procedure of a cell (e.g., primary cell (PCell), secondary cell (SCell), etc.).

FIG. 29 shows an example of a DL BFR procedure of a cell (e.g., PCell, SCell). At or after time T0, a wireless device 2904 may receive, from a base station 2902, one or more messages comprising one or more configuration parameters for a cell (e.g., PCell, PSCell, PUCCH SCell, SCell). The one or more messages may comprise one or more RRC messages 2906 (e.g. RRC connection reconfiguration message, RRC connection reestablishment message, and/or RRC connection setup message).

The one or more configuration parameters may comprise BWP configuration parameters for a plurality of BWPs of the cell. The plurality of BWPs may comprise a plurality of DL BWPs of the cell and/or a plurality of UL BWPs of the cell. The plurality of DL BWPs may comprise a DL BWP of the cell. The plurality of UL BWPs may comprise an UL BWP of the cell.

The one or more configuration parameters (e.g., RRC messages 2906) may indicate one or more first RSs (e.g., RadioLinkMonitoringRS in an IE RadioLinkMonitoringConfig) for the DL BWP of the cell. The one or more first RSs may comprise one or more first CSI-RSs. The one or more first RSs may comprise one or more first SS/PBCH blocks.

The one or more configuration parameters may indicate a maximum BFI counter value (e.g., beamFailureInstanceMaxCount) for the cell. The wireless device 2904 may determine/detect a beam failure for the DL BWP of the cell based on one or more assessments/measurements on the one or more first RSs. The one or more configuration parameters may indicate a first threshold (e.g., using parameters rlmInSyncOutOfSyncThreshold and/or Qout,LR).

The one or more configuration parameters may indicate one or more second RSs (e.g., candidateBeamRSList indicated in an IE BeamFailureRecoveryConfig) for the DL BWP of the cell. The one or more second RSs may be M candidate RSs as shown in FIG. 29DL. The one or more second RSs may comprise one or more second CSI-RSs. The one or more second RSs may comprise one or more second SS/PBCH blocks. The wireless device 2904 may select a candidate RS, among the one or more second RSs, for a BFR procedure of the DL BWP of the cell, for example, based on assessments/measurements on the one or more second RSs. The one or more configuration parameters may indicate a second threshold (e.g., rsrp-ThresholdSSB in the IE BeamFailureRecoveryConfig) for a BFR procedure of the cell and/or the DL BWP.

The one or more configuration parameters may indicate RS-specific indicators/indexes (e.g., SSB-Index, NZP-CSI-RS-ResourceId) for the one or more second RSs. Each candidate RS of the one or more second RSs may be indicated/identified by a respective RS-specific indicator/index of the RS-specific indicators/indexes. A first candidate RS of the one or more second RSs may be indicated/identified by a first RS-specific indicator/index of the RS-specific indicators/indexes. A second candidate RS of the one or more second RSs may be indicated/identified by a second RS-specific indicator/index of the RS-specific indicators/indexes, and so on.

The one or more configuration parameters may indicate a search space set (e.g., recoverySearchSpaceID in the IE BeamFailureRecoveryConfig). The search space set may be linked/associated with a CORESET. The search space set may indicate the CORESET. The wireless device may monitor the CORESET for a BFR procedure of DL BWP of the cell. The wireless device 2904 may monitor the search space set (e.g., linked to the CORESET) for a BFR procedure of the DL BWP of the cell.

At or time T1, the wireless device 2904 may receive a first DL signal 2908 (e.g., a MAC CE, or DCI) from the base station. The first DL signal 2908 may indicate a first subset of candidate RSs (e.g., N1 candidate RSs) among the one or more second RSs. The one or more second RSs may comprise RSs RS-0, RS-1, RS-2, . . . , RS-63, for example, if M is equal to 64. The first subset of candidate RSs may comprise RS-5, RS-11, RS-32, and RS-61, for example, if N1 is equal to 4. The first subset of candidate RSs may comprise RS-8, RS-22, RS-42, RS-48, and RS-55, for example, if N1 is equal to 5. RS-m, m=0, 1, . . . , 63 is an m-th RS among the one or more second RSs. A first quantity of RSs in the first subset of candidate RSs may be equal to or less than a second quantity of RSs in the one or more second RSs. The above values of M and/or N1 are merely exemplary, and in other examples, M and/or N1 may be other values.

The DL BWP may be an active DL BWP of the cell. The wireless device 2902 (e.g., a physical layer of the wireless device 2902) may assess/determine a first radio link quality of the one or more first RSs, for example, to detect a beam failure of the DL BWP. The physical layer may send/provide a BFI indication to a higher layer (e.g. a MAC layer) of the wireless device 2902, for example, if the first radio link quality is worse (e.g., greater block error ratio (BLER), lower L1-RSRP, lower L1-SINR) than a radio link quality corresponding to the first threshold.

The wireless device 2904 may maintain a BFI counter (e.g., BFI_COUNTER) to determine a quantity of BFIs. The wireless device 2904 may initially set the BFI_COUNTER to zero. The wireless device 2904 (e.g., a higher layer, such as the MAC layer, of the wireless device 2904) may increment the BFI_COUNTER by one, for example, based on/in response to the physical layer of the wireless device 2902 sending/providing a BFI indication.

The BFI_COUNTER may be equal to or greater than the maximum BFI counter value (e.g., beamFailureInstanceMaxCount), for example, based on/in response to the increment of the BFI counter. At or after time T2, the wireless device 2904 may detect a beam failure of the DL BWP of the cell, for example, based on the BFI_COUNTER being equal to or greater than the maximum BFI counter value. At or after time T2, the wireless device 2904 may initiate/execute a first BFR procedure for the DL BWP of the cell, for example, based on the detecting the beam failure of the DL BWP.

The wireless device 2904 may initiate/perform the first BFR procedure, for example, based on/using the first subset of candidate RSs. The initiating/performing the first BFR procedure based on the first subset of candidate RSs may comprise that the wireless device 2904 assesses/measures the first subset of candidate RSs in a candidate beam selection procedure for the first BFR procedure.

The one or more configuration parameters may indicate a BFR timer (e.g., beamFailureRecoveryTimer). The wireless device 2904 may start the BFR timer, for example, based on the initiating the first BFR procedure.

The wireless device 2904 may initiate/perform a candidate beam selection procedure for the first BFR procedure, for example, based on the initiating the first BFR procedure. The wireless device 2904 may initiate/perform a candidate beam selection procedure, for example, based on/before initiating the first BFR procedure (e.g., before time T2, between time T0 and T2, between time T1 and T2). The wireless device 2904 may initiate/perform a candidate beam selection procedure, for example, before detecting the beam failure (e.g., before time T2, between time T0 and T2, and/or between time T1 and T2). The wireless device 2904 may initiate/perform a candidate beam selection procedure, for example, based on being configured with the first subset of candidate RSs (e.g., at time T1). The wireless device 2904 may perform beam failure detection and candidate beam selection in parallel (e.g., at or approximately at the same time). The candidate beam selection procedure may comprise determining/selecting/identifying/indicating a candidate RS (e.g., CSI-RS, SS/PBCH blocks) in/among the first subset of candidate RSs.

The wireless device 2904 may initiate/perform the candidate beam selection procedure for the first BFR procedure, for example, before the initiating the first BFR procedure. The wireless device 2904 may initiate a candidate beam selection procedure for the first BFR procedure before the detecting the beam failure of the DL BWP. The wireless device 2904 may determine/perform one or more measurements on the first subset of candidate RSs in parallel with estimation of the first radio link quality of the one or more first RSs.

The initiating the candidate beam selection procedure may comprise the higher layer requesting, from the physical layer, one or more indexes (e.g., of the RS-specific indexes) associated with one or more candidate RSs among the first subset of candidate RSs and/or one or more candidate measurements (e.g., L1-RSRP measurements, BLER measurements, L1-SINR measurements) of the one or more candidate RSs. Each measurement of the one or more candidate measurements may be better (e.g. lower BLER or greater L1-RSRP or greater L1-SINR) than the second threshold (e.g., rsrp-ThresholdSSB).

The wireless device 2904 (e.g., the physical layer of the wireless device 2904) may determine/perform one or more measurements (e.g. L1-RSRP measurements) for the first subset of candidate RSs. The wireless device 2904 may determine/perform each measurement of one or more measurements for a candidate RS of the first subset of candidate RSs. The wireless device 2904/the physical layer may determine/perform a first measurement of the one or more measurements for a first RS of the first subset of candidate RSs. The wireless device 2904/the physical layer may determine/perform a second measurement of the one or more measurements for a second RS of the first subset of candidate RSs. The wireless device 2904/the physical layer may perform a third measurement of the one or more measurements for a third RS of the first subset of candidate RSs, and so on.

The wireless device 2904 may determine that one or more candidate RSs of the first subset of candidate RSs are associated with one or more candidate measurements that are better (e.g. lower BLER or greater L1-RSRP or greater SINR) than the second threshold (e.g., rsrp-ThresholdSSB), for example, based on the one or more measurements. The wireless device 2904 may determine that one or more candidate RSs of the first subset of candidate RSs have greater corresponding L1-RSRP values and/or greater corresponding SINR values than the second threshold (e.g., rsrp-ThresholdSSB), for example, based on the one or more measurements. The wireless device 2904 may determine that the one or more candidate RSs of the first subset of candidate RSs have lower corresponding BLER values than a threshold, for example, based on the one or more measurements.

Each candidate RS of one or more candidate RSs may have a candidate measurement (e.g., L1-RSRP), of the one or more candidate measurements, that is better (e.g., greater) than the second threshold. The first measurement for the first RS may be better (e.g., greater L1-RSRP) than the second threshold. The second measurement for the second RS may be better (e.g., greater L1-RSRP) than the second threshold. The third measurement for the third RS may be worse (e.g., lower L1-RSRP) than the second threshold. The one or more candidate RSs may comprise the first RS and the second RS, for example, based on the first measurement and second measurement being better than the second threshold and the third measurement being worse than the second threshold. The physical layer of the wireless device may send/provide, to the higher layer (e.g., the MAC layer) of the wireless device 2904, the one or more indexes of the one or more candidate RSs (e.g., the first RS, the second RS) and/or one or more candidate measurements (e.g., the first measurement, the second measurement) of the one or more candidate RSs.

The wireless device (e.g., a higher layer such as the MAC layer of the wireless device 2904) may select a candidate RS among the one or more candidate RSs, for example, based on or in response to receiving the one or more indicators and/or the one or more candidate measurements associated with the one or more candidate RSs. The higher layer may indicate the candidate RS to the physical layer of the wireless device 2904. The candidate RS may be associated with a candidate RS indicator (e.g., a periodic CSI-RS configuration index and/or an SSB index provided by the one or more configuration parameters) of the RS-specific indicators.

The one or more configuration parameters may indicate one or more UL physical channels for a BFR procedure of the cell. The one or more UL physical channels may comprise a PRACH, a PUCCH, and/or a PUSCH. The one or more UL physical channels may be dedicated to/associated with the BFR procedure of the cell.

The wireless device 2904 may send (e.g., transmit) an UL signal (e.g., a preamble, BFR request (BFRQ), scheduling request (SR), BFR MAC CE) via at least one UL physical channel (e.g., BFR-PRACH, BFR-PUCCH, PUSCH and/or PUCCH) of the one or more UL physical channels, for example, based on initiating the first BFR procedure for the cell. The base station 2902 may determine that the BFR procedure of the cell has been initiated, for example, if the base station 2904 receives the UL signal (e.g., preamble, BFRQ, SR, and/or BFR MAC CE) via the at least one UL physical channel (e.g., the PRACH, the PUCCH and/or the PUSCH) of the one or more UL physical channels.

The first BFR procedure may be PUCCH-based (e.g., BFR-PUCCH). The UL signal may be a BFRQ (e.g., BFRQ, SR, SR-like) and/or the at least one UL physical channel may be a PUCCH, for example, if the first BFR procedure is PUCCH-based.

The first BFR procedure may be MAC CE-based (e.g., BFR-PUSCH). The UL signal may be a MAC CE and/or the at least one UL physical channel may be a PUSCH, for example, if the first BFR procedure is MAC CE-based.

The first BFR procedure may be RACH-based (e.g., BFR-PRACH). The UL signal may be an RA preamble and/or the at least one UL physical channel may be a PRACH, for example, if the first BFR procedure is RACH-based.

The one or more configuration parameters may indicate a response window for a BFR procedure of the cell. The one or more configuration parameters may indicate a maximum transmission counter value (e.g., sr-TransMax, bfrq-TransMax, preambleTransMax) for a BFR procedure of the cell.

The wireless device 2904 may start the response window (e.g., ra-responseWindow, sr-prohibit timer, bfrq-prohibit timer), for a BFR response from the base station 2902, based on (e.g., after or in response to) the transmitting the UL signal. The wireless device 2904 may monitor, for the BFR response from the base station 2902, at least one PDCCH in the CORESET (e.g., linked to/associated with the search space set) within the response window (e.g., while the response window is running) At least one DM-RS of the at least one PDCCH may be associated (e.g., QCL-ed TypeD) with the candidate RS. At least one DM-RS of the at least one PDCCH may be QCL-ed (e.g., with QCL TypeD) with the candidate RS.

The BFR response may comprise DCI indicating an UL grant (e.g., for the cell). The BFR response may comprise DCI indicating a DL assignment (e.g., for the cell). The DCI may be configured with CRC scrambled by an RNTI (e.g., C-RNTI, MCS-C-RNTI) of the wireless device 2904. The DCI may be addressed to the RNTI.

The wireless device 2904 may increment a transmission counter (e.g., preamble_transmission_counter, sr-counter, bfrq-counter) by one, for example, based on the transmitting the UL signal. The wireless device 2904 may initially set the transmission counter to an initial value (e.g., zero, one, or any other value), for example, based on the initiating the first BFR procedure. The wireless device 2904 may resend (e.g., retransmit) the UL signal for the first BFR procedure, for example, if a transmission counter value of the transmission counter is less than the maximum transmission counter value. The wireless device 2904 may successfully complete the first BFR procedure for the cell, for example, based on receiving the BFR response 2912 in the CORESET (or in the search space set) within the response window. The wireless device may receive the BFR response 2912, for example, at or after time T4. The wireless device 2904 may fail the first BFR procedure, for example, if the transmission counter value equals the maximum transmission counter value and the wireless device 2904 does not receive the BFR response 2912.

The wireless device 2904 may receive a second DL signal 2910 (e.g., MAC CE, DCI) from the base station 2902, for example, if performing the first BFR procedure (e.g., at time T3, and/or between time T2 and time T4). The second DL signal 2910 may select/indicate a second subset of candidate RSs (e.g., N2 candidate RSs) among the one or more second RSs. The one or more second RSs may comprise RS-0, RS-1, RS-2, . . . , RS-63, for example, if M is equal to 64. The second subset of candidate RSs may comprise RS-6, RS-15, RS-42, and RS-51, for example, if N2 is equal to 4. The second subset of candidate RSs may comprise RSs RS-16, RS-13, RS-32, RS-44, and RS-61, for example, if N2 is equal to 5. A first quantity of RSs in the second subset of candidate RSs may be equal to or less than a second quantity of RSs in the one or more second RSs. N1 and N2 may be the same or different. The above values of N2 are merely exemplary, and in other examples, N2 may be a different value.

The wireless device 2904 may continue the first BFR procedure with the first subset of candidate RSs, for example, after/in response to receiving the second DL signal 2910 (e.g., at or after time T3). The base station 2902 may configure a second wireless device with the first subset of candidate RSs, for example, based on transmitting the second DL signal 2910 selecting/indicating the second subset of candidate RSs for the wireless device 2904. This may result in collision of transmissions corresponding to the wireless device 2904 and the second wireless device.

The wireless device 2904 may abort/stop the first BFR procedure, for example, based on the receiving the second DL signal (e.g., at or after time T3). The wireless device 2904 may stop/reset the BFR timer, for example, based on the aborting/stopping the first BFR procedure. The wireless device may reset the BFI_COUNTER to zero, for example, based on the aborting/stopping the first BFR procedure. The aborting/stopping the first BFR procedure may comprise stopping transmitting the UL signal (e.g., preamble via PRACH, BFRQ via PUCCH, SR via PUCCH, BFR MAC CE via PUSCH), for the first BFR procedure of the cell, via at least one UL physical channel of the one or more UL physical channels.

The wireless device 2904 may initiate a second BFR procedure of the cell using (or with) the second subset of candidate RSs, for example, based on the aborting/stopping the first BFR procedure. The initiating the second BFR procedure with the second subset of candidate RSs may comprise that the wireless device assesses/measures the second subset of candidate RSs in a second candidate beam selection procedure for the second BFR procedure.

The wireless device 2904 may not stop/reset the BFR timer and/or reset the BFI_COUNTER to zero, for example, based on the initiating the second BFR procedure. The wireless device 2904 may keep the BFR timer running and/or keep incrementing the BFI_COUNTER (e.g., based on BFI indications), for example, based on the initiating the second BFR procedure.

The wireless device 2904 may initiate/perform the second candidate beam selection procedure, for example, based on the initiating the second BFR procedure. The wireless device 2904 may initiate the second candidate beam selection procedure based on being configured with the second subset of candidate RSs. The second candidate beam selection procedure may comprise determining/selecting/identifying/indicating a second candidate RS (e.g., CSI-RS, SS/PBCH blocks) in/among the second subset of candidate RSs.

The initiating the second candidate beam selection procedure may comprise requesting, by a higher layer of the wireless device 2904, from the physical layer of the wireless device, one or more second indicators (e.g., of the RS-specific indexes) associated with one or more second candidate RSs among the second subset of candidate RSs and/or one or more second candidate measurements (e.g., L1-RSRP measurements, BLER measurements, L1-SINR measurements) of the one or more second candidate RSs. Each measurement of the one or more second candidate measurements may be better (e.g. lower BLER or greater L1-RSRP or greater L1-SINR) than the second threshold (e.g., rsrp-ThresholdSSB).

The wireless device 2904 (e.g., the physical layer of the wireless device 2904) may determine/perform one or more measurements (e.g. L1-RSRP measurements) for the second subset of candidate RSs. The wireless device 2904 may determine/perform each measurement, of one or more measurements, for a second candidate RS of the second subset of candidate RSs. The wireless device 2904/the physical layer may determine/perform a first measurement of the one or more measurements for a first RS of the second subset of candidate RSs. The wireless device 2904/the physical layer may determine/perform a second measurement of the one or more measurements for a second RS of the second subset of candidate RSs. The wireless device 2904/the physical layer may determine/perform a third measurement of the one or more measurements for a third RS of the second subset of candidate RSs, and so on.

The wireless device 2904 may determine that the one or more second candidate RSs of the second subset of candidate RSs may be associated with one or more candidate measurements that are better (e.g., lower BLER or greater L1-RSRP or greater SINR) than the second threshold (e.g., rsrp-ThresholdSSB), for example, based on the one or more measurements. The wireless device 2904 may determine that the one or more second candidate RSs of the second subset of candidate RSs have greater corresponding L1-RSRP values and/or greater corresponding SINR values than the second threshold (e.g., rsrp-ThresholdSSB), for example, based on the one or more measurements. The wireless device 2904 may determine that the one or more second candidate RSs of the second subset of candidate RSs have lower BLERs than a threshold, for example, based on the one or more measurements. Each candidate RS of one or more second candidate RSs may have a candidate measurement (e.g., L1-RSRP), of the one or more candidate measurements, that is better (e.g., greater) than the second threshold. The first measurement for the first RS may be better (e.g., greater L1-RSRP) than the second threshold. The second measurement for the second RS may be better (e.g., greater L1-RSRP) than the second threshold. The third measurement for the third RS may be worse (e.g., lower L1-RSRP) than the second threshold. The one or more candidate RSs may comprise the first RS and the second RS, for example, based on the first measurement and second measurement being better than the second threshold and the third measurement being worse than the second threshold. The physical layer of the wireless device 2904 may send/provide, to the higher layer (e.g., the MAC layer) of the wireless device 2904, the one or more indicators of the one or more second candidate RSs (e.g., the first RS, the second RS) and/or one or more candidate measurements (e.g., the first measurement, the second measurement) of the one or more second candidate RSs.

The higher layer (e.g., the MAC layer) of the wireless device 2904 may select a second candidate RS among the one or more second candidate RSs, for example, based on receiving the one or more indicators and/or the one or more candidate measurements associated with the one or more second candidate RSs. The higher layer may indicate the second candidate RS to the physical layer of the wireless device 2904. The second candidate RS may be associated with a second candidate RS indicator (e.g., a periodic CSI-RS configuration index and/or an SSB index provided by the one or more configuration parameters) of the RS-specific indicators.

A wireless device may receive one or more messages. The one or more messages may comprise one or more configuration parameters. The one or more configuration parameters may indicate a plurality of candidate RSs (e.g., the one or more second RSs as described with reference to FIG. 29) for a cell.

The wireless device may detect a beam failure for the cell. The wireless device may initiate a first BFR procedure for the cell, for example, based on the detection of the beam failure. The wireless device may receive a first DL signal (e.g., the first DL signal 2908) indicating a first subset of candidate RSs among the plurality of candidate RSs. The wireless device may initiate the first BFR procedure with the first subset of candidate RSs among the plurality of candidate RSs. The wireless device may receive a second DL signal (e.g., the second DL signal 2912), for example, during the first BFR procedure. The second DL signal (may indicate a second subset of candidate RSs among the plurality of candidate RSs. The first subset of candidate RSs may be different from the second subset of candidate RSs. The first subset of candidate RSs may comprise RS-0, RS-1 and RS-2 and the second subset of candidate RSs may comprise RS-3, RS-4 and RS-5. The first subset of candidate RSs may comprise RS-0, RS-1 and RS-2 and the second subset of candidate RSs may comprise RS-0, RS-1 and RS-3. The first subset of candidate RSs and the second subset of candidate RSs may comprise other candidate RSs in the plurality of candidate RSs. The first subset of candidate RSs and the second subset of candidate RSs may be the same (or substantially the same).

The wireless device may abort/stop the first BFR procedure, for example, based on receiving the second DL signal. The wireless device may initiate a second BFR procedure with the second subset of candidate RSs, for example, based on aborting/stopping the first BFR procedure.

Figure 30:
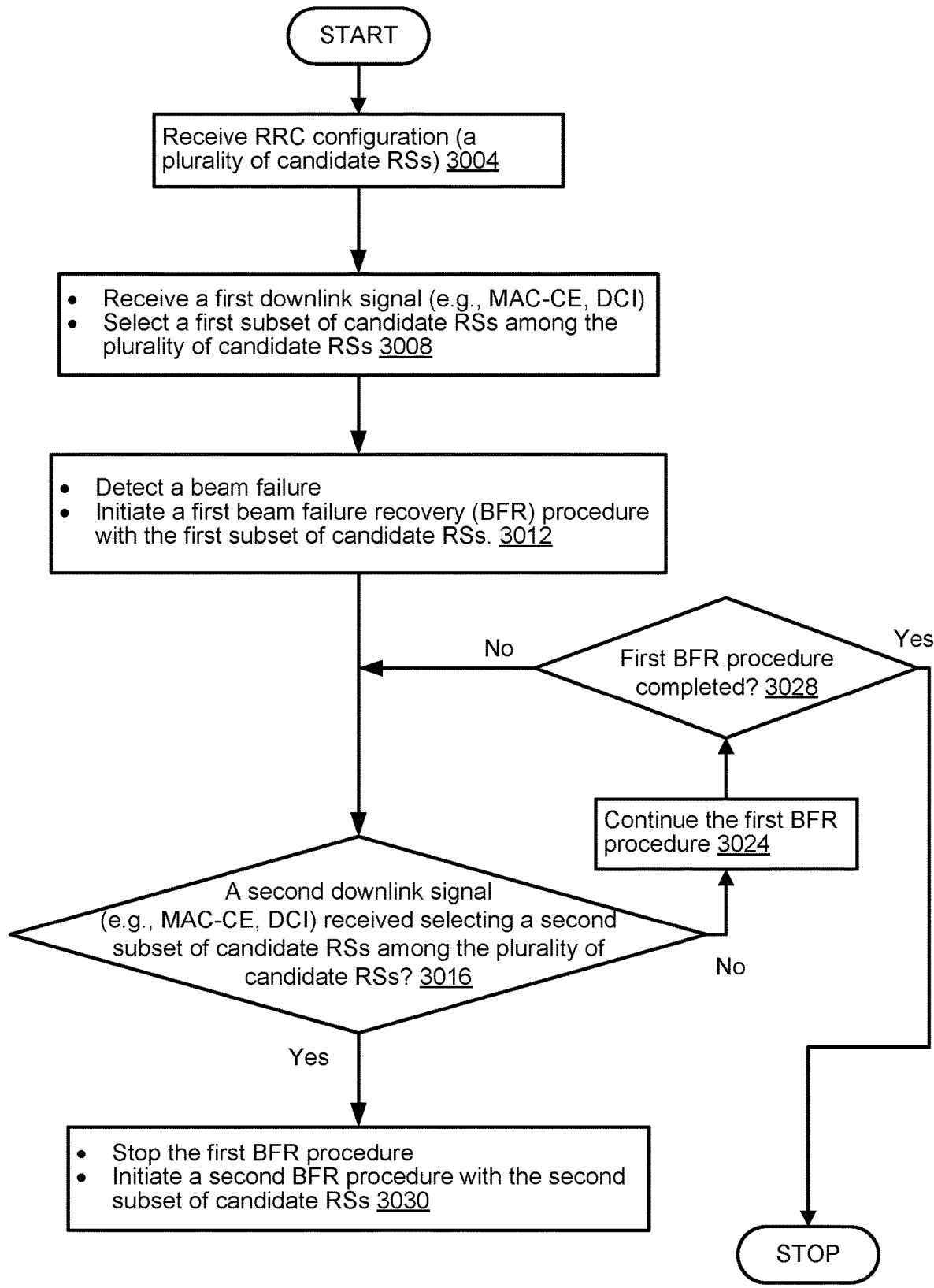
FIG. 30 shows an example method for a DL BFR procedure of a cell (e.g., PCell, SCell). The method may correspond to the BFR procedure described with reference to FIG. 29.

FIG. 30 shows an example method for a DL BFR procedure of a cell (e.g., PCell, SCell). The method may correspond to the BFR procedure described with reference to FIG. 29. At step 3004, a wireless device may receive (e.g., from a base station) an RRC configuration. The RRC configuration may indicate a plurality of candidate RSs. At step 3008, the wireless device may receive a first DL signal (e.g., MAC CE, DCI) indicating a first subset of candidate RSs among the plurality of candidate RSs. The wireless device may select the first subset of candidate RSs based on the first DL signal. At step 3012, the wireless device may detect a beam failure and, based on detecting the beam failure, initiate a first BFR procedure. The wireless device may initiate the first BFR procedure, for example, based on/using the first subset of candidate RSs. At step 3020, the wireless device may stop the first BFR procedure and initiate a second BFR procedure, for example, if the wireless device receives a second DL signal selecting/indicating a second subset of candidate RSs among the plurality of candidate RSs. The wireless device may initiate the second BFR procedure, for example, based on/using the second subset of candidate RSs. The wireless device may continue the first BFR procedure until the first BFR procedure is completed or the wireless device receives the second DL signal.

A wireless device, based on detecting a beam failure, may monitor a plurality of candidate beams (e.g., candidate RSs), corresponding to multiple serving cells, and select a candidate beam (e.g., a candidate RS). Monitoring/measuring/tracking the plurality of candidate beams of the serving cells may increase complexity at the wireless device and/or a size of a configuration message (e.g., RRC configuration message).

A base station may not configure at least some serving cells with candidate beams, for example, to reduce device complexity and transmission overhead. A wireless device may select a default set of candidate beams to monitor, for example, based on detecting a beam failure and/or based on the base station not configuring at least some of the serving cells with candidate beams. The wireless device may select a candidate beam from the default set of candidate beams and complete the BFR procedure. The wireless device may send a message (e.g., to a base station) indicating the selected candidate beam. The wireless device may send a message (e.g., BFR MAC CE) indicating that no candidate beam was selected, for example, if the wireless device is unable to select a candidate beam from the default set of candidate beams. The use of a default set of candidate beams at the wireless device may enable reduced transmission overhead (e.g., associated with a configuration message), higher throughput, and/or reduced wireless device complexity.

Figure 31:
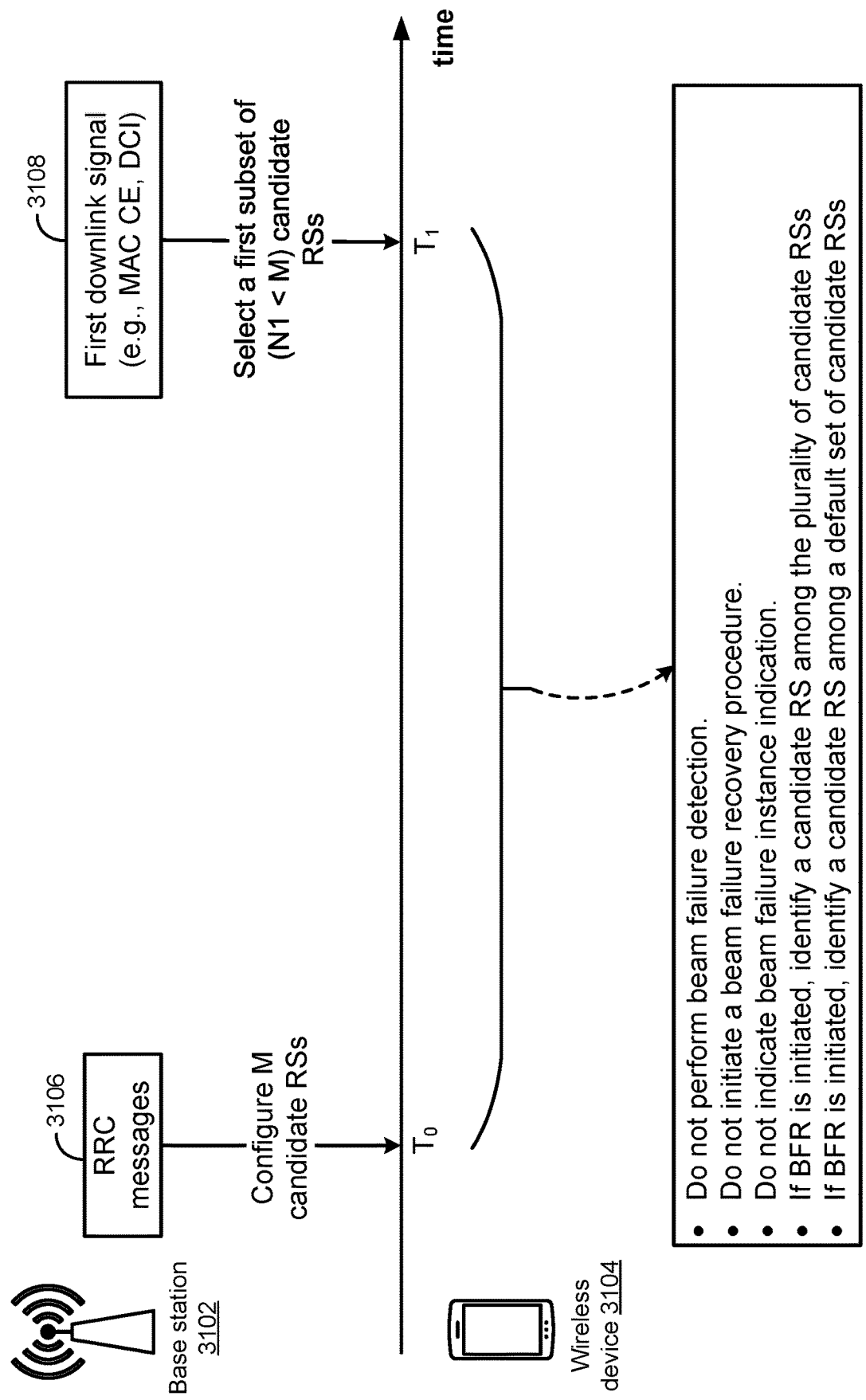
FIG. 31 shows an example of a DL BFR procedure of a cell (e.g., PCell, SCell).

FIG. 31 shows an example of a DL BFR procedure of a cell (e.g., PCell, SCell). Procedures corresponding to time T0 may be similar to procedures corresponding to time T0 as described with reference to FIG. 29. At or after a first time (e.g., time T0), the wireless device 3104 may receive, from a base station 3102, one or more messages comprising one or more configuration parameters for a cell (e.g., PCell, PSCell, PUCCH SCell, SCell). The first time may be a first symbol, or any other duration. The first time may be a first slot. The first time may be a first mini-slot. The first time may be a first subframe. The first time may be a first frame. The one or more messages may comprise one or more RRC messages 3106 (e.g. RRC connection reconfiguration message, RRC connection reestablishment message, and/or RRC connection setup message). The one or more RRC messages 3106 may be similar to the one or more RRC messages 2906 described with reference to FIG. 29. The one or more configuration parameters (e.g., RRC messages 3106) may indicate one or more first RSs (e.g., RadioLinkMonitoringRS in an IE RadioLinkMonitoringConfig) for a DL BWP of the cell. The one or more configuration parameters may indicate one or more second RSs (e.g., candidateBeamRSList in IE BeamFailureRecoveryConfig, M candidate RSs as shown in FIG. 31) for the DL BWP of the cell. The one or more configuration parameters (e.g., RRC messages 3106) may not indicate one or more first RSs for a DL BWP of the cell.

At or after a second time (e.g., time T1), the wireless device 3104 may receive, from the base station 3102, a first DL signal 3108 (e.g., MAC CE, DCI). The second time may be a second symbol, or any other duration. The second time may be a second slot. The second time may be a second mini-slot. The second time may be a second subframe. The second time may be a second frame. The first DL signal 3108 may select/indicate a first subset of candidate RSs (e.g., N1 candidate RSs in FIG. 31) among the one or more second RSs.

The wireless device 3104 may not perform a beam failure detection, for example, prior to and/or at least until receiving the first DL signal 3108 at the second time (e.g., time T1). The wireless device 3104 (e.g., a physical layer in the wireless device 3104) may not assess/determine a first radio link quality of the one or more first RSs (e.g., for a beam failure detection of the DL BWP) prior to the second time. The wireless device 3104 (e.g., the physical layer in the wireless device 3104) may not assess/determine a first radio link quality of the one or more first RSs (e.g., for a beam failure detection of the DL BWP) prior to the second time, for example, based on receiving the first DL signal 3108 in the second time. A time prior to the second time may comprise a time duration between the first time and the second time (e.g., between time T0 and time T1).

The wireless device 3104 (e.g., the physical layer of the wireless device 3104) may not send/provide a BFI indication to a higher layer (e.g., a MAC layer) of the wireless device 3104, for example, prior to/until receiving the first DL signal 3108 in the second time (e.g., between time T0 and time T1). The wireless device 3104 (e.g., the physical layer in the wireless device 3104) may assess/determine a first radio link quality of the one or more first RSs (e.g., for a beam failure detection of the DL BWP). The wireless device 3104 (e.g., the physical layer of the wireless device 3104) may not send/provide a BFI indication to the higher layer prior to the second time (e.g., between time T0 and time T1), for example, if the assessed first radio link quality is worse (e.g., greater BLER, lower L1-RSRP, lower L1-SINR) than a radio link quality indicated by the first threshold. The wireless device 3104 (e.g., the physical layer of the wireless device 3104) may not send/provide a BFI indication to the higher layer prior to the second time based on receiving the first DL signal 3108 in the second time, for example, if the assessed first radio link quality is worse (e.g., greater BLER, lower L1-RSRP, lower L1-SINR) than the first threshold.

The physical layer may send/provide a BFI indication to a higher layer (e.g. the MAC layer) of the wireless device 3104, for example, if the first radio link quality is worse (e.g., greater BLER, lower L1-RSRP, lower L1-SINR) than the first threshold. The wireless device 3104 (e.g., a higher layer, such as the MAC layer, of the wireless device 3104) may not increment BFI_COUNTER by one prior to the second time (e.g., between time T0 and time T1), for example, if the physical layer sends/provides the BFI indication. The higher layer (e.g., the MAC layer) of the wireless device 3104 may not increment BFI_COUNTER prior to the second time, for example, based on receiving the first DL signal 3108 in the second time.

The wireless device 3104 (e.g., a higher layer, such as the MAC layer of the wireless device 3104) may increment BFI_COUNTER by one, for example, based on or in response to the physical layer providing the BFI indication. The BFI_COUNTER may be equal to or greater than the maximum BFI counter (e.g., beamFailureInstanceMax-Count), for example, based on the incrementing the BFI_COUNTER. The wireless device 3104 may detect a beam failure of the DL BWP of the cell, for example, based on the BFI_COUNTER being equal to or greater than the maximum BFI counter. The wireless device 3104 may not initiate a BFR procedure for the DL BWP of the cell prior to the second time (e.g., between time T0 and time T1), for example, if the wireless device 3104 detects the beam failure. The wireless device 3104 may not initiate a BFR procedure for the DL BWP of the cell prior to the second time, based on receiving the first DL signal in the second time), for example, if the wireless device 3104 detects the beam failure.

The BFI_COUNTER may be equal to or greater than the maximum BFI counter (e.g., beamFailureInstanceMax-Count), for example, based on the incrementing the BFI_COUNTER. The wireless device 3104 may detect a beam failure of the DL BWP of the cell, for example, based on the BFI_COUNTER being equal to or greater than the maximum BFI counter. The wireless device 3104 may initiate a first BFR procedure for the DL BWP of the cell based on the detecting the beam failure of the DL BWP.

The wireless device 3104 may initiate the first BFR procedure prior to the second time (e.g., between time T0 and time T1). The wireless device may initiate the first BFR procedure with the one or more second RSs, for example, based on initiating the first BFR procedure prior to the second time. The initiating the first BFR procedure with the one or more second RSs may comprise that the wireless device performs a candidate beam selection procedure among the one or more second RSs. The initiating the first BFR procedure with the one or more second RSs may comprise that the wireless device 3104 assesses/measures/ determines the one or more second RSs in a candidate beam selection procedure. The candidate beam selection may comprise selecting/identifying/determining/indicating a candidate RS (e.g., CSI-RS, SS/PBCH blocks) in/among the one or more second RSs.

The wireless device 3104 may initiate the first BFR procedure, for example, at or after the second time. The wireless device 3104 may initiate the first BFR procedure with the first subset of candidate RSs, for example, based on initiating the first BFR procedure after the second time. The initiating the first BFR procedure with the first subset of candidate RSs may comprise that the wireless device performs a candidate beam selection procedure among the first subset of candidate RSs. The initiating the first BFR procedure with the first subset of candidate RSs may comprise that the wireless device assesses/measures the first subset of candidate RSs in a candidate beam selection procedure for the first BFR procedure. The candidate beam selection may comprise selecting/identifying/indicating a candidate RS (e.g., CSI-RS, SS/PBCH blocks) in/among the first subset of candidate RSs.

The wireless device 3104 may initiate the first BFR procedure, for example, prior to the second time (e.g., between time T0 and time T1). The wireless device 3104 may initiate the first BFR procedure with a default set of candidate RSs, for example, based on initiating the first BFR procedure prior to the second time. The default set of candidate RSs may a default subset of candidate RSs among the one or more second RSs. The initiating the first BFR procedure with the default subset of candidate RSs may comprise that the wireless device performs a candidate beam selection procedure among the default subset of candidate RSs. The initiating the first BFR procedure with the default subset of candidate RSs may comprise that the wireless device assesses/measures the default subset of candidate RSs in a candidate beam selection procedure. The candidate beam selection procedure may comprise selecting/identifying/determining/indicating a candidate RS (e.g., CSI-RS, SS/PBCH blocks) in/among the default subset of candidate RSs.

The default subset of candidate RSs may comprise a first quantity (e.g., 4, 8, 16, or any other quantity) of RSs among the one or more second RSs (e.g., in candidateBeamRSList indicated/provided in IE BeamFailureRecoveryConfig). The wireless device may select the first quantity of RSs for the default subset of candidate RSs. The one or more configuration parameters may indicate the first quantity. The first quantity may be preconfigured.

The one or more second RSs may comprise, for example, RSs RS-0, RS-1, RS-2, . . . , RS-63. The wireless device 3104 may select, as the default subset of candidate RSs, the first four (e.g., the first quantity) of RSs (e.g., RS-0, RS-1, RS-2, RS-3) in the one or more second RSs, for example, if the first quantity is four. The wireless device 3104 may select, as the default subset of candidate RSs, the four (e.g., the first quantity) of RSs with the lowest RS index (e.g., RS-2, RS-5, RS-34, RS-53) among RS-specific indexes of the one or more second RSs.

The one or more second RSs may comprise a plurality of RS groups. The one or more configuration parameters may indicate group-specific indicators/indexes for the plurality of RS groups. Each group of the plurality of RS groups may be indicated/identified with a respective group-specific index of the group-specific indexes. A first RS group of the plurality of RS groups may be indicated/identified by a first group index. The first RS group may comprise, for example, RS-0, RS-1, . . . RS-15. A second RS group of the plurality of RS groups may be indicated/identified by a second group index. The second RS group may comprise, for example, RS-16, RS-17, . . . RS-31. A third RS group of the plurality of RS groups may be indicated/identified by a third group index. The third RS group may comprise, for example, RS-32, RS-33, . . . RS-47. A fourth RS group of the plurality of RS groups may be indicated/identified by a fourth group index. The fourth RS group may comprise, for example, RS-48, RS-49, . . . RS-63. The above RS groupings are merely examples, and in other scenarios, the one or more second RSs may be grouped into a different quantity of groups and/or the groups may comprise different RSs/quantity of RSs.

The wireless device 3104 may select a selected RS group, for example, based on the group-specific indexes. The wireless device 3104 may select the selected RS group with a lowest group-specific index among the group-specific indexes. The wireless device 3104 may select the first RS group (e.g., RS-0, RS-1, . . . RS-15), for example, if the first group index is less than the second group index, the third group index, and the fourth group index. The wireless device may set the selected RS group as the default subset of candidate RSs, for example, based on the selecting.

The wireless device 3104 may select a selected RS group, for example, based on the group-specific indexes. The wireless device 3104 may select the selected RS group with a highest group-specific index among the group-specific indexes. The wireless device 3104 may select the first RS group (e.g., RS-0, RS-1, . . . RS-15), for example, if the first group index is greater than the second group index, the third group index, and the fourth group index. The wireless device 3104 may set the selected RS group as the default subset of candidate RSs, for example, based on the selecting.

Figure 32:
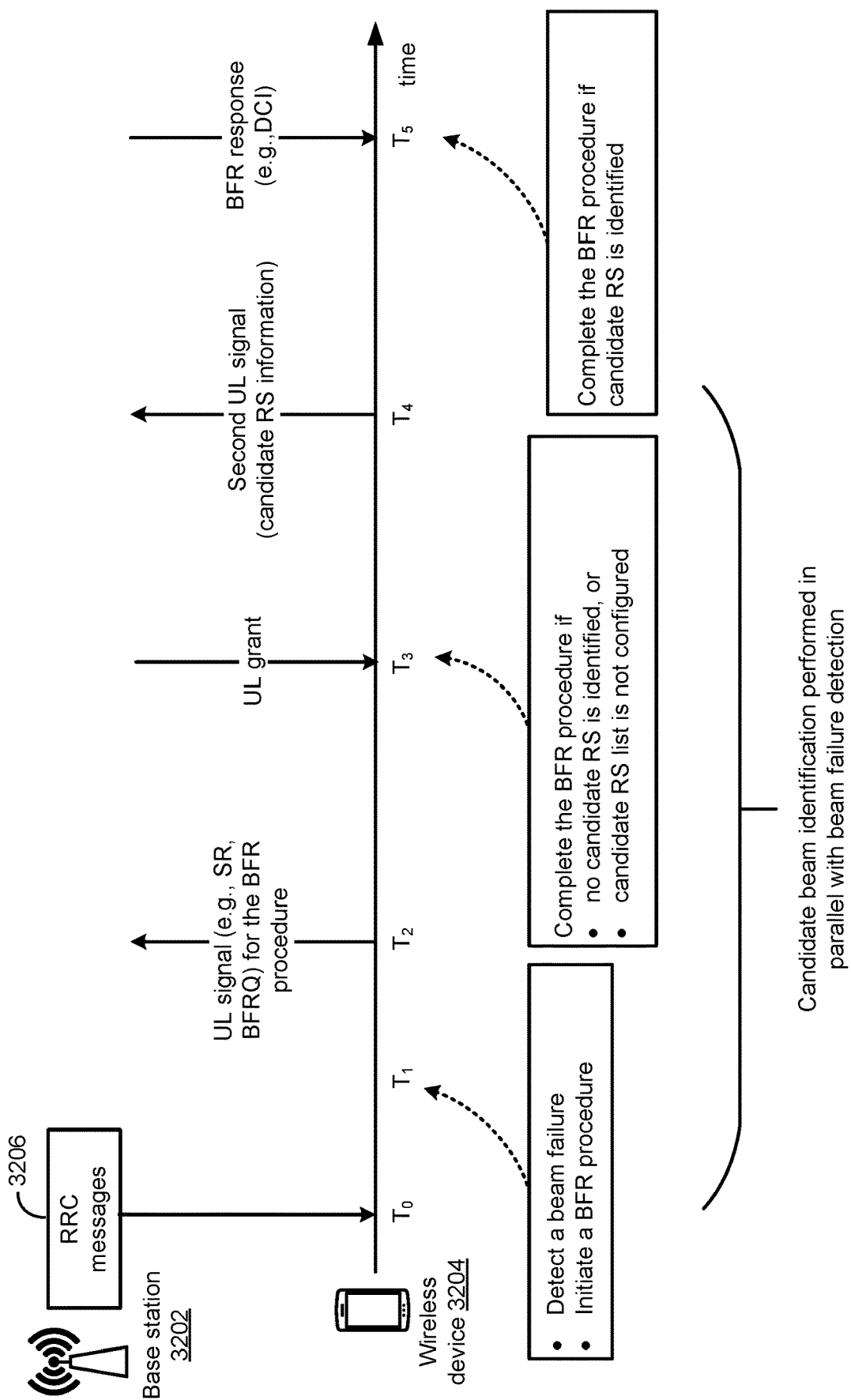
FIG. 32 shows an example of a DL BFR procedure of a secondary cell.

FIG. 32 shows an example of a DL BFR procedure of a secondary cell. At or after time T0, a wireless device 3204 may receive, from a base station 3202, one or more messages comprising one or more configuration parameters for a first cell (e.g., PCell, PSCell, PUCCH SCell, SCell) and one or more secondary cells (. The one or more secondary cells may comprise a second cell (e.g., SCell, SCell configured with PUCCH). The one or more messages may comprise one or more RRC messages 3206 (e.g. RRC connection reconfiguration message, RRC connection reestablishment message, and/or RRC connection setup message). The one or more RRC messages 3206 may be similar to the one or more RRC messages 2906 described with reference to FIG. 29.

The one or more configuration parameters may comprise BWP configuration parameters for a plurality of BWPs. The plurality of BWPs may comprise a first plurality of DL BWPs of the first cell and a first plurality of UL BWPs of the first cell. The plurality of BWPs may comprise a second plurality of DL BWPs of the second cell and a second plurality of UL BWPs of the second cell. The first plurality of DL BWPs may comprise a first DL BWP of the first cell. The first plurality of UL BWPs may comprise a first UL BWP of the first cell. The second plurality of DL BWPs may comprise a second DL BWP of the second cell. The second plurality of UL BWPs may comprise a second UL BWP of the second cell.

The one or more configuration parameters may indicate one or more first RSs (e.g., RadioLinkMonitoringRS indicated in an IE RadioLinkMonitoringConfig) for the second DL BWP of the second cell. The one or more first RSs may comprise one or more first CSI-RSs. The one or more first RSs may comprise one or more first SS/PBCH blocks. The one or more configuration parameters may indicate a maximum BFI counter value (e.g., beamFailureInstanceMaxCount) for the second cell. The wireless device 3204 may assess/determine the one or more first RSs to detect a beam failure for the second DL BWP of the second cell. The one or more configuration parameters may indicate a first threshold (e.g., using parameters by rlmInSyncOutOfSyncThreshold and/or Qout,LR).

The one or more configuration parameters may indicate one or more second RSs (e.g., candidateBeamRSList in IE BeamFailureRecoveryConfig) for the second DL BWP of the second cell. The wireless device 3204 may assess/determine the one or more second RSs, for example, to select a candidate RS among the one or more second RSs for a BFR procedure of the second DL BWP of the second cell.

The one or more configuration parameters may indicate a second threshold (e.g., by rsrp-ThresholdSSB in the IE BeamFailureRecoveryConfig) for a BFR procedure of the second cell and/or the second DL BWP. The wireless device 3204 may use the second threshold in a candidate beam selection procedure of the second cell. The one or more configuration parameters may indicate a BFR timer (e.g., indicated by beamFailureRecoveryTimer in the IE BeamFailureRecoveryConfig) for a BFR procedure of the second cell (or the second DL BWP).

The base station 3202 may configure the second threshold in a BWP (e.g., UL BWP, DL BWP) of the first cell. The base station 3202 may configure the BFR timer in a BWP (e.g., UL BWP, DL BWP) of the first cell. The base station 3202 may configure the second threshold in a BWP (e.g., UL BWP, DL BWP) of the second cell. The base station 3202 may configure the BFR timer in a BWP (e.g., UL BWP, DL BWP) of the second cell.

The one or more configuration parameters may not indicate one or more second RSs (e.g., candidateBeamRSList in IE BeamFailureRecoveryConfig) for the second DL BWP of the second cell. The wireless device 3204 may not assess/determine the one or more second RSs to select a candidate RS among the one or more second RSs for a BFR procedure of the second DL BWP of the second cell. The wireless device 3204 may not perform a candidate beam selection procedure for a BFR procedure of the second DL BWP of the second cell, for example, based on not being configured with the one or more second RSs.

The one or more configuration parameters may not indicate a second threshold (e.g., rsrp-ThresholdSSB in the IE BeamFailureRecoveryConfig) for a BFR procedure of the second cell and/or the second DL BWP. The wireless device 3204 may not perform a candidate beam selection procedure for a BFR procedure of the second DL BWP of the second cell, for example, based on not being configured with the second threshold.

The one or more configuration parameters may indicate a search space set (e.g., recoverySearchSpaceID in the IE BeamFailureRecoveryConfig). The search space set may be linked to/associated with a CORESET. The search space set may indicate the CORESET. The wireless device 3204 may monitor the CORESET for a BFR procedure of the second cell. The base station 3202 may configure the CORESET on the first cell. The base station 3202 may configure the CORESET on the second cell. The wireless device 3204 may monitor the search space set (e.g., linked to/associated with the CORESET) for a BFR procedure of the second DL BWP.

The second DL BWP may be an active DL BWP of the second cell. The wireless device 3204 (e.g., a physical layer in the wireless device 3204) may assess/determine a first radio link quality of the one or more first RSs (for a beam failure detection of the second DL BWP). The physical layer may provide a BFI indication to a higher layer (e.g. a MAC layer) of the wireless device, for example, if the first radio link quality is worse (e.g., greater BLER, lower L1-RSRP, lower L1-SINR) than a radio link quality indicated by the first threshold.

The wireless device 3204 (e.g., the higher layer (e.g., the MAC layer) of the wireless device 3204) may increment BFI_COUNTER (e.g., by one or any other quantity), for example, based on or in response to the physical layer providing the BFI indication. The BFI_COUNTER may count a number of BFI indications. The wireless device 3204 may initially set the BFI_COUNTER to zero (or any other value).

The BFI_COUNTER may be equal to or greater than the maximum BFI counter value (e.g., beamFailureInstanceMaxCount), for example, based on the incrementing the BFI_COUNTER. At or after time T1, the wireless device 3204 may detect a beam failure of the second DL BWP of the second cell, for example, based on the BFI_COUNTER being equal to or greater than the maximum BFI counter. At or after time T1, the wireless device 3204 may initiate a BFR procedure for the second DL BWP of the second cell, for example, based on the detecting the beam failure of the second DL BWP. The wireless device 3204 may start the BFR timer based on the initiating the BFR procedure, for example, if the wireless device 3204 is configured with the BFR timer.

At or after time T1, the wireless device 3204 may initiate/perform a candidate beam selection procedure, for example, based on the initiating the BFR procedure. The wireless device 3204 may initiate/perform a candidate beam selection procedure, for example, before initiating the BFR procedure (e.g., before time T1, between time T0 and T1). The wireless device 3204 may initiate/perform a candidate beam selection procedure, for example, before detecting the beam failure (e.g., before time T1, between time T0 and T1). The wireless device 3204 may initiate/perform a candidate beam selection procedure, for example, based on being configured with the one or more second RSs (e.g., at or after time T0). The wireless device 3204 may perform beam failure detection and the candidate beam selection procedure in parallel (e.g., at or approximately at the same time). The candidate beam selection procedure may comprise selecting/identifying/determining/indicating a candidate RS (e.g., CSI-RS, SS/PBCH blocks) in/among the one or more second RSs. The candidate RS may have better quality (e.g., better RSRP) than a quality indicated by the second threshold.

The wireless device 3204 may initiate/perform the candidate beam selection procedure, for example, before the initiating the BFR procedure. The wireless device 3204 may initiate/perform the candidate beam selection procedure, for example, before the detecting the beam failure of the second DL BWP. The wireless device 3204 may perform/determine one or more measurements on the one or more second RSs in parallel with estimating a first radio link quality of the one or more first RSs.

The initiating the candidate beam selection procedure may comprise requesting, by the higher layer (e.g., the MAC layer) from the physical layer, one or more indexes (e.g., of the RS-specific indexes) associated with one or more candidate RSs among the one or more second RSs and/or one or more candidate measurements (e.g., L1-RSRP measurements) of the one or more candidate RSs. The RS-specific indexes may be, for example, periodic CSI-RS configuration indexes and/or SSB indexes provided/indicated by the one or more configuration parameters. Each measurement of the one or more candidate measurements may be better (e.g. lower BLER or greater L1-RSRP or greater L1-SINR) than the second threshold (e.g., rsrp-ThresholdSSB).

The wireless device 3204 (e.g., the physical layer of the wireless device 3204) may determine/perform one or more measurements (e.g. L1-RSRP measurements) for the one or more second RSs. The wireless device 3204 may perform each measurement of one or more measurements to determine a candidate RS of the one or more second RSs. The wireless device 3204 (e.g., the physical layer of the wireless device 3204) may determine/perform a first measurement of the one or more measurements for a first RS of the one or more second RSs. The wireless device 3204 (e.g., the physical layer of the wireless device 3204) may determine/perform a second measurement of the one or more measurements for a second RS of the one or more second RSs. The wireless device 3204 (e.g., the physical layer of the wireless device 3204) may determine/perform a third measurement of the one or more measurements for a third RS of the one or more second RSs, and so on.

The wireless device 3204 may determine that one or more candidate RSs of the one or more second RSs may have one or more candidate measurements that are better (e.g. lower BLER or greater L1-RSRP or greater SINR) than the second threshold (e.g., rsrp-ThresholdSSB), for example, based on the performing the one or more measurements. Each candidate RS of one or more candidate RSs may have a candidate measurement (e.g., L1-RSRP), of the one or more candidate measurements, that is better (e.g., greater) than the second threshold. The first measurement for the first RS may be better (e.g., greater L1-RSRP) than the second threshold. The second measurement for the second RS may be better (e.g., greater L1-RSRP) than the second threshold. The third measurement for the third RS may be worse (e.g., lower L1-RSRP) than the second threshold. The one or more candidate RSs may comprise the first RS and the second RS, for example, based on the first measurement and second measurement being better than the second threshold and the third measurement being worse than the second threshold. The wireless device 3204 (e.g., the physical layer of the wireless device 3204) may provide, to the higher layer (e.g., the MAC layer) of the wireless device 3204, one or more indexes of the one or more candidate RSs (e.g., the first RS, the second RS) and/or one or more candidate measurements (e.g., the first measurement, the second measurement) of the one or more candidate RSs.

The wireless device 3204 (e.g., the higher layer, such as the MAC layer of the wireless device 3204) may determine/select a candidate RS among the one or more candidate RSs. The higher layer may indicate the candidate RS to the physical layer of the wireless device 3204. The candidate RS may be associated with a candidate RS index (e.g., periodic CSI-RS configuration index and/or the SSB index provided by the one or more configuration parameters) of the RS-specific indexes.

The one or more configuration parameters may indicate cell-specific UL physical channels for the one or more secondary cells. The cell-specific UL physical channels may be (e.g., one-to-one) associated with the one or more secondary cells. Each cell of the one or more secondary cells may be associated with a respective cell-specific UL physical channel of the cell-specific UL physical channels. A first cell of the one or more secondary cells may be associated with a first cell-specific UL physical channel of the cell-specific UL physical channels. The wireless device 3204 may send/transmit a first UL signal via the first cell-specific UL physical channel for a first BFR procedure of the first cell. The base station 3202 may be aware of the first BFR procedure of the first cell, for example, based on receiving the first UL signal. A second cell of the one or more secondary cells may be associated with a second cell-specific UL physical channel of the cell-specific UL physical channels. The wireless device 3204 may send/transmit a second UL signal via the second cell-specific UL physical channel for a second BFR procedure of the second cell. The base station 3202 may be aware of the second BFR procedure of the second cell, for example, based on receiving the second UL signal.

The one or more configuration parameters may indicate one or more UL physical channels (e.g., of the cell-specific UL physical channels) for a BFR procedure of the second cell. The one or more UL physical channels may comprise PRACH, PUCCH, and/or PUSCH resources.

The base station 3202 may configure the one or more UL physical channels on the first cell. The base station 3202 may configure the one or more UL physical channels on the second cell. The base station 3202 may configure the one or more UL physical channels (e.g., PUCCHs, PUSCH, PRACH) on a third cell (e.g., SCell) of the one or more secondary cells.

The one or more UL physical channels may or may not be dedicated to the BFR procedure of the second cell. The base station 3202 may determine that the BFR procedure of the second cell has been initiated, for example, if the base station 3202 receives an UL signal (e.g., preamble, BFRQ, SR, or BFR MAC CE) via at least one UL physical channel (e.g., PUSCH, PRACH, or PUCCH) of the one or more UL physical channels and if the one or more UL physical channels are dedicated to the BFR procedure of the second cell. The base station 3202 may or may not determine whether the UL signal is transmitted for a BFR procedure of the second cell or for requesting UL-SCH resources for an UL transmission, for example, if the base station receives an UL signal (e.g., the SR) via at least one UL physical channel (e.g., PUCCH) of the one or more UL physical channels. At or after time T2, the wireless device 3204 may send/transmit the UL signal (e.g., preamble, BFRQ, SR, or MAC CE) via at least one UL physical channel (e.g., PRACH, PUCCH, or PUSCH) of the one or more UL physical channels, for example, based on initiating the BFR procedure for the second cell.

The BFR procedure may be PUCCH-based (e.g., BFR-PUCCH). The UL signal may be a BFRQ (e.g., BFRQ, SR, SR-like) and/or the at least one UL physical channel may be a PUCCH, for example, if the BFR procedure is PUCCH-based.

The BFR procedure may be MAC CE-based (e.g., BFR-PUSCH). The UL signal may be a MAC CE (e.g., BFR MAC CE, PHR MAC CE, etc.) and/or the at least one UL physical channel may be a PUSCH, for example, if the BFR procedure is MAC CE-based.

The BFR procedure may be PRACH-based (e.g., BFR-PRACH). The UL signal may be an RA preamble and/or the at least one UL physical channel may be a PRACH, for example, if the BFR procedure is PRACH-based.

The one or more configuration parameters may indicate a response window for the second cell. The one or more configuration parameters may indicate a maximum transmission counter value (e.g., sr-TransMax, bfrq-TransMax, preambleTransMax) for the second cell.

The one or more configuration parameters may comprise one or more CORESETs for the second DL BWP of the second cell. The wireless device 3204 may monitor the one or more CORESETs, for example, prior to the initiating the BFR procedure. The wireless device 3204 may not monitor the CORESET, for example, prior to the initiating the BFR procedure. The wireless device 3204 may monitor the one or more CORESETs and the CORESET, for example, during the BFR procedure. The wireless device 3204 may prioritize the CORESET over the one or more CORESETs, for example, during the BFR procedure. The prioritizing the CORESET over the one or more CORESETs may comprise that the wireless device 3204 may monitor the CORESET and depending on a wireless device's capability, the wireless device 3204 may monitor at least one CORESET of the one or more CORESETs.

The wireless device 3204 may start the response window (e.g., ra-responseWindow, sr-prohibit timer, bfrq-prohibit timer), for an UL grant from the base station 3202, for example, based on/after the transmitting the UL signal. The wireless device 3204 may monitor, for the UL grant from the base station 3202, at least one PDCCH in the one or more CORESETs within the response window (e.g., while the response window is running).

The wireless device 3204 may increment a transmission counter (e.g., by one), for example, based on the transmitting the UL signal. The transmission counter may be preamble_transmission_counter, sr-counter, or bfrq-counter. The wireless device 3204 may set the transmission counter to an initial value (e.g., zero, one, or any other value) based on the initiating the BFR procedure. The wireless device 3204 may resend/retransmit the UL signal, for example, if a transmission counter value (e.g., corresponding to the transmission counter) is less than the maximum transmission counter value.

The response window may expire. The wireless device 3204 may not receive the UL grant within the response window (e.g., before the response window expires). The wireless device 3204 may resend/retransmit the UL signal, via at least one UL physical channel of the one or more UL physical channels, for the BFR procedure, for example, if the response window expires and/or the transmission counter value is less than the maximum transmission counter value. The wireless device 3204 may increment a transmission counter (e.g., by one or any other quantity), for example, based on the retransmitting transmitting the UL signal.

The transmission counter value may be equal to or greater than the maximum transmission counter value. The wireless device 3204 may initiate an RA procedure (e.g., a contention-based RA procedure), for example, if the transmission counter value is equal to or greater than the maximum transmission counter value.

The wireless device 3204 may stop/reset the BFR timer, for example, if the transmission counter value is equal to or greater than the maximum transmission counter value. The wireless device may reset BFI_COUNTER to zero, for example, if the transmission counter value is equal to or greater than the maximum transmission counter value.

At or after time T3, the wireless device 3204 may receive the UL grant from the base station. The wireless device may receive the UL grant from the base station, for example, within the response window.

The UL grant may indicate UL resources. The UL resources may comprise time resources. The UL resources may comprise frequency resources.

The wireless device 3204 may or may not determine/identify/indicate a candidate RS in the candidate beam selection procedure at a time prior to the (scheduled) UL resources of the UL grant (e.g., before time T4). At or after time T3, the wireless device 3204 may complete the BFR procedure (e.g., at time T3), for example, based on not determining/identifying/indicating the candidate RS in the candidate beam selection procedure at a time prior to the (scheduled) UL resources of the UL grant.

The wireless device 3204 may determine that a candidate RS, among the one or more second RSs, has not been determined/identified/indicated (e.g., based on assessing/measuring the one or more second RSs in the candidate beam selection procedure) prior to scheduled resources of the UL grant. At or after time T3, the wireless device 3204 may complete the BFR procedure, for example, based on the determining that a candidate RS, among the one or more second RSs, has not been determined/identified/indicated prior to scheduled resources of the UL grant.

The wireless device 3204 may measure/assess/determine (e.g., perform one or more measurements such as L1-RSRP measurements) the one or more second RSs to determine/select a candidate RS, among the one or more second RSs, for the BFR procedure of the second DL BWP of the second cell. Not determining/identifying/indicating the candidate RS in the candidate beam selection procedure may comprise that the wireless device 3204 may determine that each measurement (e.g. an L1-RSRP measurement) of one or more measurements for a candidate RS of the one or more second RSs is less than the second threshold. Not determining/identifying the candidate RS in the candidate beam selection procedure may comprise that none of the one or more second RSs has a measurement (e.g. an L1-RSRP measurement) that is greater than the second threshold. Not determining/identifying the candidate RS in the candidate beam selection procedure may comprise that each candidate RS of the one or more second RSs has a measurement (e.g. an L1-RSRP measurement) that is less than the second threshold.

The one or more configuration parameters may or may not indicate one or more second RSs (e.g., in candidate-BeamRSList provided in IE BeamFailureRecoveryConfig) for the second DL BWP of the second cell. At or after time T3, the wireless device 3204 may complete the BFR procedure, for example, if the wireless device 3204 receives the UL grant and the wireless device 3204 is not configured with the one or more second RSs (e.g., using the one or more configuration parameters).

The one or more configuration parameters may or may not indicate a second threshold (e.g., rsrp-ThresholdSSB in the IE BeamFailureRecoveryConfig) for a BFR procedure of the second cell and/or the second DL BWP. At or after time T3, the wireless device 3204 may complete the BFR procedure, if the wireless device 3204 receives the UL grant and the wireless device 3204 is not configured with the second threshold.

A time prior to the (scheduled) uplink resources of the uplink grant may comprise any time prior to and/or at least until reception of the uplink grant (e.g., time T3). The wireless device 3204 may or may not determine/identify/indicate a candidate RS in the candidate beam selection, for example, prior to and/or at least until the reception of the UL grant.

A time prior to the (scheduled) UL resources of the UL grant may comprise any time prior to/until transmission of the UL signal (e.g., time T2). The wireless device 3204 may or may not determine/identify/indicate a candidate RS in the candidate beam selection, for example, prior to and/or at least until the transmission of the UL signal.

At or after time T4, the wireless device 3204 may send/transmit a second UL signal (e.g., PUSCH, transport block, UCI, PUCCH, MAC-CE, etc.) via UL resources indicated by the UL grant. A time prior to the (scheduled) UL resources of the UL grant may comprise any time prior to/until a preparation/generation of the second UL signal (e.g., until time T4 minus PUSCH preparation time). The wireless device 3204 may or may not determine/identify/indicate a candidate RS in the candidate beam selection procedure, for example, prior to and/or at least until a start of the preparation/generation of the second UL signal.

The wireless device 3204 may determine a candidate RS (of the one or more second RSs) for the BFR procedure. The candidate RS may be indicated by (e.g., associated/identified with) a candidate RS index of the RS-specific indexes. The wireless device 3204 may determine the candidate RS, for example, based on the candidate beam selection procedure. At or after time T4, the wireless device 3204 may send/transmit a second UL signal via UL resources indicated by the UL grant, for example, based on determining the candidate RS. The second UL signal may comprise/indicate the candidate RS index (e.g., candidate RS information). The second UL signal may be a MAC CE (e.g., BFR MAC CE, PHR MAC CE, BSR, or the like). The second UL signal may be a layer-1 report.

The one or more configuration parameters may indicate a second response window for the second cell. The one or more configuration parameters may indicate a second maximum transmission counter value (e.g., sr-TransMax, bfrq-TransMax, preambleTransMax, PUSCH-TransMax) for the second cell.

The wireless device 3204 may start the second response window (e.g., ra-responseWindow, sr-prohibit timer, bfrq-prohibit timer), for a BFR response from the base station 3202, for example, based on the transmitting the second UL signal. The wireless device 3204 may monitor, for the BFR response from the base station 3202, at least one PDCCH in the CORESET (e.g., linked to the search space set) within the second response window (e.g., while the second response window is running). At least one DM-RS of the at least one PDCCH may be associated (e.g., QCL-ed) with the candidate RS.

The BFR response may comprise DCI indicating an UL grant (e.g., a second UL grant for the second cell). The BFR response may comprise DCI indicating a DL assignment (e.g., for the second cell). The DCI may be configured with CRC that is scrambled by an RNTI (e.g., C-RNTI, MCS-C-RNTI) of the wireless device 3204. The DCI may be addressed to the RNTI.

The wireless device 3204 may increment a second transmission counter (e.g., by one), for example, based on the transmitting the second UL signal. The second transmission counter may be a preamble_transmission_counter, sr-counter, or bfrq-counter. The wireless device 3204 may set the second transmission counter to an initial value (e.g., zero, one, or any other value) based on the initiating the BFR procedure. The wireless device 3204 may set the second transmission counter to the initial value, for example, based on receiving the UL grant (e.g., at time T3).

The wireless device 3204 may resend/retransmit the second UL signal for the BFR procedure, for example, if a second transmission counter value of the second transmission counter is less than the second maximum transmission counter value. The second response window may expire. The wireless device may not receive the BFR response within the second response window (e.g., before the second response window expires). The wireless device may resend/retransmit the second UL signal (e.g., preamble, PUSCH transmission, BSR, etc.) for the BFR procedure, for example, if the second response window expires and/or if the second transmission counter value is less than the second maximum transmission counter value.

The second transmission counter value may be equal to or greater than the second maximum transmission counter value. The wireless device 3204 may initiate an RA procedure (e.g., a contention-based RA procedure), for example, if the second transmission counter value is equal to or greater than the second maximum transmission counter value.

The wireless device 3204 may stop/reset the BFR timer, for example, if the second transmission counter value is equal to or greater than the second maximum transmission counter value. The wireless device 3204 may reset BFI_COUNTER to zero, for example, if the second transmission counter value is equal to or greater than the second maximum transmission counter value. At or after time T5, the wireless device 3204 may complete the BFR procedure for the second cell successfully, for example, based on receiving the BFR response in the CORESET (or in the search space set) within the second response window.

Figure 33:
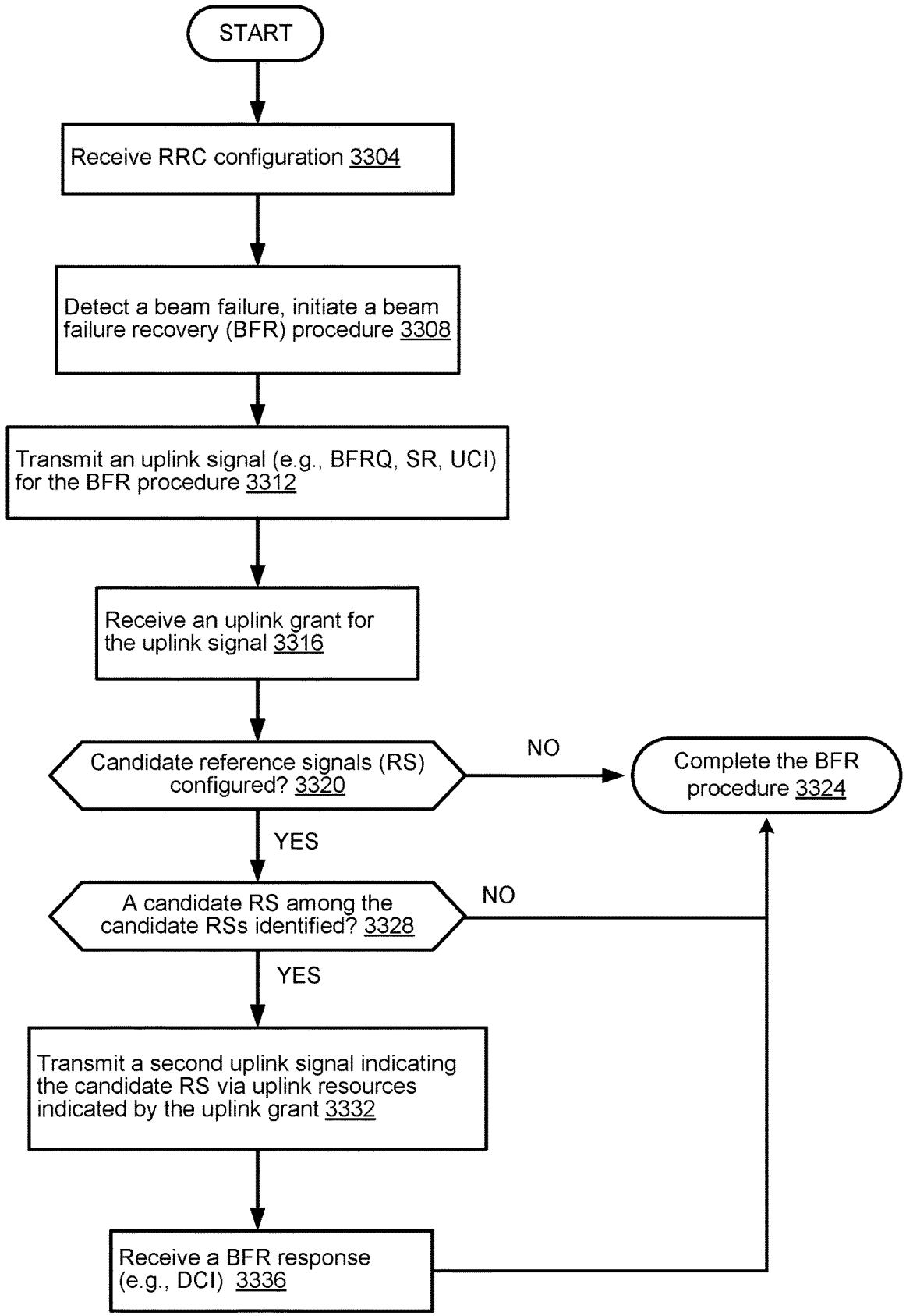
FIG. 33 shows an example method for DL BFR in a cell (e.g., PCell, SCell).

FIG. 33 shows an example method for DL BFR in a cell (e.g., PCell, SCell). The example method may correspond to the BFR procedure described with reference to FIG. 32. At step 3304, a wireless device may receive an RRC configuration. At step 3308, the wireless device may detect a beam failure and initiate a BFR procedure. At step 3312, the wireless device may send/transmit an uplink signal (e.g., BFRQ, SR, UCI) for the BFR procedure. At step 3316, the wireless device may receive an UL grant for the uplink signal. At step 3332, the wireless device may send/transmit a second UL signal for the BFR procedure, for example, if the wireless device is configured with candidate RSs (e.g., using the RRC configuration) and/or if the wireless device determines/identifies a candidate RS, among the candidate reference signals. The wireless device may send/transmit the second UL signal, for example, via UL resources indicated by the UL grant. At step 3336, the wireless device may receive a BFR response (e.g., DCI) based on the second UL signal. At step 3324, the wireless device may complete the BFR procedure, for example, if the wireless device receives the BFR response. The wireless device may complete the BFR procedure, for example, if the wireless device is not configured with candidate RSs. The wireless device may complete the BFR procedure, for example, if the wireless device is configured with candidate RSs but the wireless device is unable to determine/identify/indicate a candidate RS, among the candidate reference signals.

Figure 34:
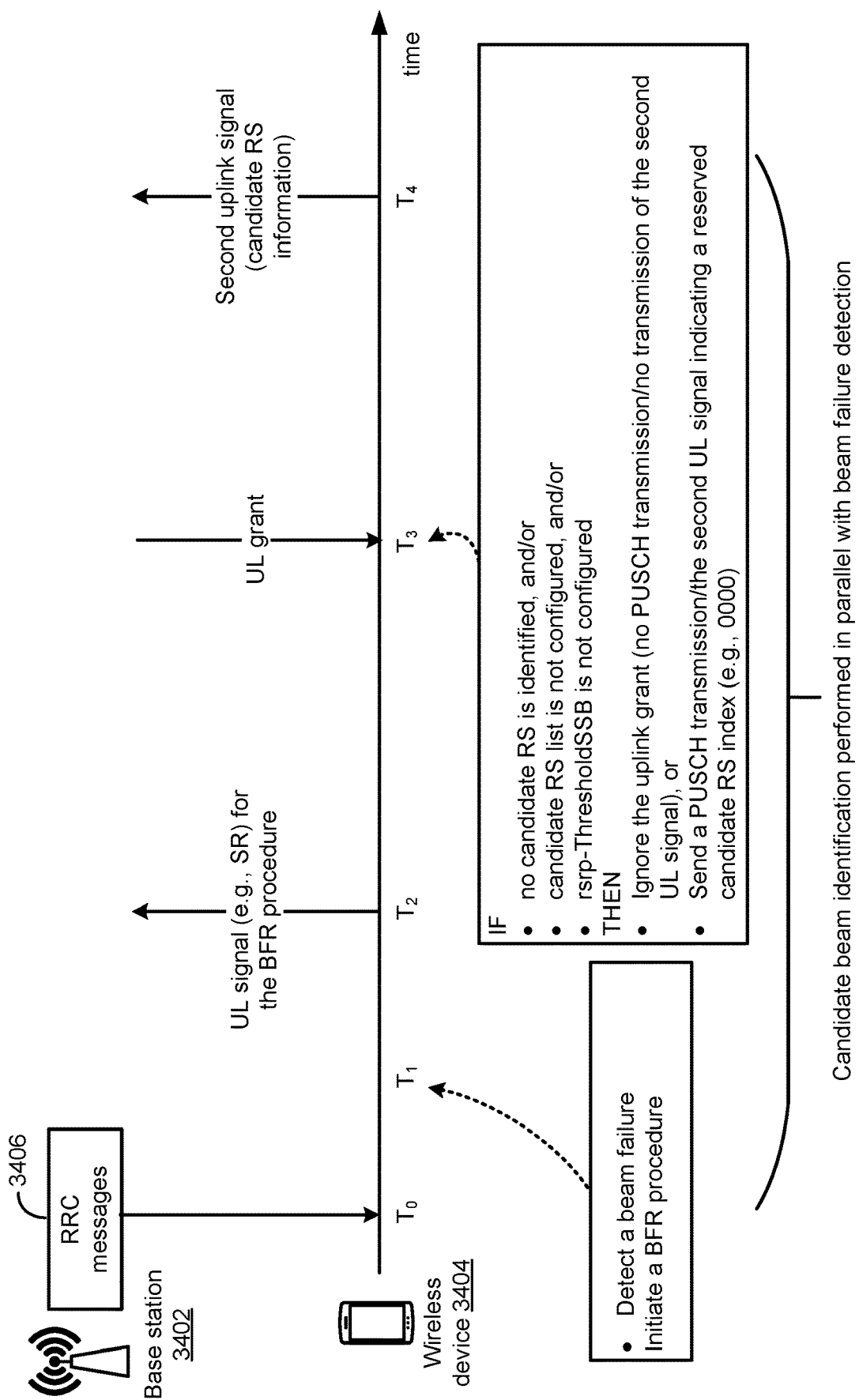
FIG. 34 shows an example of a DL BFR procedure of a secondary cell.

FIG. 34 shows an example of a DL BFR procedure of a secondary cell. Procedures corresponding to times T0, T1, T2 and T3 may be similar to procedures corresponding to times T0, T1, T2 and T3, respectively, as described with reference to the DL BFR procedure of FIG. 32. At or after time T0, a wireless device 3404 may receive, from a base station 3402, one or more messages (e.g., RRC messages 3406) comprising one or more configuration parameters. At or after time T1, the wireless device 3404 may initiate a BFR procedure for the second DL BWP of the second cell based on the detecting a beam failure of the second DL BWP.

At or after time T2, the wireless device 3404 may send/transmit an UL signal (e.g., preamble, BFRQ, SR, BFR MAC CE) via at least one UL physical channel (e.g., PRACH, PUCCH, or PUSCH) of the one or more UL physical channels, for example, based on initiating the BFR procedure for the second cell.

At or after time T3, the wireless device 3404 may receive an UL grant from the base station. At or after time T3, the wireless device 3404 may complete the BFR procedure, for example, based on the receiving the UL grant. At or after time T4, the wireless device 3404 may send/transmit a second UL signal via UL resources indicated by the UL grant. The wireless device 3404 may complete the BFR procedure, for example, based on sending/transmitting the second UL signal via the UL resources indicated by the UL grant.

The wireless device 3404 may monitor (e.g., for DCI (e.g., ACK, NACK)), for example, based on the transmitting the second UL signal. The wireless device 3404 may complete the BFR procedure, for example, based on receiving the DCI. The wireless device 3404 may receive the DCI via the CORESET. The wireless device 3404 may receive the DCI via at least one CORESET of the one or more CORESETs. The wireless device 3404 may stop/reset the BFR timer, for example, based on the completing the BFR procedure. The wireless device 3404 may reset BFI_COUNTER to zero, for example, based on the completing the BFR procedure.

The wireless device 3404 may or may not determine/identify/indicate a candidate RS in a candidate beam selection, for example, prior to the (scheduled) UL resources of the UL grant. At or after time T3, the wireless device 3404 may ignore the UL grant, for example, based on not determining/identifying/indicating the candidate RS in the candidate beam selection prior to the (scheduled) UL resources of the UL grant.

The one or more configuration parameters may or may not indicate one or more second RSs (e.g., in candidateBeamRSList in IE BeamFailureRecoveryConfig) for the second DL BWP of the second cell. At or after time T3, the wireless device 3404 may ignore the UL grant, for example, if the wireless device 3404 receives the UL grant and/or if the wireless device 3404 is not configured with the one or more second RSs.

The one or more configuration parameters may or may not indicate a second threshold (e.g., in rsrp-ThresholdSSB in the IE BeamFailureRecoveryConfig) for the second cell and/or the second DL BWP. At or after time T3, the wireless device may ignore the UL grant, for example, if the wireless device 3404 receives the UL grant and/or if the wireless device is not configured with the second threshold.

The ignoring the UL grant may comprise that the wireless device 3404 may not send/transmit (e.g., at or after time T4) a second UL signal via UL resources indicated by the UL grant. The ignoring the UL grant may comprise that the wireless device 3404 may not monitor a channel for DCI (e.g., ACK, NACK, UL grant) scheduling a (re-)transmission of the second UL signal. The base station 3402 may determine that the wireless device 3404 has not determined/identified/indicated a candidate RS in the candidate beam selection procedure, for example, based on not receiving the second UL signal via the UL resources indicated by the UL grant. The base station 3402 may deactivate the second cell, for example, based on the determining. The base station 3402 may initiate a beam management (e.g., aperiodic beam management, aperiodic CSI-RS) procedure for the second cell, for example, based on the determining.

The wireless device 3404 may or may not determine/identify/indicate a candidate RS in the candidate beam selection procedure, for example, prior to the (scheduled) UL resources of the UL grant. The wireless device 3404 may transmit the second UL signal with a reserved indicator/index (e.g., 0000, 1111, or any other index)), for example, based on the wireless device 3404 not determining the candidate RS in the candidate beam selection procedure prior to the (scheduled) UL resources of the UL grant. Transmitting the second UL signal with the reserved index may comprise that the second UL signal may comprise/indicate the reserved index.

The one or more configuration parameters may or may not indicate one or more second RSs (e.g., in candidate-BeamRSList provided in IE BeamFailureRecoveryConfig) for the second DL BWP of the second cell. At or after time T4, the wireless device 3404 may send/transmit the second UL signal indicating the reserved index, for example, if the wireless device 3404 receives the UL grant and/or if the wireless device is not configured with the one or more second RSs.

The one or more configuration parameters may or may not indicate a second threshold (e.g., rsrp-ThresholdSSB in the IE BeamFailureRecoveryConfig) for a BFR procedure of the second cell (or the second DL BWP). At or after time T4, the wireless device 3404 may send/transmit the second UL signal indicating the reserved index, for example, if the wireless device 3404 receives the UL grant and/or if the wireless device is not configured with the second threshold.

The reserved index may be preconfigured. The one or more configuration parameters may indicate the reserved index. The wireless device 3404 may determine/select (e.g., randomly) the reserved index. The reserved index may be different from (or the same as) the RS-specific indexes. The RS-specific indexes may or may not comprise the reserved index.

The base station 3402 may determine that the wireless device 3404 has not determined/not identified a candidate RS in the candidate beam selection procedure, for example, based on receiving the second UL signal indicating the reserved index. The base station 3402 may deactivate the second cell, for example, based on the determining. The base station 3402 may initiate a beam management (e.g., aperiodic beam management, aperiodic CSI-RS) procedure for the second cell based on the determining.

The higher layer (e.g., a MAC layer) of the wireless device 3404 may indicate the candidate RS index to the physical layer of the wireless device 3404, for example, after/in response to a start of a preparation of the second UL signal. The second UL signal may or may not comprise/indicate the candidate RS index, for example, based on the higher layer indicating the candidate RS index to the physical layer after the start of the preparation of the second UL signal.

The higher layer (e.g., the MAC layer) of the wireless device 3404 may indicate the candidate RS index to the physical layer of the wireless device 3404, for example, before the start of the preparation of the second UL signal. The second UL signal may comprise/indicate the candidate RS index, for example, based on the higher layer indicating the candidate RS index to the physical layer before the start of the preparation of the second UL signal.

Figure 35:
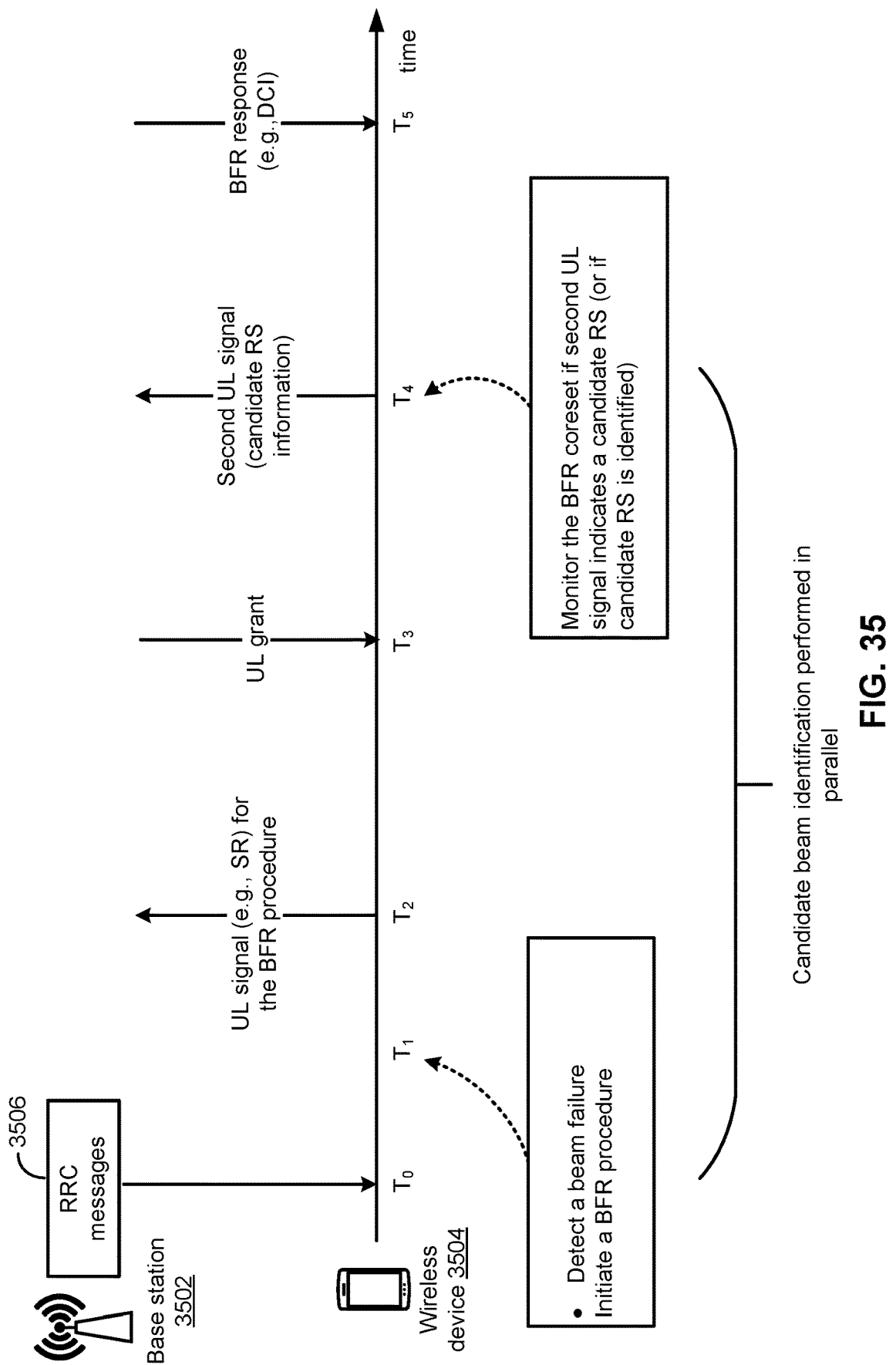
FIG. 35 shows an example of a DL BFR procedure of a secondary cell.

FIG. 35 shows an example of a DL BFR procedure of a secondary cell. Procedures corresponding to times T0, T1, T2 and T3 of FIG. 35 are similar to procedures corresponding to times T0, T1, T2 and T3, respectively, as described with reference to FIGS. 32 and 34. At or after time T0, a wireless device 3504 may receive, from a base station 3502, one or more messages (e.g., RRC messages 3506) comprising one or more configuration parameters. At or after time T1, the wireless device 3504 may initiate the BFR procedure for the second DL BWP of the second cell, for example, based on the detecting a beam failure of the second DL BWP.

At or after time T2, the wireless device 3504 may send/transmit an UL signal (e.g., preamble, BFR BFRQ, SR, or BFR MAC CE) via at least one UL physical channel (e.g., BFR-PRACH, BFR-PUCCH, PUSCH, and/or PUCCH) of the one or more UL physical channels, for example, based on initiating the BFR procedure for the second cell. At or after time T3, the wireless device 3504 may receive an UL grant from the base station. At or after time T4, the wireless device 3504 may send/transmit a second UL signal via UL resources indicated by the UL grant.

The wireless device 3504 may determine/identify/indicate a candidate RS (e.g., in the one or more second RSs) based on the candidate beam selection procedure. The candidate RS may be associated with/indicated by a candidate RS index of the RS-specific indexes (e.g., corresponding to the one or more second RSs). The wireless device may transmit the second UL signal with the candidate RS index, for example, based on the determining the candidate RS. Transmitting the second UL signal with the candidate RS index may comprise that the second UL signal may comprise/indicate the candidate RS index.

The wireless device 3504 may or may not determine/identify a candidate RS (e.g., in the one or more second RSs) based on the candidate beam selection procedure. The second UL signal may not comprise/indicate a candidate RS index of the candidate RS, for example, based on the wireless device 3504 not determining the candidate RS. The second UL signal may not comprise/indicate a candidate RS index, wherein the candidate RS may be at least one RS index of RS-specific indexes (e.g., corresponding to the one or more second RSs). The second UL signal may comprise/indicate a reserved index, wherein the reserved index is different from each RS index of the RS-specific indexes.

The wireless device 3504 may monitor the CORESET (e.g., linked to the search space set) for DCI, for example, based on an indicator/index (e.g., the candidate RS index, reserved index, etc.) indicated in the second UL signal transmitted via the UL resources indicated by the UL grant. The wireless device 3504 may start monitoring the CORESET, for example, based on or in response to the transmitting the second UL signal and/or based on the index being equal to the candidate RS index. The wireless device 3504 may start monitoring the CORESET, for example, based on or in response to the transmitting the second UL signal and/or based on the index being equal to at least one RS index of the RS-specific indexes. At or after time T5, the wireless device 3504 may successfully complete the BFR procedure for the second cell, for example, based on receiving the BFR response in the CORESET (and/or in the search space set) within the response window. The wireless device 3504 may not start/may refrain from monitoring the CORESET, for example, based on or in response to the transmitting the second UL signal and/or based on the index being equal to the reserved index. The wireless device 3504 may continue monitoring the one or more CORESETs, for example, based on the wireless device 3504 not monitoring the CORESET.

The wireless device 3504 may or may not start monitoring the CORESET, for example, based on or in response to the transmitting the second UL signal and/or based on the index being different from each RS index of the RS-specific indexes. The wireless device 3504 may continue monitoring the one or more CORESETs for example, based on the wireless device 3504 not monitoring the CORESET. The wireless device 3504 may complete the BFR procedure for the second cell based on receiving DCI (e.g., ACK) for the second UL signal via at least one CORESET of the one or more CORESETs.

Figure 36:
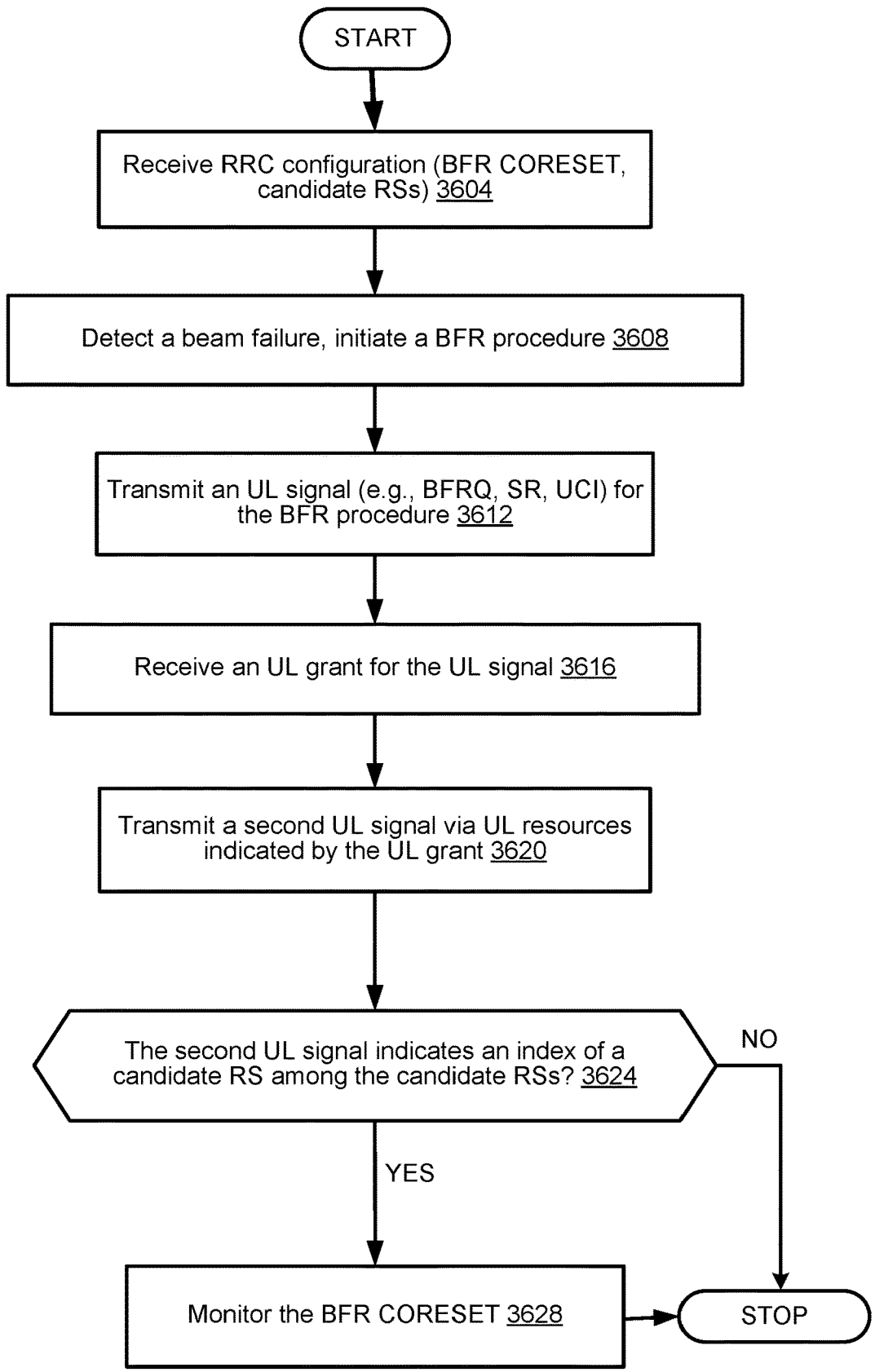
FIG. 36 shows an example method for DL BFR in a cell (e.g., PCell, SCell).

FIG. 36 shows an example method for DL BFR in a cell (e.g., PCell, SCell). At step 3604, a wireless device may receive one or more configuration parameters (e.g., indication of a BFR CORESET indication, indications of candidate RSs). At step 3608, the wireless device may detect a beam failure and/or initiate a BFR procedure. At step 3612, the wireless device may send an UL signal (e.g., BFRQ, SR, UCI) for the BFR procedure. At step 3616, the wireless device may receive an UL grant for the UL signal. The UL grant may indicate UL resources. At step 3620, the wireless device may send a second UL signal via the UL resources indicated by the UL grant. At step 3628, the wireless device may monitor the BFR CORESET, for example, if the second UL signal indicates an indicator/index of a candidate RS among the candidate RSs. The wireless device may refrain from monitoring the BFR CORESET, for example, if the second UL signal does not indicate an indicator/index of a candidate RS among the candidate RSs.

A wireless device may receive one or more messages. The one or more messages may comprise one or more configuration parameters for a second cell. The one or more configuration parameters may indicate one or more first PUCCH resources for the second cell. The one or more configuration parameters may indicate one or more second PUCCH resources for the second cell. The one or more configuration parameters may indicate one or more second RSs.

The one or more first PUCCH resources may be configured on a first cell. The one or more second PUCCH resources may be configured on a first cell. The one or more first PUCCH resources may be configured on the second cell. The one or more second PUCCH resources may be configured on the second cell.

The wireless device may initiate a BFR procedure for the second cell based on detecting a beam failure. The wireless device may select a PUCCH resource (e.g., selected PUCCH resource) among the one or more first PUCCH resources and the one or more second PUCCH resources, for example, based on a candidate beam selection procedure. The wireless device may select a PUCCH resource (e.g., selected PUCCH resource) among the one or more first PUCCH resources, for example, based on determining/identifying/indicating a candidate RS among/in the one or more second RSs in the candidate beam selection. The wireless device may select a PUCCH resource (e.g., selected PUCCH resource) among the one or more second PUCCH resources, for example, based on not determining/not identifying a candidate RS among/in the one or more second RSs in the candidate beam selection. The wireless device may send/transmit, for the BFR procedure, an UL signal via the selected PUCCH resource, for example, based on the selecting.

A wireless device may send/transmit, to a base station, a capability message (and/or signal) of the wireless device. The capability message may comprise/indicate a maximum quantity of active TCI states (e.g., maxNumberActiveTCI-PerBWP). The maximum quantity of active TCI states may indicate the maximum quantity of activated TCI states per BWP per cell (e.g., including TCI states for control signals and TCI states for data signals). The wireless device may or may not activate a quantity of TCI states per BWP per cell that is more than the maximum quantity of active TCI states (and/or QCL type D assumption(s)) for a PDSCH reception and/or a CORESET monitoring for the BWP of the cell. The wireless device may apply at most 2 (or any other quantity of) QCL typeD assumptions for PDCCH reception(s), for example, if the wireless device indicates that the maximum quantity of active TCI states (e.g., maxNumberActiveTCI-PerBWP) is equal to 2 (or any other quantity).

The one or more configuration parameters may indicate at least two CORESETs (e.g., with different QCL TypeD assumptions) and a CORESET (e.g., linked to the search space set). The wireless device may monitor the CORESET for a BFR procedure. A first CORESET of the at least two CORESETs may have a first QCL TypeD assumption. A second CORESET of the at least two CORESETs may have a second QCL TypeD assumption. The first QCL TypeD assumption and the second QCL TypeD assumption may be different (or the same).

The one or more configuration parameters may indicate at least two CORESET-specific indexes for the at least two CORESETs. Each CORESET of the at least two CORESETs may be indicated by/identified with a respective CORESET-specific indicator/index of the at least two CORESET-specific indicators/indexes. The first CORESET may be indicated by/identified by a first CORESET-specific index of the at least two CORESET-specific indexes. The second CORESET may be indicated by/identified by a second CORESET-specific index of the at least two CORESET-specific indexes.

The wireless device may select a CORESET (e.g., selected CORESET) based on the at least two CORESET-specific indexes, for example, if the wireless device successfully completes a BFR procedure, the maximum quantity of active TCI states is equal to two, and/or the wireless device is configured with at least two CORESETs with different QCL TypeD assumptions. The wireless device may select a CORESET (e.g., selected CORESET) with a lowest CORESET-specific index among the at least two CORESET-specific indexes of the at least two CORESETs. The wireless device may select a CORESET (e.g., selected CORESET) with a highest CORESET-specific index among the at least two CORESET-specific indexes of the at least two CORESETs. The wireless device may select a CORESET (e.g., selected CORESET) based on the selected CORESET being a wireless device-specific CORESET. The wireless device may select a CORESET (e.g., selected CORESET) based on the selected CORESET being common CORESET.

The wireless device may drop/stop monitoring the selected CORESET, for example, based on selecting the CORESET (e.g., selected CORESET0. The wireless device may skip monitoring the selected CORESET, for example, based on selecting the CORESET (e.g., selected CORESET). The wireless device may apply QCL TypeD assumption of the CORESET (e.g., the candidate RS) for the selected CORESET, for example, based on selecting the CORESET (e.g., selected CORESET).

The wireless device may apply the candidate RS for a QCL TypeD assumption of the CORESET. The wireless device may apply one more QCL Type D assumption (e.g., the first QCL TypeD assumption or the second QCL TypeD assumption) in addition to the QCL TypeD assumption of the CORESET, for example, based on the maximum quantity of active TCI states being equal to two. The wireless device may not monitor the first CORESET with the first QCL TypeD assumption and the second CORESET with the second QCL TypeD assumption based on the maximum quantity of active TCI states (e.g., maxNumberActiveTCI-PerBWP) being equal to 2.

A wireless device may determine a beam failure associated with a secondary cell. The wireless device may initiate a BFR procedure, for example, based on the determining the beam failure. The secondary cell may be configured with a PUCCH. The wireless device may send/transmit, to a base station, an uplink signal associated with beam failure recovery (BFR) for the secondary cell. The uplink signal may indicate at least one of: a candidate beam associated with the secondary cell; or a reference signal (RS) associated with the candidate beam (e.g., a candidate beam RS). The RS may comprise at least one of: an SSB, and/or a CSI-RS. The RS may be identified/determined among one or more candidate beam RSs. The wireless device may receive a response to the uplink signal. The wireless device may compete the BFR procedure, for example, based on receiving the response to the uplink signal. The wireless device may send/transmit, after receiving the response and using a spatial filter (e.g., a spatial domain filter) associated with at least one of the candidate beam or the RS, a signal via an uplink control channel (e.g., PUCCH). The signal via the uplink control channel may be sent/transmitted via the secondary cell. The spatial filter may be used for reception of the RS. The wireless device may receive, after transmitting the signal via the uplink control channel, at least one indication of a spatial relation associated with at least one uplink control channel transmission. The wireless device may send/transmit, based on a second spatial filter associated with the spatial relation, a second signal (e.g., via an uplink control channel). The second spatial filter may be different from the spatial filter associated with the at least one of the candidate beam or the RS. The uplink signal may comprise a medium access control (MAC) control element (CE) indicating at least one of: an identifier of the secondary cell; the beam failure associated with the secondary cell; the RS; or the candidate beam. The wireless device may send/transmit, via a cell (e.g., a primary cell, another secondary cell, etc.) different from the secondary cell, the MAC CE. The wireless device may receive an uplink grant indicating at least one uplink shared channel resource. The wireless device may send/transmit, based on the at least one uplink shared channel resource, the MAC CE. The wireless device may send/transmit, prior to sending/transmitting the uplink signal, a scheduling request. The wireless device may receive, based on the scheduling request, an uplink grant. The wireless device may send/transmit, based on the uplink grant, the MAC CE. The wireless device may send/transmit, via a primary cell (e.g., via a PUCCH resource on the primary cell) that is different from the secondary cell, a BFR request associated with the BFR. The wireless device may receive, during a first symbol, the response. The wireless device may send/transmit, after a quantity of symbols following the first symbol, the signal via the uplink control channel. The spatial filter may be associated with the candidate beam and may be used for reception of the RS. The spatial filter may be associated with a transmit beam and may be used for transmission of the signal via the uplink control channel A spatial filter of the base station may be associated with the candidate beam and may be used for transmission of the RS. The spatial filter of the base station may be associated with a receive beam and may be used for reception of the signal via the uplink control channel. The wireless device may receive, from the base station, the RS. The wireless device may determine, based on at least one measurement associated with the RS, the candidate beam. The wireless device may receive, based on the spatial filter, the RS. The wireless device may send/transmit, based on the spatial filter, the signal via the uplink control channel. The wireless device may send/transmit, via a primary cell and based on a spatial filter associated with the primary cell, the uplink signal. The wireless device may send/transmit, via the secondary cell, the signal via the uplink control channel. The secondary cell may comprise a secondary cell configured with a physical uplink control channel (PUCCH) and/or one or more secondary cells not configured with a PUCCH. The wireless device may determine, based on receiving the response, that the BFR for the secondary cell is complete. The wireless device may receive a medium access control command. The wireless device may activate, based on the medium access control command, a spatial filter associated with the secondary cell. The wireless device may send/transmit, based on the spatial filter associated with the secondary cell, a second uplink signal via a physical uplink channel. The wireless device may receive one or more messages comprising one or more configuration parameters of the secondary cell. The one or more configuration parameters may indicate: one or more candidate beam reference signals (RSs); and the physical uplink channel. The physical uplink channel comprises at least one of: a PUCCH, a PUSCH, or an SRS. The wireless device may send/transmit, prior to receiving an activation command for the physical uplink channel, the signal via the uplink control channel. The wireless device may send/transmit, prior to receiving a spatial setting configuration for the physical uplink channel, the signal via the uplink control channel. The wireless device may determine, based on a comparison of a reference signal received power (RSRP) threshold with a quality of each candidate beam RS of one or more candidate beam RSs, the RS. A quality of the RS may be greater than the RSRP threshold. The quality may comprise an RSRP. The BFR for the secondary cell may comprise BFR associated with an active downlink bandwidth part (BWP) of the secondary cell. The beam failure may comprise a beam failure associated with the active downlink BWP of the secondary cell. The MAC CE may comprise a field indicating the RS. The response may comprise an acknowledgement, as a BFR response, for the MAC CE. The response may comprise a DCI, as a BFR response, indicating an uplink grant or a downlink assignment. The wireless device may select the RS prior to (or after) the determining the beam failure. The wireless device may send/transmit, to a base station, a capability indication of supporting beam correspondence between a transmit beam and a receive beam. The wireless device may determine, based on supporting the beam correspondence, the spatial filter associated with the at least one of the candidate beam or the RS. The supporting the beam correspondence may comprise determining, based on a downlink measurement, a spatial transmission filter for an uplink transmission. The supporting the beam correspondence may comprise determining, based on information associated with an uplink measurement by a base station, a spatial reception filter for a downlink reception. The wireless device may receive one or more messages comprising one or more configuration parameters that indicate a response window for the secondary cell. The wireless device may determine the response window based on at least one of: the transmitting the uplink signal, wherein the uplink signal comprises a medium access control (MAC) control element (CE); or receiving an acknowledgement for the MAC CE. The wireless device may monitor, based on the response window, for the response. The response may comprise at least one PDCCH associated with a control resource set for the BFR. The one or more configuration parameters may indicate the control resource set for the BFR. The wireless device may send/transmit, based on an expiry of the response window, a random access preamble. The wireless device may initiate, based on the expiry of the response window, a random access procedure. The wireless device may compare, based on an expiry of the response window, a reference signal received power (RSRP) threshold to a quality of each candidate beam RS of one or more candidate beam RSs. The wireless device may increment a transmission counter based on at least one of: the sending/transmitting the uplink signal; or an expiry of the response window. The wireless device may initiate, based on the transmission counter reaching a first value, a random access procedure. The one or more configuration parameters may indicate the first value (e.g., a maximum value).

A wireless device may determine a beam failure associated with a secondary cell. The wireless device may initiate, based on the determining the beam failure, BFR associated with the secondary cell. The secondary cell may be configured with a PUCCH. The wireless device may send/transmit a MAC packet (e.g., a MAC CE) associated with BFR for the secondary cell. The MAC packet may indicate a candidate beam RS. The candidate beam RS may be selected, by the wireless device, from among one or more candidate beam RSs. The wireless device may receive a response to the MAC packet. The wireless device may complete the BFR, for example, based on the receiving the response. The wireless device may send/transmit, after receiving the response and using a spatial filter associated with reception of the candidate beam RS, a signal via an uplink control channel of the secondary cell. The wireless device may send/transmit, after completing the BFR, the signal via the uplink control channel. The wireless device may send/transmit, after a quantity of symbols after the receiving the response, the signal via the uplink control channel. The wireless device may receive at least one indication of a spatial relation for the uplink control channel. The wireless device may send/transmit, via an uplink control channel resource of a primary cell different from the secondary cell, a BFR request associated with the BFR. The secondary cell may comprise a secondary cell configured with a PUCCH.

A wireless device may receive one or more first messages comprising one or more first configuration parameters of a secondary cell. The wireless device may detect a beam failure associated with the secondary cell. The wireless device may determine, based on determining that the one or more first configuration parameters do not indicate one or more candidate beam reference signals (RSs) for a beam failure recovery (BFR) procedure associated with the secondary cell, a default set of candidate beam RSs of the secondary cell. The wireless device may perform, using the default set of candidate beam RSs, the BFR procedure. The wireless device may send/transmit an uplink signal. The uplink signal may comprise an indicator associated with a candidate beam RS of the default set of candidate beam RSs. The uplink signal may comprise a field indicating that no candidate beam RS is indicated for the secondary cell. The wireless device may receive, based on a selected candidate beam RS of the default set of candidate beam RSs, a second message. The wireless device may receive one or more second messages. The one or more second messages may comprise one or more second configuration parameters of the secondary cell, and the one or more second configuration parameters may indicate a plurality of candidate beam RSs. The wireless device may initiate, using a first set of candidate beam RSs among the plurality of candidate beam RSs, a first BFR procedure associated with the secondary cell. The wireless device may receive, during the first BFR procedure, a third message indicating a second set of candidate beam RSs, different from the first set of candidate beam RSs, among the plurality of candidate beam RSs. The wireless device may stop, based on the receiving the third message, the first BFR procedure. The wireless device may initiate, using the second set of candidate beam RSs, a second BFR procedure associated with the secondary cell. The one or more second configuration parameters may indicate a value associated with a beam failure recovery timer. The wireless device may start the beam failure recovery timer based on the initiating the first BFR procedure. The wireless device may stop the beam failure recovery timer based on the stopping the first BFR procedure. The stopping the first BFR procedure may comprise stopping a transmission of an uplink signal for the first BFR procedure, and wherein the uplink signal is at least one of: a random-access preamble; a scheduling request; or a medium access control (MAC) control element (CE). The initiating the first BFR procedure using the first set of candidate beam RSs may comprise determining a quality of each RS of the first set of candidate beam RSs in a first candidate beam selection procedure for the first BFR procedure. The initiating the second BFR procedure using the second set of candidate beam RSs may comprise determining a quality of each RS of the second set of candidate beam RSs in a second candidate beam selection procedure for the second BFR procedure. The wireless device may receive a fourth message indicating the first set of candidate beam RSs. The one or more second configuration parameters may indicate a plurality of RSs for a beam failure detection procedure associated with the secondary cell. The wireless device may refrain from determining a quality of each RS of the plurality of RSs for the beam failure detection procedure before the receiving the fourth message. The wireless device may determine a quality of each RS of the plurality of RSs for the beam failure detection. The one or more second configuration parameters may indicate a threshold. The wireless device may refrain from incrementing a beam failure instance counter, before the receiving the fourth message, if the quality is worse than a threshold. The wireless device may refrain from initiating, before the receiving the fourth message, a BFR procedure associated with the secondary cell. The wireless device may initiate, before the receiving the fourth message and with the plurality of candidate beam RSs, a third BFR procedure associated with the secondary cell. The wireless device may initiate, before the receiving the fourth message and with a second default set of candidate beam RSs, a third BFR procedure associated with the secondary cell. The plurality of candidate beam RSs may comprise the second default set of candidate beam RSs. The wireless device may determine that the one or more first configuration parameters do not indicate a candidate beam threshold for the BFR procedure associated with the secondary cell. The uplink signal may comprise a field indicating that no candidate beam RS is indicated for the secondary cell. A value of the field in the first uplink signal may be equal to an index. The index is zero or one. The index may be associated with an activated status or a deactivated status. The index is preconfigured. The wireless device may send/transmit, for the BFR procedure, a MAC CE comprising a field indicating that no candidate beam RS is identified for the secondary cell.

A wireless device may receive, from a base station, one or more first messages comprising one or more first configuration parameters of a secondary cell. The wireless device may detect a beam failure associated with the secondary cell. The wireless device may determine that the one or more first configuration parameters do not indicate a candidate beam threshold for a beam failure recovery (BFR) procedure associated with the secondary cell. The wireless device may send/transmit, based on the determining, a first uplink signal, wherein the first uplink signal may comprise a field indicating that no candidate beam reference signal (RS) is indicated for the secondary cell. The transmitting the first uplink signal may be based on determining that the one or more first configuration parameters do not indicate one or more candidate beam RSs for the BFR procedure associated with the secondary cell. The wireless device may receive one or more second messages comprising one or more second configuration parameters of the secondary cell, wherein the one or more second configuration parameters indicate a plurality of candidate beam RSs. The wireless device may initiate, using a first set of candidate beam RSs among the plurality of candidate beam RSs, a first BFR procedure associated with the secondary cell. The wireless device may receive, during the first BFR procedure, a third message indicating a second set of candidate beam RSs, different from the first set of candidate beam RSs, among the plurality of candidate beam RSs. The wireless device may stop, based on the receiving the third message, the first BFR procedure. The wireless device may initiate, using the second set of candidate beam RSs, a second BFR procedure associated with the secondary cell. The initiating the first BFR procedure using the first set of candidate beam RSs may comprise determining a quality of each RS of the first set of candidate beam RSs in a first candidate beam selection procedure for the first BFR procedure. The initiating the second BFR procedure using the second set of candidate beam RSs may comprise determining a quality of each RS of the second set of candidate beam RSs in a second candidate beam selection procedure for the second BFR procedure. The stopping the first BFR procedure may comprise stopping a transmission of a second uplink signal for the first BFR procedure. The second uplink signal may be at least one of: a random-access preamble, a scheduling request, or a medium access control (MAC) control element (CE).

A wireless device may receive one or more messages comprising one or more configuration parameters of a secondary cell, wherein the one or more configuration parameters indicate a plurality of candidate beam reference signals (RSs). The wireless device may initiate, using a first set of candidate beam RSs among the plurality of candidate beam RSs, a first beam failure recovery (BFR) procedure associated with the secondary cell. The wireless device may receive, during the first BFR procedure, a first message indicating a second set of candidate beam RSs, different from the first set of candidate beam RSs, among the plurality of candidate beam RSs. The wireless device may stop, based on the receiving the first message, the first BFR procedure. The wireless device may initiate, using the second set of candidate beam RSs, a second BFR procedure associated with the secondary cell. The one or more configuration parameters may indicate a value associated with a beam failure recovery timer. The wireless device may start the beam failure recovery timer based on the initiating the first BFR procedure. The wireless device may stop the beam failure recovery timer based on the stopping the first BFR procedure. The stopping the first BFR procedure may comprise stopping a transmission of an uplink signal for the first BFR procedure. The uplink signal may be at least one of: a random-access preamble, a scheduling request, or a medium access control (MAC) control element (CE). The initiating the first BFR procedure using the first set of candidate beam RSs may comprise determining a quality of each RS of the first set of candidate beam RSs in a first candidate beam selection procedure for the first BFR procedure. The initiating the second BFR procedure using the second set of candidate beam RSs may comprise determining a quality of each RS of the second set of candidate beam RSs in a second candidate beam selection procedure for the second BFR procedure. The wireless device may receive a second message indicating the first set of candidate beam RSs.

Figure 37:
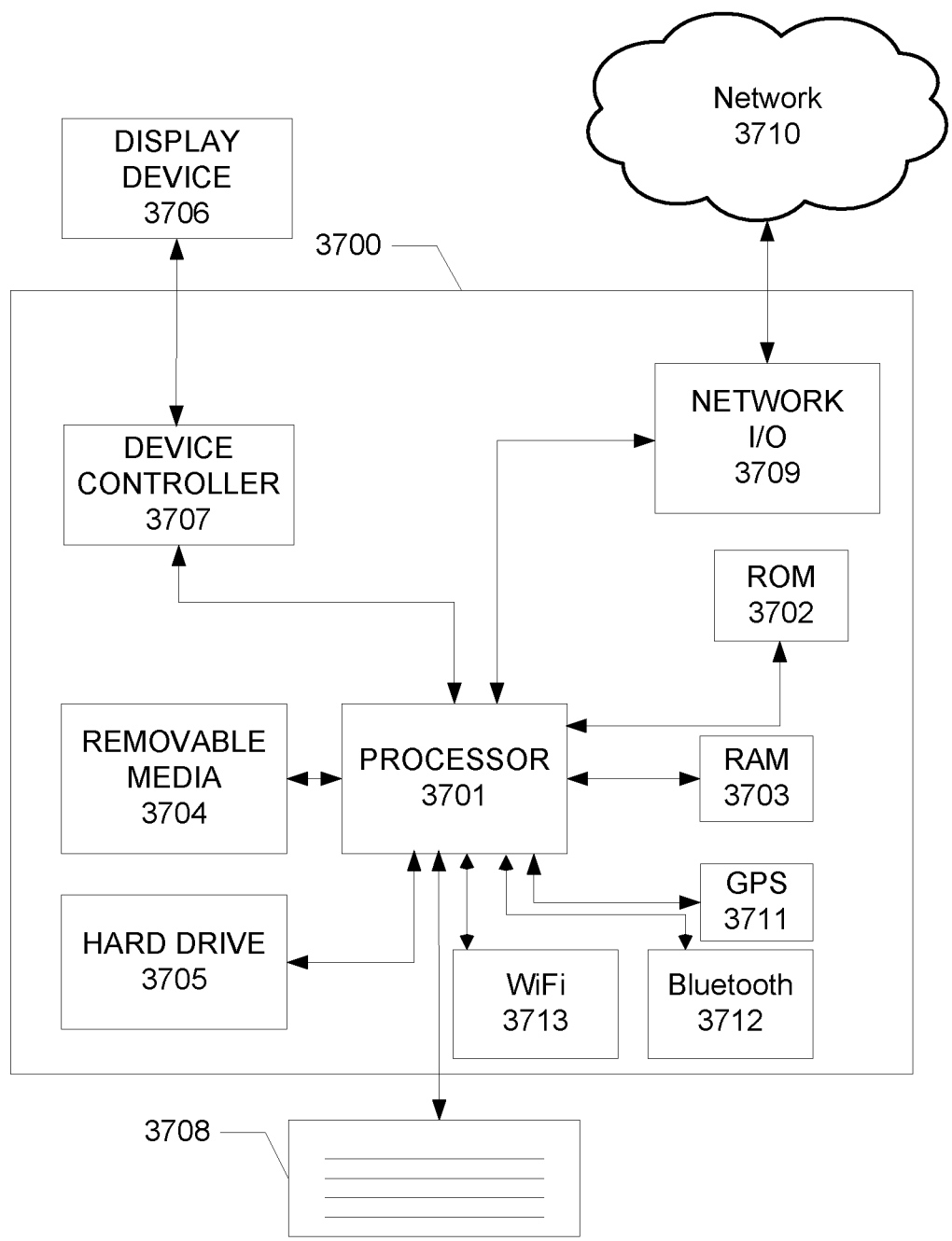
FIG. 37 shows example elements of a computing device that may be used to implement any of the various devices described herein.

FIG. 37 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 3700 may include one or more processors 3701, which may execute instructions stored in the random access memory (RAM) 3703, the removable media 3704 (such as a Universal Serial Bus (USB) drive, compact disk (CD) or digital versatile disk (DVD), or floppy disk drive), or any other desired storage medium. Instructions may also be stored in an attached (or internal) hard drive 3705. The computing device 3700 may also include a security processor (not shown), which may execute instructions of one or more computer programs to monitor the processes executing on the processor 3701 and any process that requests access to any hardware and/or software components of the computing device 3700 (e.g., ROM 3702, RAM 3703, the removable media 3704, the hard drive 3705, the device controller 3707, a network interface 3709, a GPS 3711, a Bluetooth interface 3712, a WiFi interface 3713, etc.). The computing device 3700 may include one or more output devices, such as the display 3706 (e.g., a screen, a display device, a monitor, a television, etc.), and may include one or more output device controllers 3707, such as a video processor. There may also be one or more user input devices 3708, such as a remote control, keyboard, mouse, touch screen, microphone, etc. The computing device 3700 may also include one or more network interfaces, such as a network interface 3709, which may be a wired interface, a wireless interface, or a combination of the two. The network interface 3709 may provide an interface for the computing device 3700 to communicate with a network 3710 (e.g., a RAN, or any other network). The network interface 3709 may include a modem (e.g., a cable modem), and the external network 3710 may include communication links, an external network, an in-home network, a provider's wireless, coaxial, fiber, or hybrid fiber/coaxial distribution system (e.g., a DOCSIS network), or any other desired network. Additionally, the computing device 3700 may include a location-detecting device, such as a global positioning system (GPS) microprocessor 3711, which may be configured to receive and process global positioning signals and determine, with possible assistance from an external server and antenna, a geographic position of the computing device 3700.

The example in FIG. 37 may be a hardware configuration, although the components shown may be implemented as software as well. Modifications may be made to add, remove, combine, divide, etc. components of the computing device 3700 as desired. Additionally, the components may be implemented using basic computing devices and components, and the same components (e.g., processor 3701, ROM storage 3702, display 3706, etc.) may be used to implement any of the other computing devices and components described herein. For example, the various components described herein may be implemented using computing devices having components such as a processor executing computer-executable instructions stored on a computer-readable medium, as shown in FIG. 37. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:
1. A method comprising:
   transmitting, by a wireless device, a first uplink signal associated with beam failure recovery (BFR) for a cell configured with a physical uplink control channel (PUCCH), wherein the first uplink signal comprises:
   a first field indicating the cell, and
   a second field indicating a candidate beam reference signal (RS) associated with the cell; and after completing the BFR for the cell, transmitting a second uplink signal via the PUCCH using a spatial filter that is determined based on whether the cell is a primary cell or a secondary cell.

2. The method of claim 1, further comprising:
receiving, after transmitting the second uplink signal via the PUCCH, at least one indication of a spatial relation associated with at least one second uplink control channel transmission; and
transmitting, based on a second spatial filter associated with the spatial relation, a third uplink signal, wherein the second spatial filter is different from the spatial filter.

3. The method of claim 1, wherein the transmitting the first uplink signal comprises transmitting, via a second cell different from the cell, a medium access control (MAC) control element (CE).

4. The method of claim 1, further comprising:
transmitting, prior to transmitting the first uplink signal, a scheduling request; and
receiving, based on the scheduling request, an uplink grant,
wherein the transmitting the first uplink signal comprises transmitting, based on the uplink grant, a medium access control (MAC) control element (CE).

5. The method of claim 1, further comprising:
receiving, during a first symbol, a response to the first uplink signal,
wherein the receiving the response completes the BFR for the cell, and
wherein the transmitting the second uplink signal via the PUCCH comprises transmitting, after a quantity of symbols following the first symbol, the second uplink signal via the PUCCH.

6. The method of claim 1, wherein the spatial filter is used for reception of the candidate beam RS, by the wireless device, and
wherein the spatial filter is associated with a transmit beam.

7. A method comprising:
transmitting, by a wireless device, a medium access control (MAC) packet associated with beam failure recovery (BFR) for a cell configured with a physical uplink control channel (PUCCH), wherein the MAC packet comprises:
a first field indicating the cell, and
a second field indicating a candidate beam reference signal (RS) of one or more candidate beam reference signals (RSs); and
after completing the BFR for the cell, transmitting an uplink signal via the PUCCH using a spatial filter that is determined based on whether the cell is a primary cell or a secondary cell.

8. The method of claim 7, wherein the transmitting the uplink signal via the PUCCH comprises transmitting, after a quantity of symbols after receiving a response to the MAC packet, the uplink signal via the PUCCH, and
wherein the response lacks an indication of a spatial relation for transmission of the uplink signal via the PUCCH.

9. The method of claim 7, further comprising receiving, before a beam failure, at least one indication of a spatial relation for the PUCCH.

10. The method of claim 7, further comprising transmitting, via an uplink control channel resource of a second cell different from the cell, a BFR request associated with the BFR.

11. The method of claim 7, further comprising:
determining, based on receiving a response to the MAC packet, that the BFR for the cell is complete;
determining a second beam failure associated with the cell; and
determining, after the second beam failure and based on a determination that one or more configuration parameters do not indicate one or more candidate beam RSs for BFR associated with the cell, a default set of candidate beam RSs of the cell.

12. A method comprising:
receiving, by a base station from a wireless device, a first uplink signal associated with beam failure recovery (BFR) for a cell configured with a physical uplink control channel (PUCCH), wherein the first uplink signal comprises:
a first field indicating the cell, and
a second field indicating a candidate beam reference signal (RS) associated with the cell; and
after the BFR for the cell has been completed, receiving a second uplink signal via the PUCCH using a spatial filter that is determined based on whether the cell is a primary cell or a secondary cell.

13. The method of claim 12, further comprising:
transmitting, after receiving the second uplink signal via the PUCCH, at least one indication of a spatial relation associated with at least one second uplink control channel transmission; and
receiving, from the wireless device and based on a second spatial filter associated with the spatial relation, a third uplink signal, wherein the second spatial filter is different from the spatial filter.

14. The method of claim 12, wherein the receiving the first uplink signal comprises receiving, via a cell different from the cell, a medium access control (MAC) control element (CE).

15. The method of claim 12, further comprising:
receiving, prior to receiving the first uplink signal, a scheduling request; and
transmitting, based on the scheduling request, an uplink grant,
wherein the receiving the first uplink signal comprises receiving, based on the uplink grant, a medium access control (MAC) control element (CE).

16. The method of claim 12, further comprising:
transmitting, during a first symbol, a response to the first uplink signal, wherein the transmitting the response completes the BFR for the cell, and
wherein the receiving the second uplink signal via the PUCCH comprises receiving, after a quantity of symbols following the first symbol, the second uplink signal via the PUCCH.

17. The method of claim 12, wherein, based on the cell being the primary cell, the spatial filter determined to be a spatial filter used, for transmission of the candidate beam RS, by the base station, and
wherein the spatial filter is associated with a receive beam.

18. The method of claim 12, further comprising:
transmitting a response to the first uplink signal, wherein the response lacks an indication of a spatial relation for transmission of the second uplink signal via the PUCCH.

19. The method of claim 1, further comprising:
receiving a response to the first uplink signal, wherein the response lacks an indication of a spatial relation for transmission of the second uplink signal via the PUCCH.

20. The method of claim 7, further comprising:
receiving a response to the MAC packet, wherein the receiving the response completes the BFR for the cell.

21. The method of claim 1, further comprising:
receiving a response to the first uplink signal; and
determining, based on a reception time of the response, a transmission time of the second uplink signal.

22. The method of claim 7, further comprising:
receiving a response to the MAC packet; and
determining, based on a reception time of the response, a transmission time of the uplink signal.

23. The method of claim 12, further comprising:
transmitting a response to the first uplink signal; and
determining, based on a transmission time of the response, a reception time of the second uplink signal.

24. The method of claim 1, wherein the second uplink signal comprises an uplink control channel signal.

25. The method of claim 1, wherein the PUCCH is indicated with a spatial relation.

26. The method of claim 1, further comprising:
determining a beam failure associated with the cell configured with the physical uplink control channel (PUCCH).

27. The method of claim 1, further comprising:
selecting the spatial filter based on determining that the cell is a primary cell.

28. The method of claim 1, wherein the method further comprises:
transmitting, by the wireless device, a third uplink signal associated with beam failure recovery (BFR) for a secondary cell configured with PUCCH; and
after completing the BFR for the secondary cell configured with PUCCH, transmitting, using a spatial filter associated with the candidate beam RS, a fourth uplink signal via the PUCCH.

* * * * *